United States Patent
Taira et al.

(10) Patent No.: US 8,249,417 B2
(45) Date of Patent: *Aug. 21, 2012

(54) RECORDING MEDIUM CAPABLE OF INTERACTIVE REPRODUCING AND REPRODUCTION SYSTEM FOR THE SAME

(75) Inventors: Kazuhiko Taira, Yokohama (JP); Shinichi Kikuchi, Yokohama (JP); Tomoaki Kurano, Yokohama (JP); Hideki Mimura, Yokohama (JP); Takeshi Hagio, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1501 days.

This patent is subject to a terminal disclaimer.

(21) Appl. No.: 11/516,623

(22) Filed: Sep. 7, 2006

(65) Prior Publication Data
US 2007/0003235 A1 Jan. 4, 2007

Related U.S. Application Data

(60) Continuation of application No. 11/018,549, filed on Dec. 22, 2004, now Pat. No. 7,203,414, which is a division of application No. 09/609,247, filed on Jun. 30, 2000, now Pat. No. 6,895,171, which is a continuation of application No. 08/631,436, filed on Apr. 12, 1996, now Pat. No. 6,167,189.

(30) Foreign Application Priority Data

Apr. 14, 1995 (JP) ........................................ 7-114017

(51) Int. Cl.
*H04N 9/80* (2006.01)
(52) U.S. Cl. ....................................................... 386/241
(58) Field of Classification Search .................. 386/200, 386/241, 332
See application file for complete search history.

(56) References Cited

U.S. PATENT DOCUMENTS

| | | | |
|---|---|---|---|
| 4,305,131 A | 12/1981 | Best | |
| 4,333,152 A | 6/1982 | Best | |
| 4,467,354 A | 8/1984 | Eby, Jr. et al. | |
| 4,569,026 A | 2/1986 | Best | |
| 4,680,647 A | 7/1987 | Moriyama | |
| 4,839,743 A | 6/1989 | Best et al. | |
| 4,947,265 A | 8/1990 | Hayashi et al. | |
| 4,979,159 A | 12/1990 | Tsuruoka et al. | |
| 5,093,731 A | 3/1992 | Watanabe et al. | |
| 5,109,482 A | 4/1992 | Bohrman | |
| 5,161,034 A | 11/1992 | Klappert | |
| 5,191,436 A | 3/1993 | Yonemitsu | |
| 5,241,659 A | 8/1993 | Parulski et al. | |

(Continued)

FOREIGN PATENT DOCUMENTS

EP 325 325 7/1989

(Continued)

*Primary Examiner* — Huy T Nguyen
(74) *Attorney, Agent, or Firm* — Oblon, Spivak, McClelland, Maier & Neustadt, L.L.P.

(57) ABSTRACT

On an optical disk, video object sets (VTST_VOBS) to be reproduced and video title set information (VTSI) serving as management information on the video object sets have been stored. In each video object set (VTST_VOBS), many data cells, each containing video, audio, and sub-picture data, are arranged. Management information on programs chains, which are combinations of programs to be reproduced one after another, has been written in a video title set PGC table (VTS_PGCIT). By referring to the program chain table (VTS_PGCIT) according to the user's input, the playback order of program chains can be changed, enabling the program chains to be reproduced one after another in various modes.

3 Claims, 54 Drawing Sheets

U.S. PATENT DOCUMENTS

| | | |
|---|---|---|
| 5,245,600 A | 9/1993 | Yamauchi et al. |
| 5,297,131 A | 3/1994 | Tanaka |
| 5,336,844 A | 8/1994 | Yamauchi et al. |
| 5,363,362 A | 11/1994 | Maeda et al. |
| 5,367,510 A | 11/1994 | Ando |
| 5,371,602 A | 12/1994 | Tsuboi et al. |
| 5,388,093 A | 2/1995 | Yoshida et al. |
| 5,400,077 A | 3/1995 | Cookson et al. |
| 5,410,676 A | 4/1995 | Huang et al. |
| 5,434,678 A | 7/1995 | Abecassis |
| 5,442,456 A | 8/1995 | Hansen |
| 5,455,684 A | 10/1995 | Fujinami et al. |
| 5,463,565 A | 10/1995 | Cookson et al. |
| 5,488,410 A | 1/1996 | Lieberfarb et al. |
| 5,519,681 A | 5/1996 | Maeda et al. |
| 5,528,569 A | 6/1996 | Fujiie et al. |
| 5,546,365 A | 8/1996 | Roth |
| 5,546,367 A | 8/1996 | Yoshimura et al. |
| 5,546,368 A | 8/1996 | Lee et al. |
| 5,561,649 A | 10/1996 | Lee et al. |
| 5,574,569 A | 11/1996 | Utsumi et al. |
| 5,596,564 A | 1/1997 | Fukushima et al. |
| 5,613,109 A | 3/1997 | Yamauchi et al. |
| 5,619,338 A | 4/1997 | Nakai et al. |
| 5,630,006 A | 5/1997 | Hirayama |
| 5,636,200 A | 6/1997 | Taira |
| 5,638,346 A | 6/1997 | Aramaki |
| 5,646,796 A | 7/1997 | Kimura et al. |
| 5,675,695 A | 10/1997 | Hirayama |
| 5,745,643 A * | 4/1998 | Mishina .................. 386/220 |
| 6,167,189 A | 12/2000 | Taira et al. |

FOREIGN PATENT DOCUMENTS

| | | | |
|---|---|---|---|
| EP | 388 689 | | 10/1990 |
| EP | 424 903 | | 5/1991 |
| EP | 460 751 | A2 | 12/1991 |
| EP | 460 764 | A1 | 12/1991 |
| EP | 4460 751 | A3 | 12/1991 |
| EP | 521 487 | | 1/1993 |
| EP | 520 164 | | 5/1993 |
| EP | 542 377 | | 5/1993 |
| EP | 606 868 | | 7/1994 |
| EP | 635 835 | | 7/1994 |
| EP | 614 188 | | 9/1994 |
| EP | 644 692 | | 3/1995 |
| EP | 685 845 | | 4/1995 |
| EP | 664 646 | | 7/1995 |
| EP | 675 493 | | 10/1995 |
| EP | 677 842 | | 10/1995 |
| EP | 680 216 | A2 | 11/1995 |
| EP | 685 845 | | 12/1995 |
| EP | 730 272 | | 2/1996 |
| EP | 714 377 | | 5/1996 |
| EP | 724 264 | | 7/1996 |
| EP | 737 979 | | 10/1996 |
| GB | 2 260 463 | | 4/1993 |
| JP | 9-080253 | | 12/1905 |
| JP | 9-086473 | | 12/1905 |
| JP | 62-223891 | | 10/1987 |
| JP | 2-250132 | | 10/1990 |
| JP | 6-325085 | | 7/1991 |
| JP | 3-204867 | | 9/1991 |
| JP | 4-38679 | | 2/1992 |
| JP | 7079399 | | 8/1993 |
| JP | 5-282796 | | 12/1993 |
| JP | 6-195963 | | 7/1994 |
| JP | 6-309-841 | | 11/1994 |
| JP | 7-272445 | | 10/1995 |
| JP | 7-334939 | | 12/1995 |
| JP | 8-147939 | | 7/1996 |
| WO | WO 83/02839 | | 8/1983 |
| WO | WO 94/07332 | | 3/1994 |
| WO | WO 94/30014 | | 12/1994 |
| WO | WO 95/12275 | | 5/1995 |

* cited by examiner

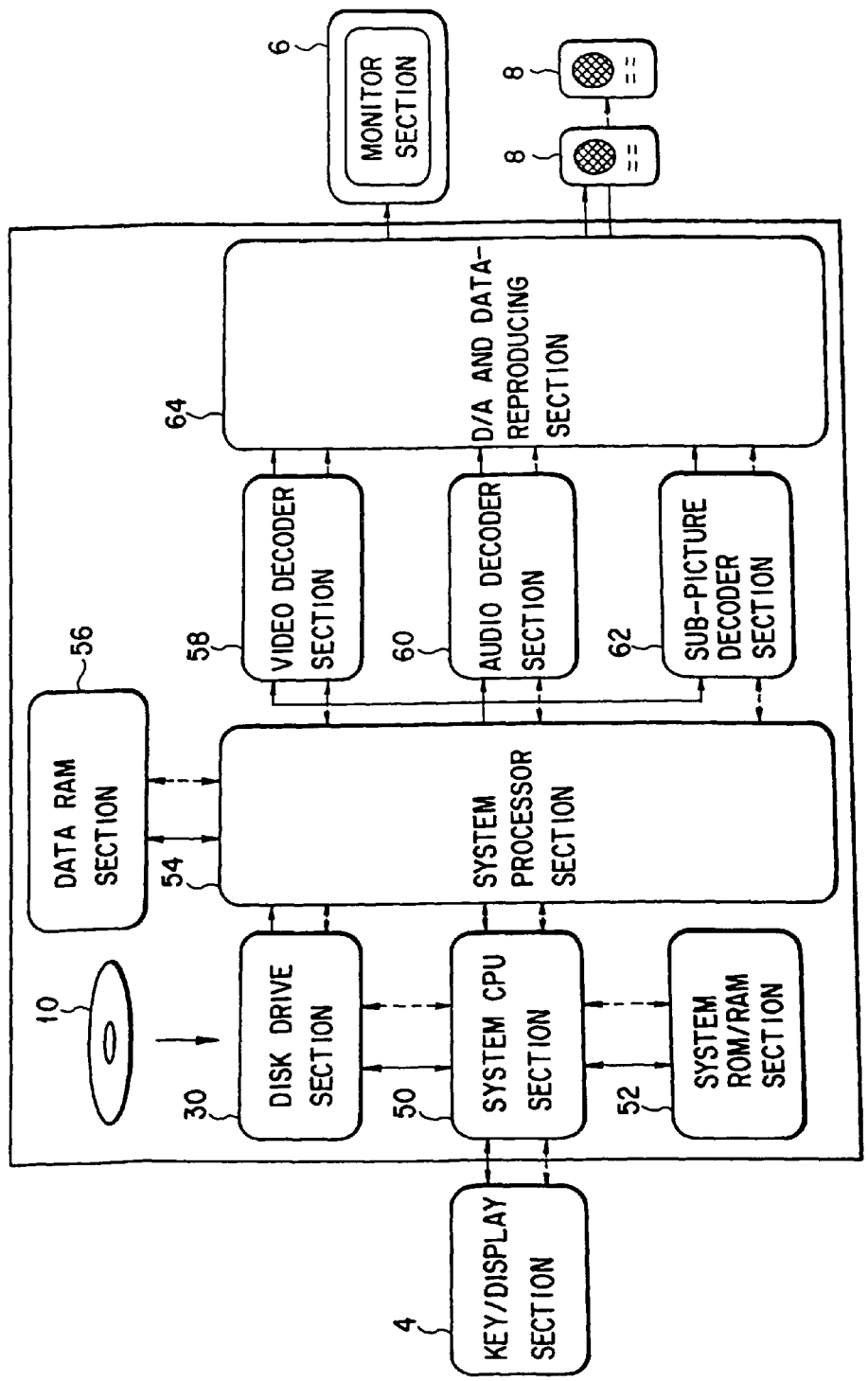
F I G. 1

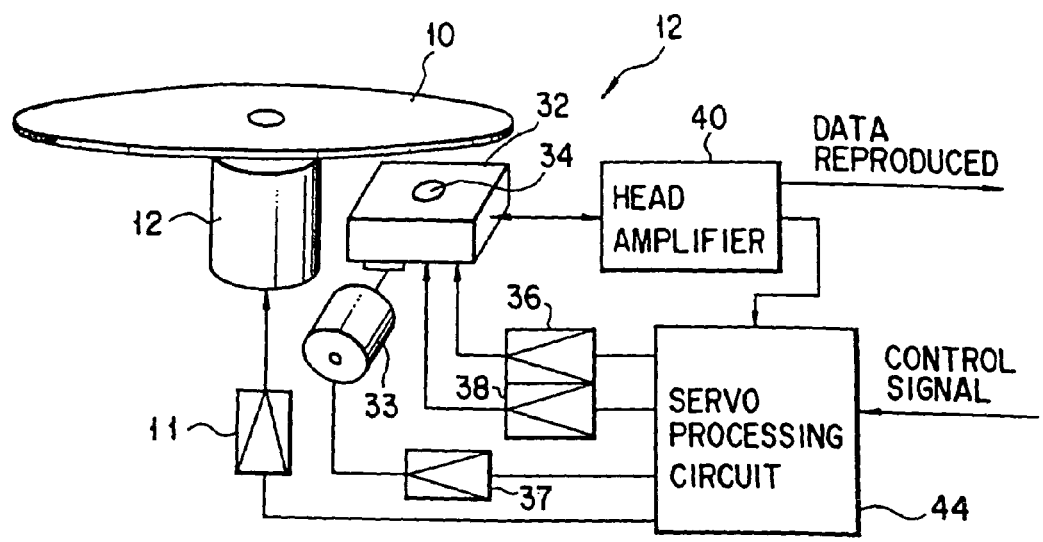
F I G. 2
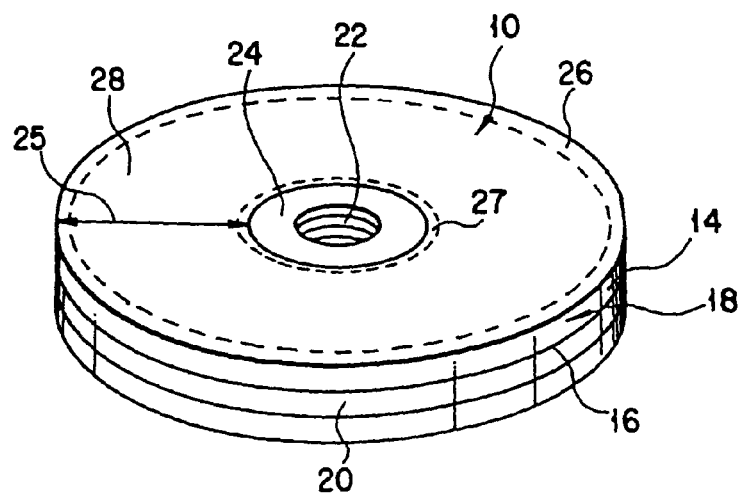
F I G. 3

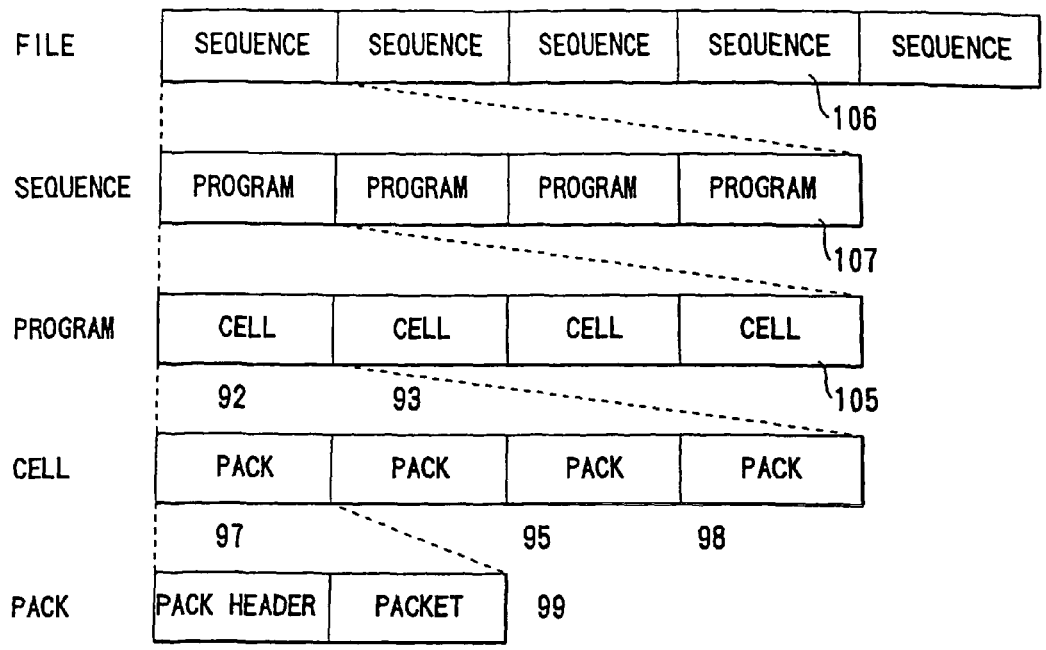
F I G. 7
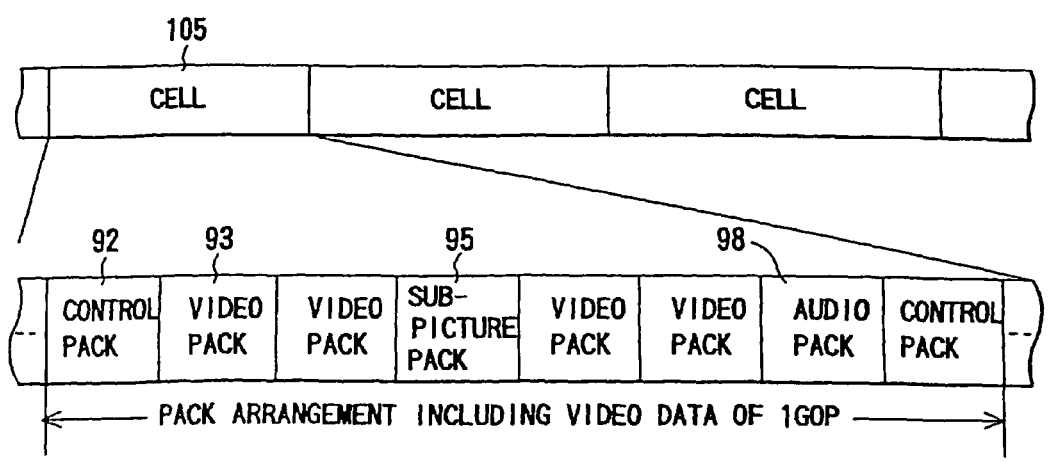
F I G. 8

CELL INFORMATION ( CI )

| PARAMETER | CONTENT |
|---|---|
| CCAT | CELL CATEGORY |
| CTIME | CELL REPRODUCTION TIME |
| CSLBN | CELL STARTING LOGICAL BLOCK NUMBER |
| CNLB | STRUCTURE LOGICAL BLOCK NUMBER |

F I G. 9

SEQUENCE INFORMATION ( SI )

| PARAMETER | CONTENT |
|---|---|
| SCAT | SEQUENCE CATEGORY |
| SNPRG | NUMBER OF STRUCTURE PROGRAMS |
| SNCEL | NUMBER OF STRUCTURE CELLS |
| STIME | SEQUENCE REPRODUCTION TIME |
| SCINF | SEQUENCE CONTROL INFORMATION |

F I G. 10

FILE MANAGEMENT TABLE ( FMT )

| PARAMETER | CONTENT |
|---|---|
| FFNAME | FILE NAME |
| FFID | FILE IDENTIFIER |
| FNSQ | TOTAL NUMBER OF SEQUENCES |
| FNCEL | NUMBER OF CELLS |
| FSASIT | SIT START ADDRESS |
| FSACIT | CIT START ADDRESS |
| FSAESI | SEQUENCE INFORMATION START ADDRESS |
| FSADVD | VIDEO DATA START ADDRESS |
| FNAST | NUMBER OF AUDIO STREAMS |
| FAATR | AUDIO STREAM ATTRIBUTE |

F I G. 11

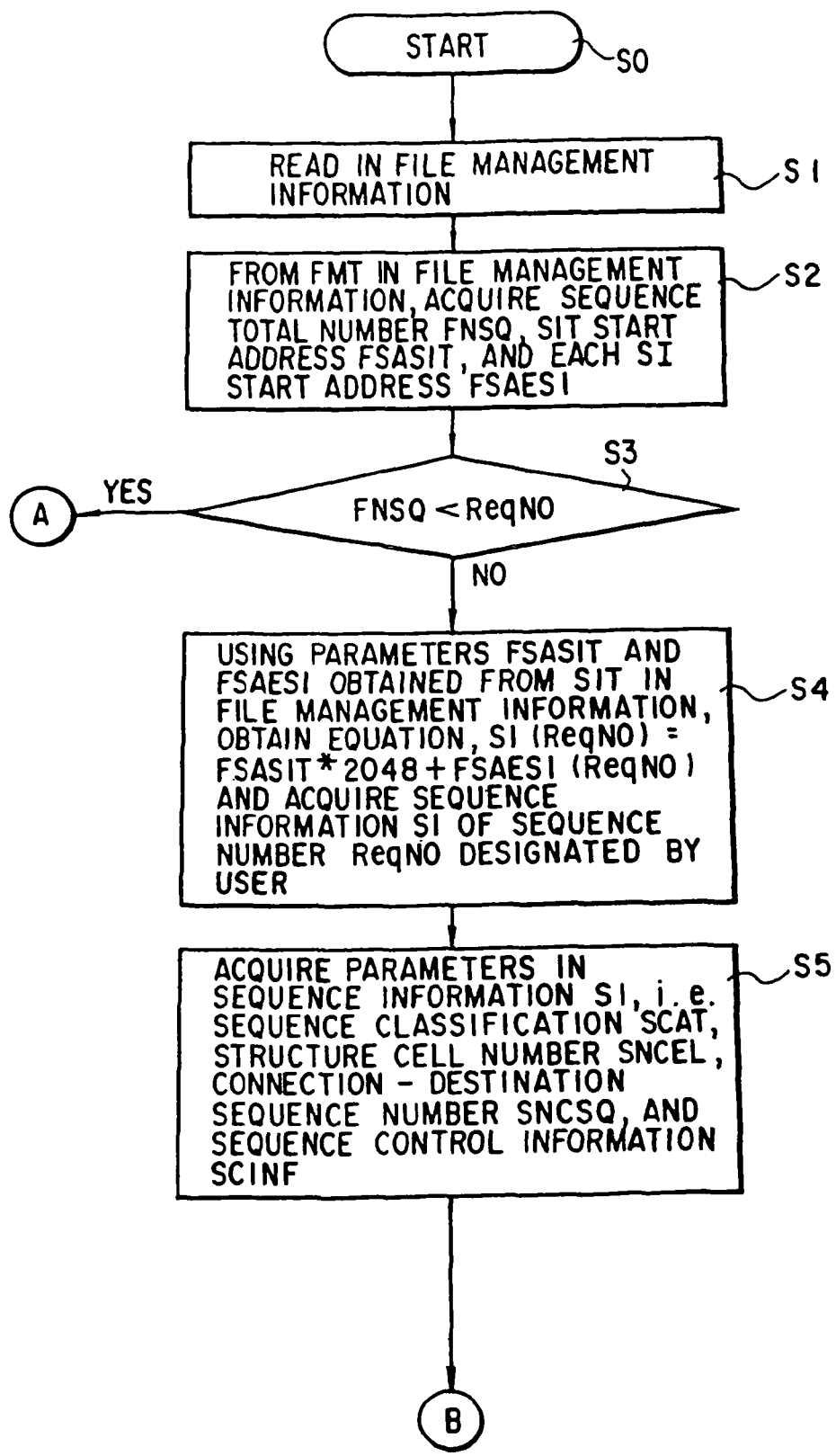
F I G. 12

CELL REPRODUCTION ORDER
LIST OF Seq-A

| #1 | CelNO#1 |
| #2 | CelNO#2 |
| #3 | CelNO#3 |
| #4 | CelNO#4 |
| #5 | CelNO#5 |

F I G.  22 A

CELL REPRODUCTION ORDER
LIST OF Seq-B

| #1 | CelNO#6 |
| #2 | CelNO#7 |
| #3 | CelNO#8 |

F I G.  22 B

CELL REPRODUCTION ORDER
LIST OF Seq-C

| #1 | CelNO#9 |
| #2 | CelNO#10 |
| #3 | CelNO#11 |
| #4 | CelNO#12 |

F I G.  22 C

CELL REPRODUCTION ORDER
LIST OF Seq-n

| #1 | CelNO#n |
| #2 | CelNO#n+1 |
| #3 | CelNO#n+2 |

F I G.  22 D

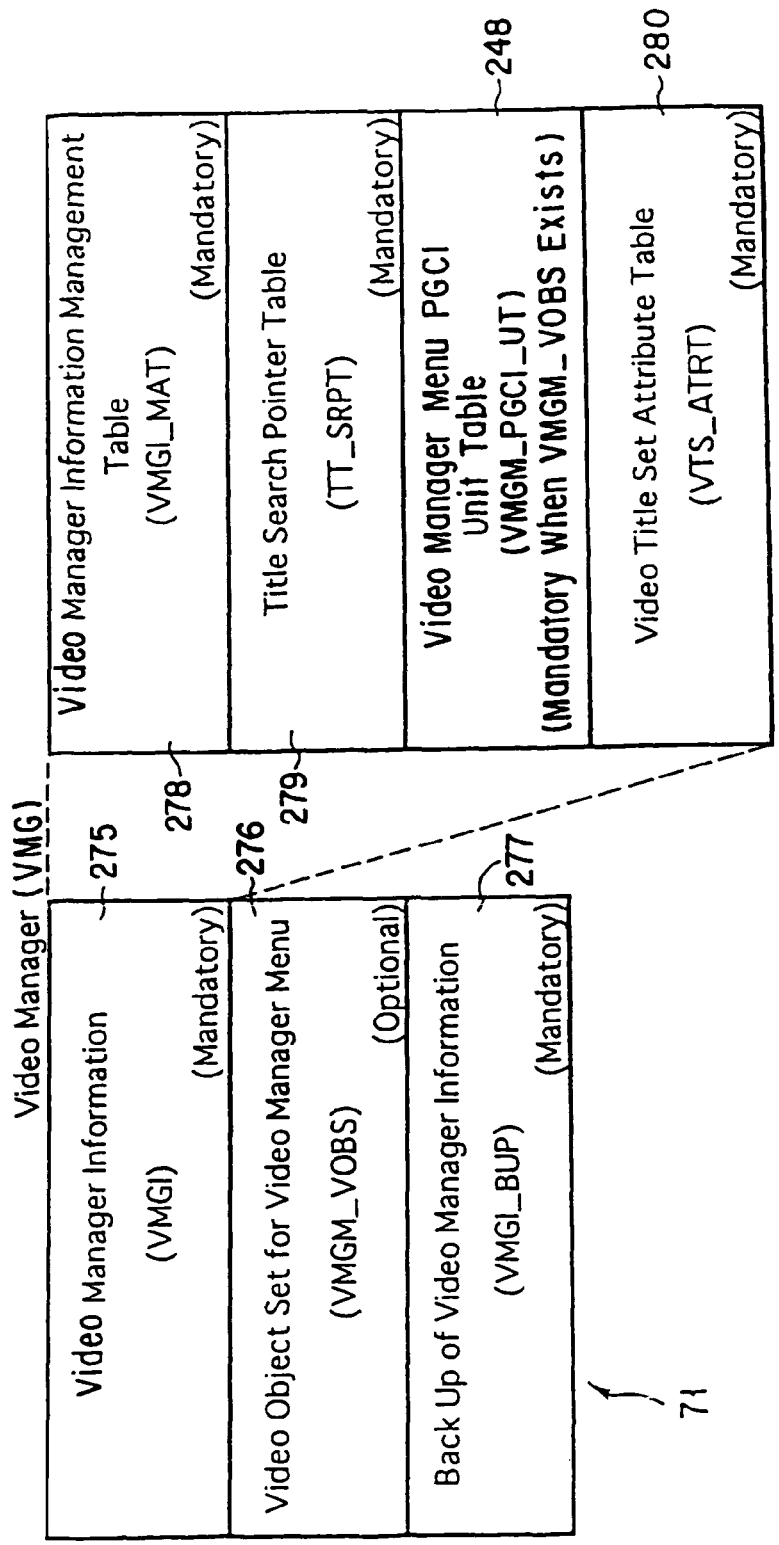
F I G. 27

| VMGI_MAT | Content | (Description order) |
|---|---|---|
| VMG_ID | Video Manager Identifier | |
| VMGI_SZ | Size of Video Manager Information | |
| VERN | Version Number of DVD Video Specification | |
| VMG_CAT | Video Manager Category | |
| VLMS_ID | Volume Set Identifier | |
| VTS_Ns | Number of Video Title Set | |
| PVR_ID | Provider Unique ID | |
| VMGI_MAT_EA | End Address of VMGI_MAT | |
| VMGM_VOBS_SA | Video Manager Menu Video Object Set Start Address | |
| TT_SRPT_SA | Start Address of TT_SRPT | |
| VMGM_PGCI_UT_SA | Start Address of VMGM_PGCI_UT | |
| VTS_ATRT_SA | Start Address of VTS_ATRT | |
| VMGM_V_ATR | Video Attribute of VMGM | |
| VMGM_AST_Ns | Number of Audio Stream of VMGM | |
| VMGM_AST_ATR | Audio Stream Attribute of VMGM | |
| VMGM_SPST_Ns | Number of Sub-picture Stream of VMGM | |
| VMGM_SPST_ATR | Sub-picture Stream Attribute of VMGM | |

TT_SRPT

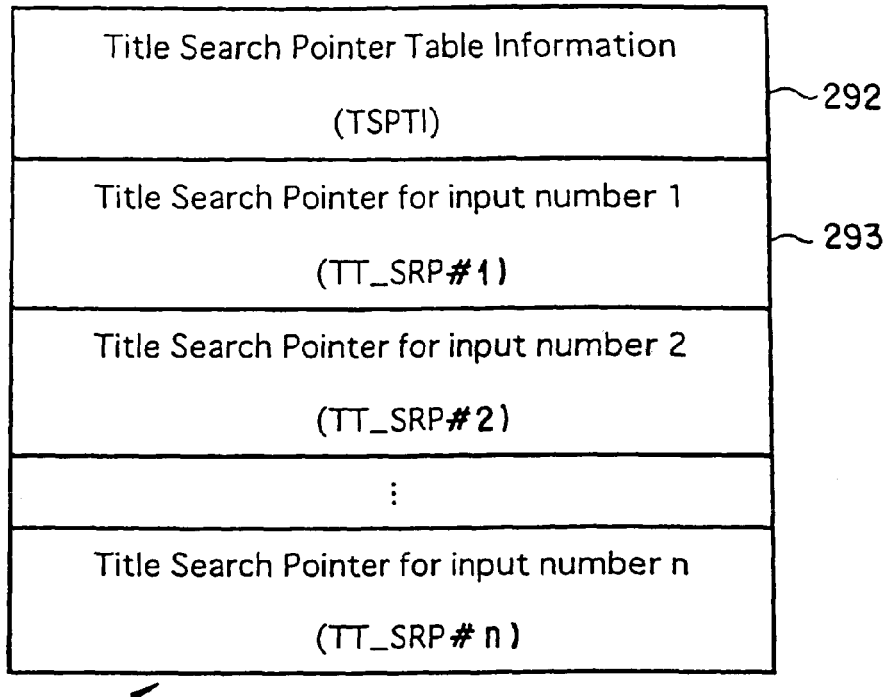

| Title Search Pointer Table Information (TSPTI) | ~292 |
| Title Search Pointer for input number 1 (TT_SRP#1) | ~293 |
| Title Search Pointer for input number 2 (TT_SRP#2) | |
| ⋮ | |
| Title Search Pointer for input number n (TT_SRP#n) | |

279

F I G. 30

| TT_SRPTI | (Description order) |
|---|---|
|  | Contents |
| EN_PGC_Ns | Number of Entry PGC |
| TT_SRPT_EA | End Address of TT SRPT |

F I G. 31

| TT_SRP | (Description order) |
|---|---|
|  | Contents |
| VTS | Video Title Set Number |
| PTT_Ns | Number of Part of Title |
| VTSN | VTS Number |
| VTS_TTN | VTS Title Number |
| VTS_SA | Start Address of Video Title Set |

F I G. 32

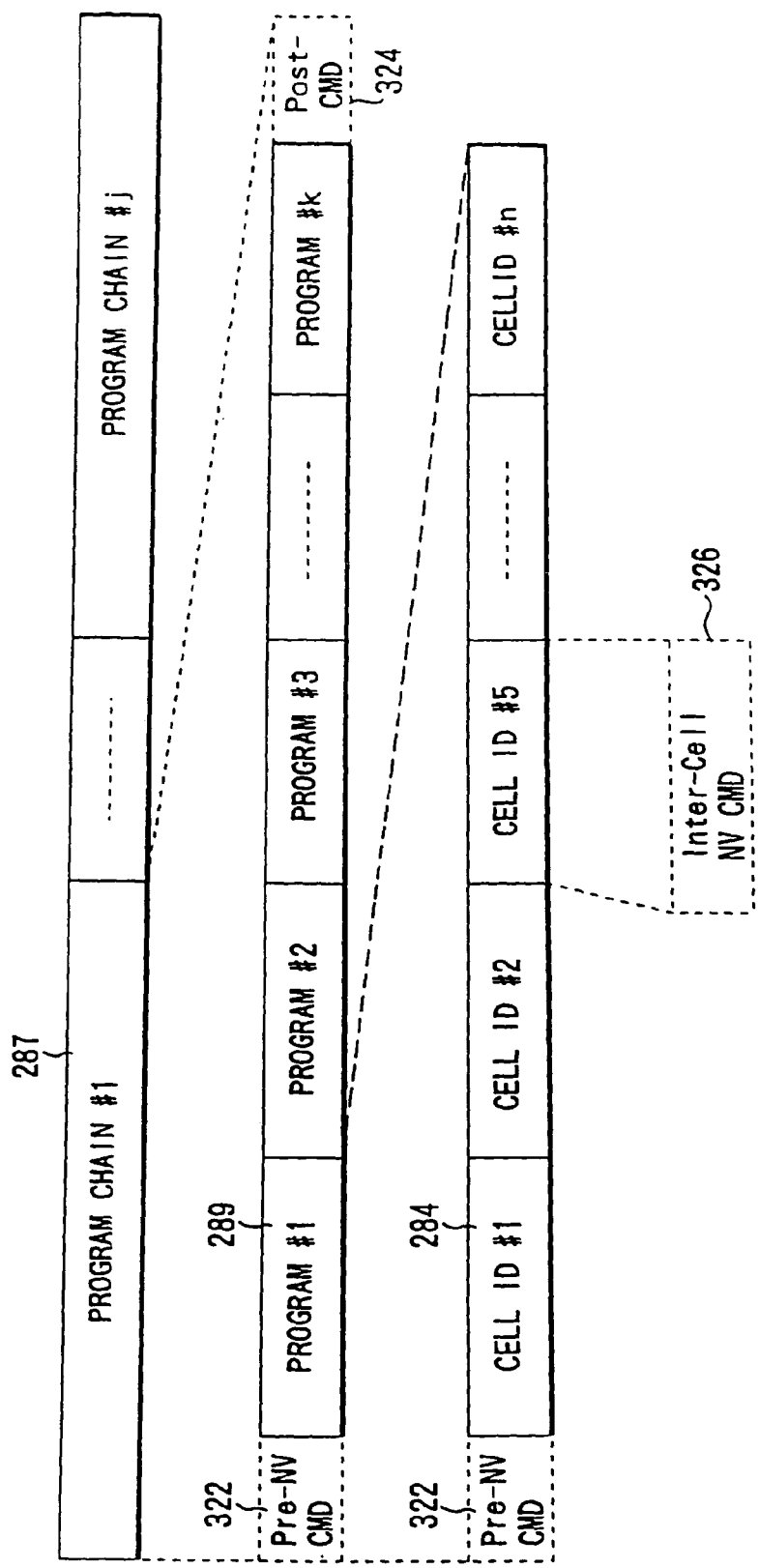
F I G. 33

| VMGM_PGCI_UTI | |
|---|---|
| | Contents |
| VMGM_LU_Ns | Number of Video Maneger Menu Language Units |
| VMGM_PGCI_UT_EA | End Address of VMGM_PGCI_UT |

| VMGM_LU_SRP | |
|---|---|
| | Contents |
| VMGM_LCD | Video Manager Menu Language Code |
| VMGM_LU_SA | Start Address of VMGM_LU |

VMGM_LU

| | |
|---|---|
| Video Manager Menu Language Unit Information (VMGM_LUI) | ~253 |
| VMGM_PGCI Search Pointer #1 (VMGM_PGCI_SRP#1) | ~254 |
| ⋮ | |
| VMGM_PGCI Search Pointer #n (VMGM_PGCI_SRP#n) | |
| Video Manager Menu Program Chain Information (VMGM_PGCI) | ~255 |
| ⋮ | |
| Video Manager Menu Program Chain Information (VMGM_PGCI) | |

F I G. 37

VMGM_LUI

| | Contents |
|---|---|
| VMGM_PGCI_Ns | Number of VMGM_PGCIs |
| VMGM_LUI_EA | End Address of VMGM_LUI |

F I G. 38

VMGM_PGCI_SRP

| | Contents |
|---|---|
| VMGM_PGC_CAT | VMGM_PGC Category |
| VMGM_PGCI_SA | Start Address of VMGM_PGCI |

F I G. 39

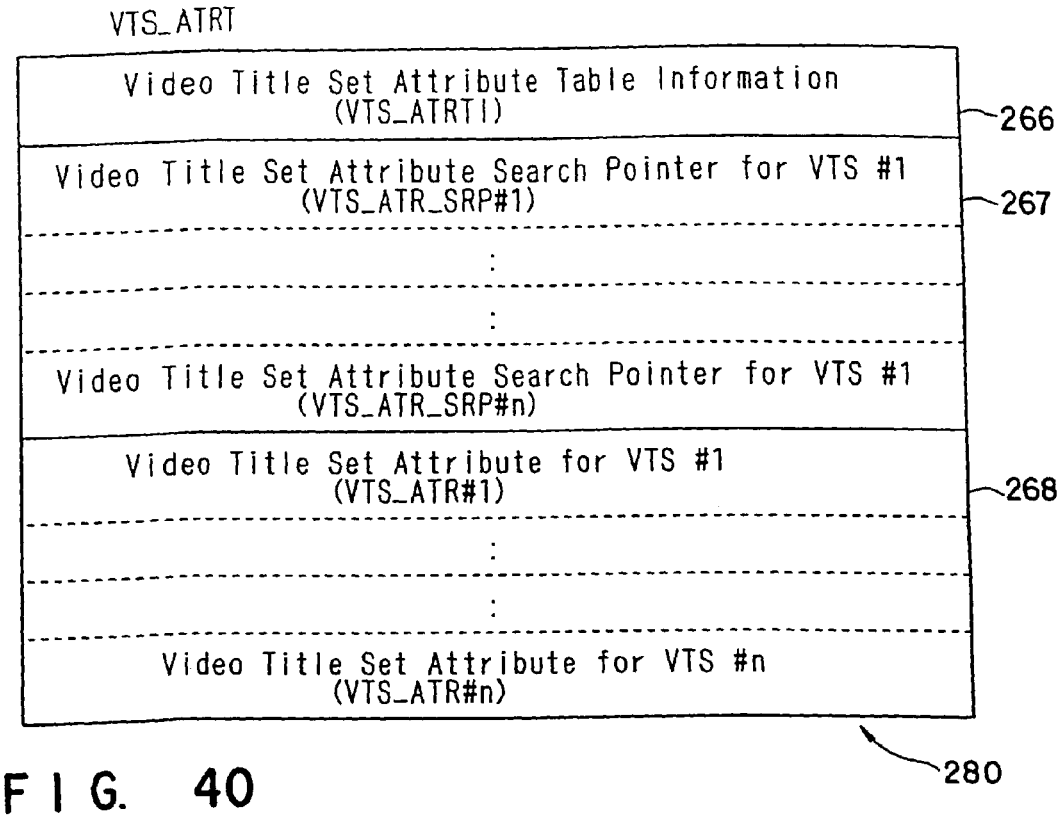
F I G. 40
| VTS_ATRTI | |
|---|---|
| | Contents |
| VTS_Ns | Number of VTSs |
| VTS_ATRT_EA | End Address of VTS_ATRT |
F I G. 41
| VTS_ATR_SRP | |
|---|---|
| | Contents |
| (1)VTS_ATR_SA | Start Address of VTS_ATR |
F I G. 42
| VTS_ATR | |
|---|---|
| | Contents |
| VTS_ATR_EA | End Address of VTS_ATR |
| VTS_CAT | Video Title Set Category |
| VTS_ATRI | Video Title Set Attribute Information |
F I G. 43

| VTSI_MAT | Contents |
|---|---|
| VTS_ID | VTS Identifier |
| VTSI_SZ | Size of the VTSI |
| VERN | Version Number of DVD Video Specification |
| VTS_CAT | VTS Category |
| VTSI_MAT_EA | End Address of VTSI_MAT |
| VTSM_VOBS_SA | Start Address of VTSM_VOBS |
| VTSTT_VOBS_SA | Start Address of VTSTT_VOB |
| VTS_PTT_SRPT_SA | Start Address of VTS_PTT_SRPT |
| VTS_PGCIT_SA | Start Address of VTS_PGCIT |
| VTSM_PGCI_UT_SA | Start Address of VTSM_PGCI_UT |
| VTS_TMAPTI_SA | Start Address of VTS_TMAPTI |
| VTS_C_ADT_SA | Start Address of Cell Address Table |
| VTS_VOBU_ADMAP_SA | Start Address of VOBU Address Map |
| VTSM_V_ATR | Video Attribute of VTSM |
| VTSM_AST_Ns | Number of Audio Streams of VTSM |
| VTSM_AST_ATR | Audio Stream Attribute of VTSM |
| VTSM_SPST_Ns | Number of Sub-Picture Streams of VTSM |
| VTSM_SPST_ATR | Sub-Picture Stream Attribute of VTSM |
| VTS_V_ATR | Video Attribute of VTS |
| VTS_AST_Ns | Number of Audio Stream of VTS |
| VTS_AST_ATR | Audio Stream Attribute of VTS |
| VTS_SPST_Ns | Number of Sub-Picture Streams of VTS |
| VTS_SPST_ATR | Sub-Picture Stream Attribute of VTS |
| VTS_MU_AST_ATR | Multichannel Audio Stream Attribute of VTS |

FIG. 45

| PTT_SRPTI | |
|---|---|
| | Contents |
| VTS_TTU_Ns | Number of TTU in VTS |
| VTS_PTT_SRPT EA | End Address of VTS PTT SRPT |

| TTU_SRP | |
|---|---|
| | Contents |
| (1)TTU_SA | Start Address of TTU |

| PTT_SRP | |
|---|---|
| | Contents |
| PGC_N | Program Chain Number |
| PG_N | Program Number |

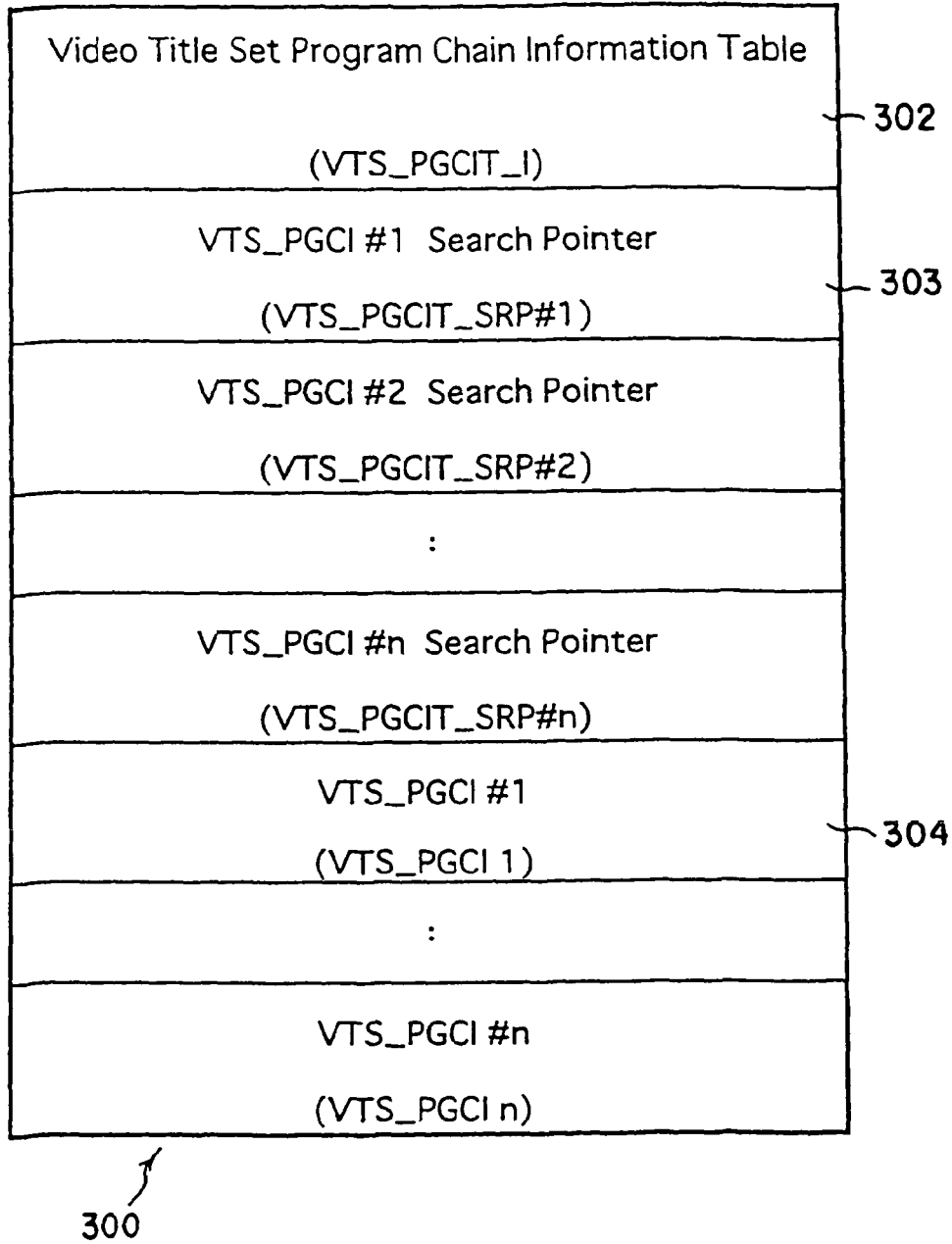
F I G. 50

VTS_PGCIT_I
| | (Description order) |
|---|---|
| | Content |
| VTS_PGC_Ns | Number of VTS_PGCs |
| VTS_PGCIT_EA | End Address of VTS_PGCCIT |
F I G. 51
VTS_PGCIT_SRP
| | (Description order) |
|---|---|
| | Content |
| VTS_PGC_CAT | PGC category |
| VTS_PGCI_SA | Start Address of VTS_PGC Information |
F I G. 52
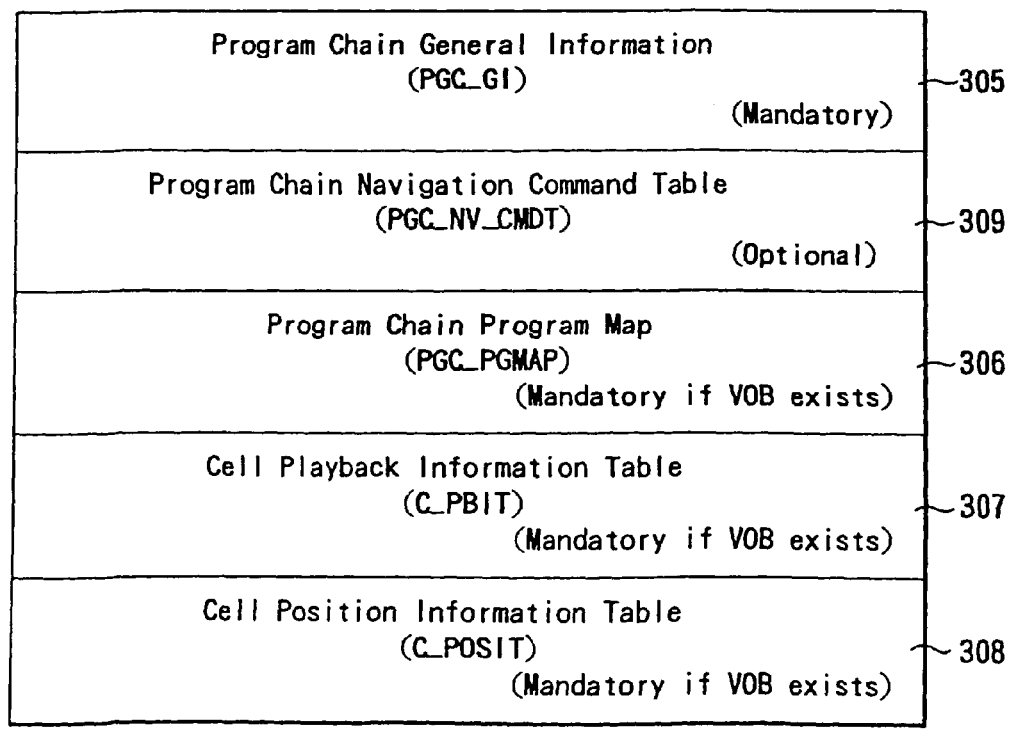
F I G. 53

PGC_GI

|  | Contents |
|---|---|
| PGC_CAT | PGC Category |
| PGC_CNT | PGC Contents |
| PGC_PB_TM | PGC Playback Time |
| PGC_UOP_CTL | PGC User Operation Control |
| PGC_SPST_CTL | PGC Sub-picture Stream Control |
| PGC_AST_CTL | PGC Audio Stream Control |
| PGC_NV_CTL | PGC Navigation Control |
| PGC_SP_PLT | PGC Sub-picture Palette |
| PGC_NV_CMDT_SA | Start Address of PGC_NV_CMDT |
| PGC_PGMAP_SA | Start Address of PGC_PGMAP |
| C_PBIT_SA | Start Address of C_PBIT |
| C_POSIT_SA | Start Address of C_POSIT |

F I G. 54

| b63 | b62 | b61 | b60 | b59 | b58 | b57 | b56 |
|---|---|---|---|---|---|---|---|
| Reserved (0) | Next PGC Number (Upper Bits) ||||||||

| b55 | b54 | b53 | b52 | b51 | b50 | b49 | b48 |
|---|---|---|---|---|---|---|---|
| Next PGC Number (Lower Bits) ||||||||

| b47 | b46 | b45 | b44 | b43 | b42 | b41 | b40 |
|---|---|---|---|---|---|---|---|
| Reserved (0) | Previous PGC Number (Upper Bits) |||||||

| b39 | b38 | b37 | b36 | b35 | b34 | b33 | b32 |
|---|---|---|---|---|---|---|---|
| Previous PGC Number (Lower Bits) ||||||||

| b31 | b30 | b29 | b28 | b27 | b26 | b25 | b24 |
|---|---|---|---|---|---|---|---|
| Reserved (0) | GoUp PGC Number (Upper Bits) |||||||

| b23 | b22 | b21 | b20 | b19 | b18 | b17 | b16 |
|---|---|---|---|---|---|---|---|
| GoUp PGC Number (Lower Bits) ||||||||

| b15 | b14 | b13 | b12 | b11 | b10 | b9 | b8 |
|---|---|---|---|---|---|---|---|
| Loop Sum Total ||||||||

| b7 | b6 | b5 | b4 | b3 | b2 | b1 | b0 |
|---|---|---|---|---|---|---|---|
| Still Time Value ||||||||

F I G. 55

| PGC_NV_CMDTI | |
|---|---|
| | Contents |
| (1) PRE_NV_CMD_SA | Start Address of PRE NV CMD |
| (2) POST_NV_CMD_SA | Start Address of POST NV CMD |
| (3) IC_NV_CMD_SA | Start Address of IC NV CMD |

| PRE_NV_CMD | |
|---|---|
| | Contents |
| PRE_NV_CMD | Pre-Process Navigation Command |

| POST_NV_CMD | |
|---|---|
| | Contents |
| POST_NV_CMD | Post-Process Navigation Command |

| IC_NV_CMD | |
|---|---|
| | Contents |
| IC_NV_CMD | Inter-Cell Navigation Command |

| Entry Cell Number | |
|---|---|
| | Content |
| ECELLN | Entry Cell Number |

C_PBIT
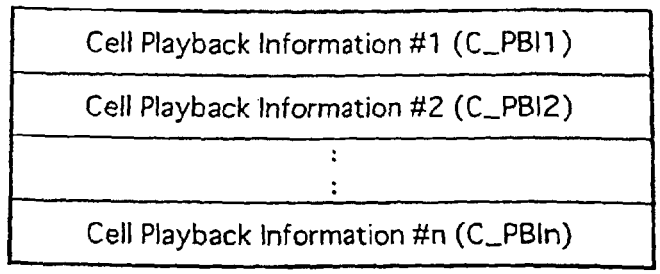
FIG. 63
C_PBI
| | Content |
|---|---|
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
FIG. 64
C_POSIT
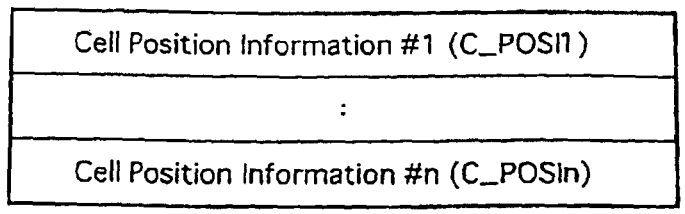
FIG. 65
C_POSI
| | Content |
|---|---|
| C_VOB_IDN | VOB ID Number of Cell |
| C_IDN | Cell ID Number of the Cell |
FIG. 66

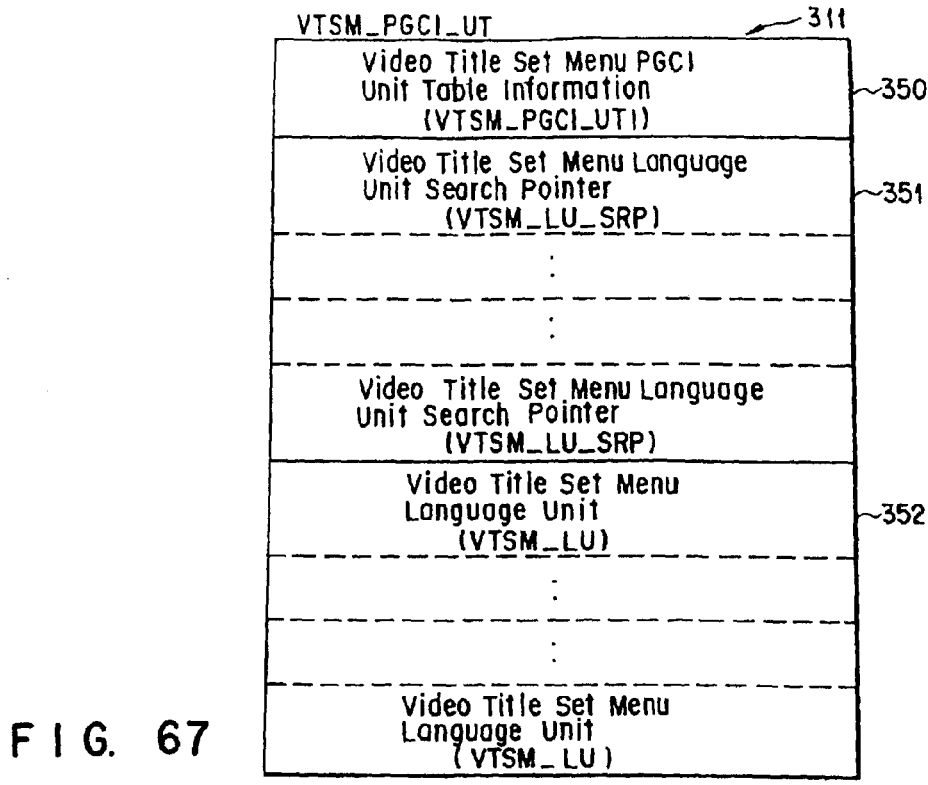
F I G. 67
| VTSM_PGCI_UTI | |
|---|---|
| | Contents |
| VTSM_LU_Ns | Number of Video Title Set Menu Language Units |
| VTSM_PGCI_UT_EA | End Address of VTSM_PGCI_UT |
F I G. 68
| VTSM_LU_SRP | |
|---|---|
| | Contents |
| VTSM_LCD | Video Title Set Menu Language Code |
| VTSM_LU_SA | Start Address of VTSM_LU |
F I G. 69

| VTSM_LUI | |
|---|---|
| | Contents |
| VTSM_PGC_Ns | Number of VTSM_PGCs |
| VTSM_LU_EA | End Address of VTSM_LU |

| VTSM_PGCI_SRP | |
|---|---|
| | Contents |
| VSTM_PGC_CAT | VTSM_PGC Category |
| VTSM_PGCI_SA | Start Address of VTSM_PGCI |

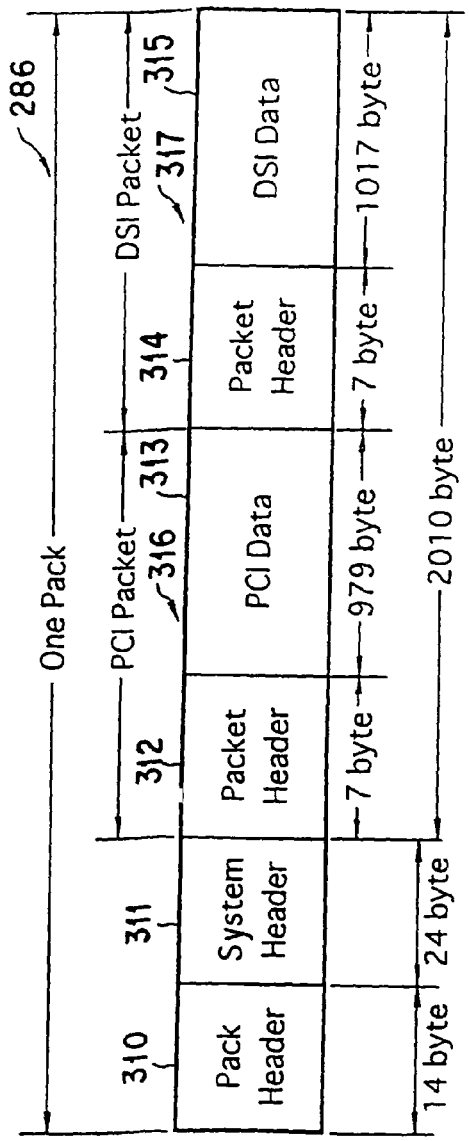
F I G. 73
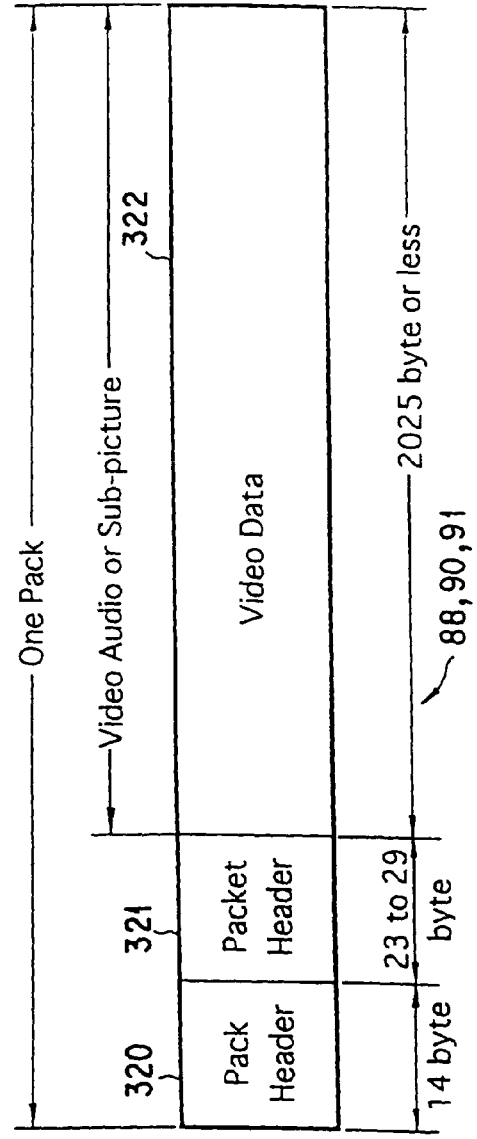
F I G. 74

FIG. 75

| PCI | |
|---|---|
| | Content |
| PCI_GI | PCI General Information |
| NSMLS_ANGLI | Angle Information |

FIG. 76

| PCI_GI | |
|---|---|
| | Content |
| NV_PCK_LBN | LBN of NV Pack |
| VOBU_CAT | Category of VOBU |
| VOBU_S_PTM | Start PTM of VOBU |
| VOBU_E_PTM | End PTM of VOBU |

| DSI | |
|---|---|
| | Content |
| DSI_GI | DSI General Information |
| SML_PBI | Seamless Playback Information |
| SML_AGLI | Angle Information |
| NV_PCK_ADI | Navigation Pack Address Information |
| SYNCI | Synchronus Playback Information |

FIG. 77

| DSI_GI | |
|---|---|
| | Content |
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

FIG. 78

| SYNCI | |
|---|---|
| | Content |
| A_SYNCA 0 to 7 | Target Audio Pack Address |
| SP_SYNCA 0 to 31 | VOBU Start Address of Target SP pack |

FIG. 79

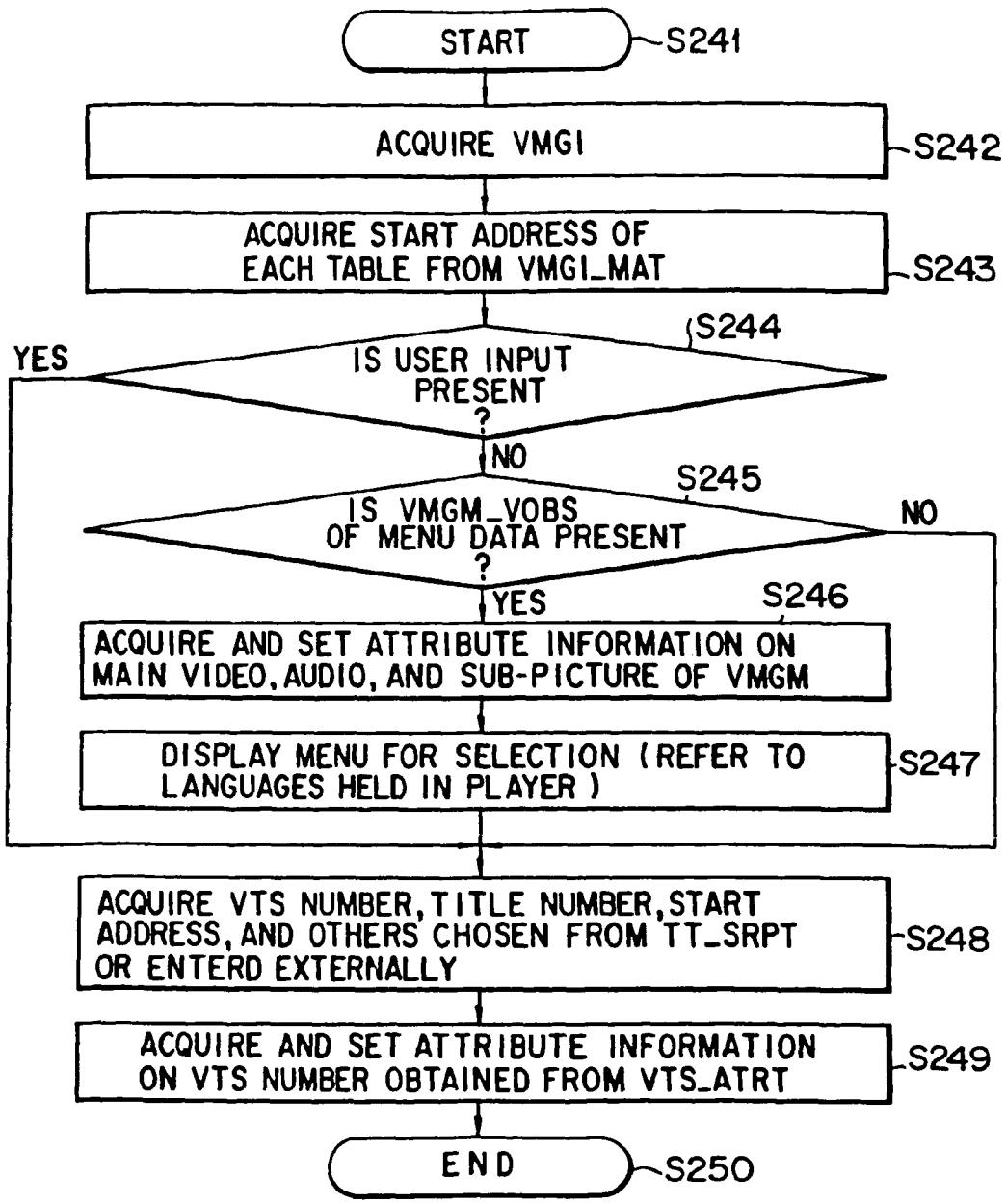
F I G. 80

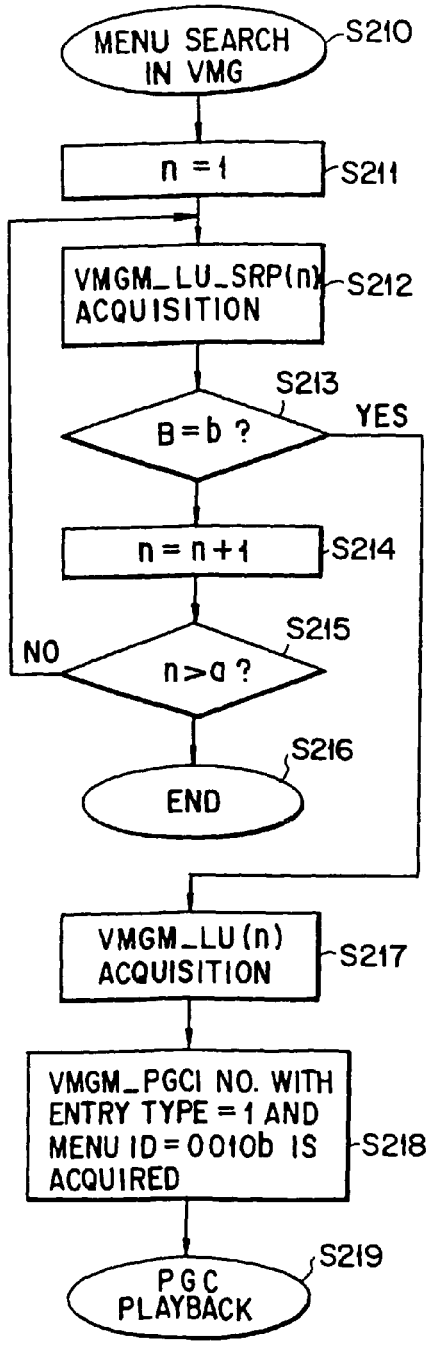
F I G. 81
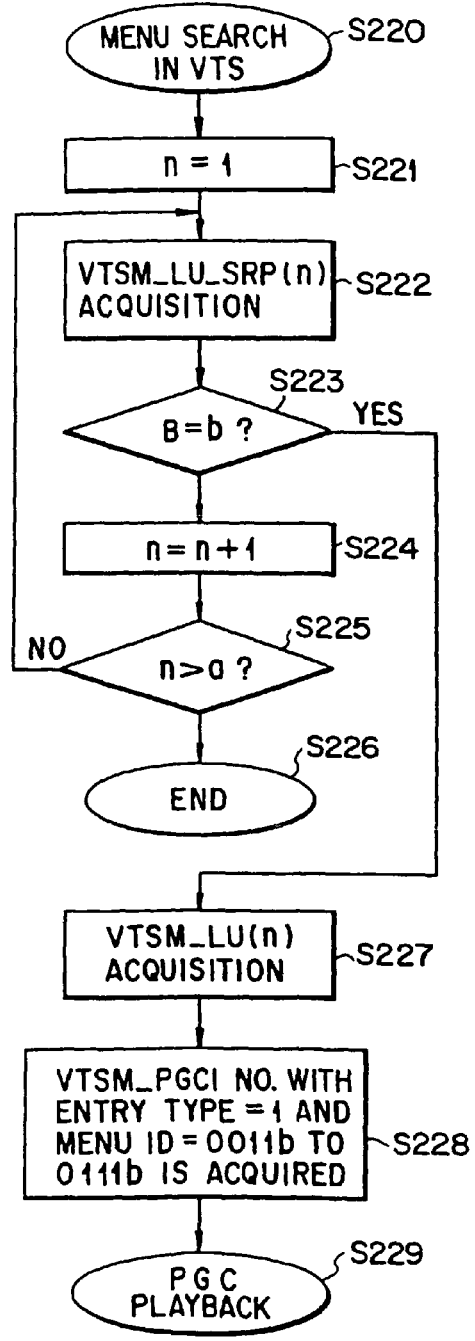
F I G. 83

```
        INTERACTIVE MOVIE SERIES

1 MR. X'S LIFE

2 MRS. Y'S LIFE
```

FIG. 82

```
          MR. X'S LIFE
       (INTERACTIVE MOVIE SERIES)

1. INFANCY

2. YOUTH

3. MIDDLE AGE

4. OLD AGE
```

FIG. 84

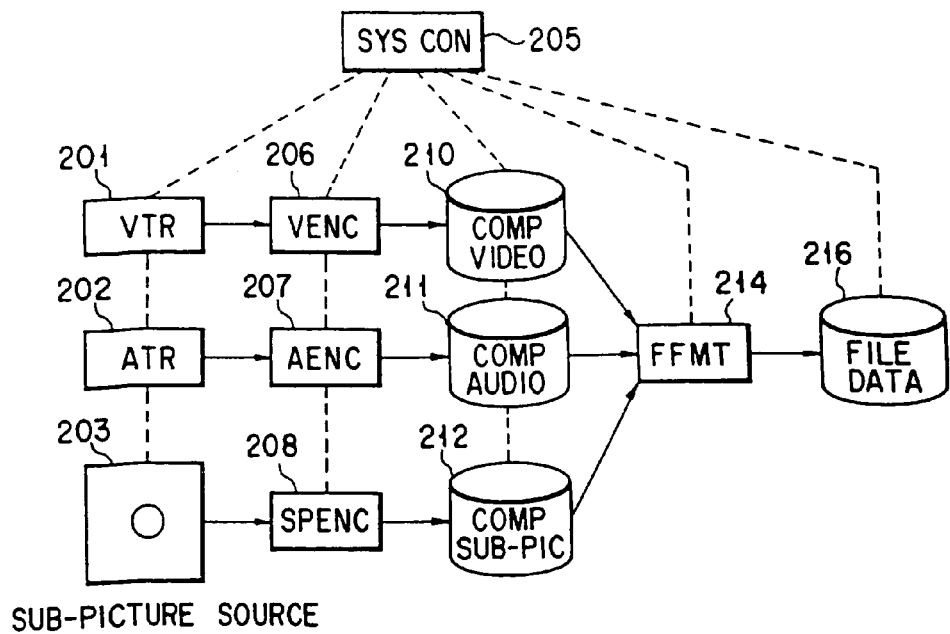
F I G. 88
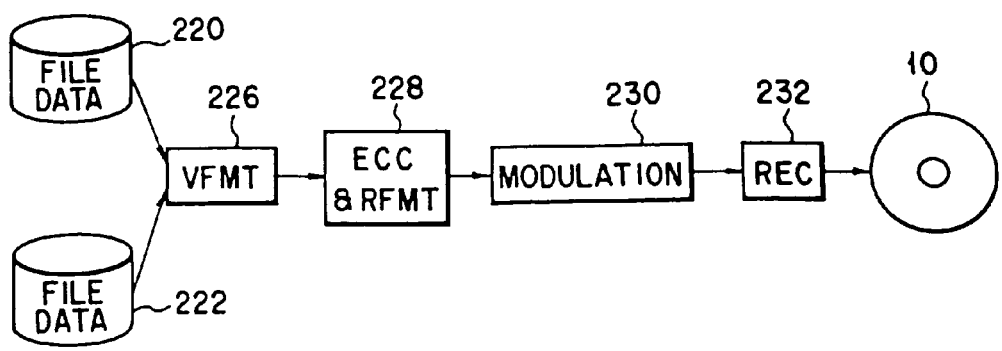
F I G. 91

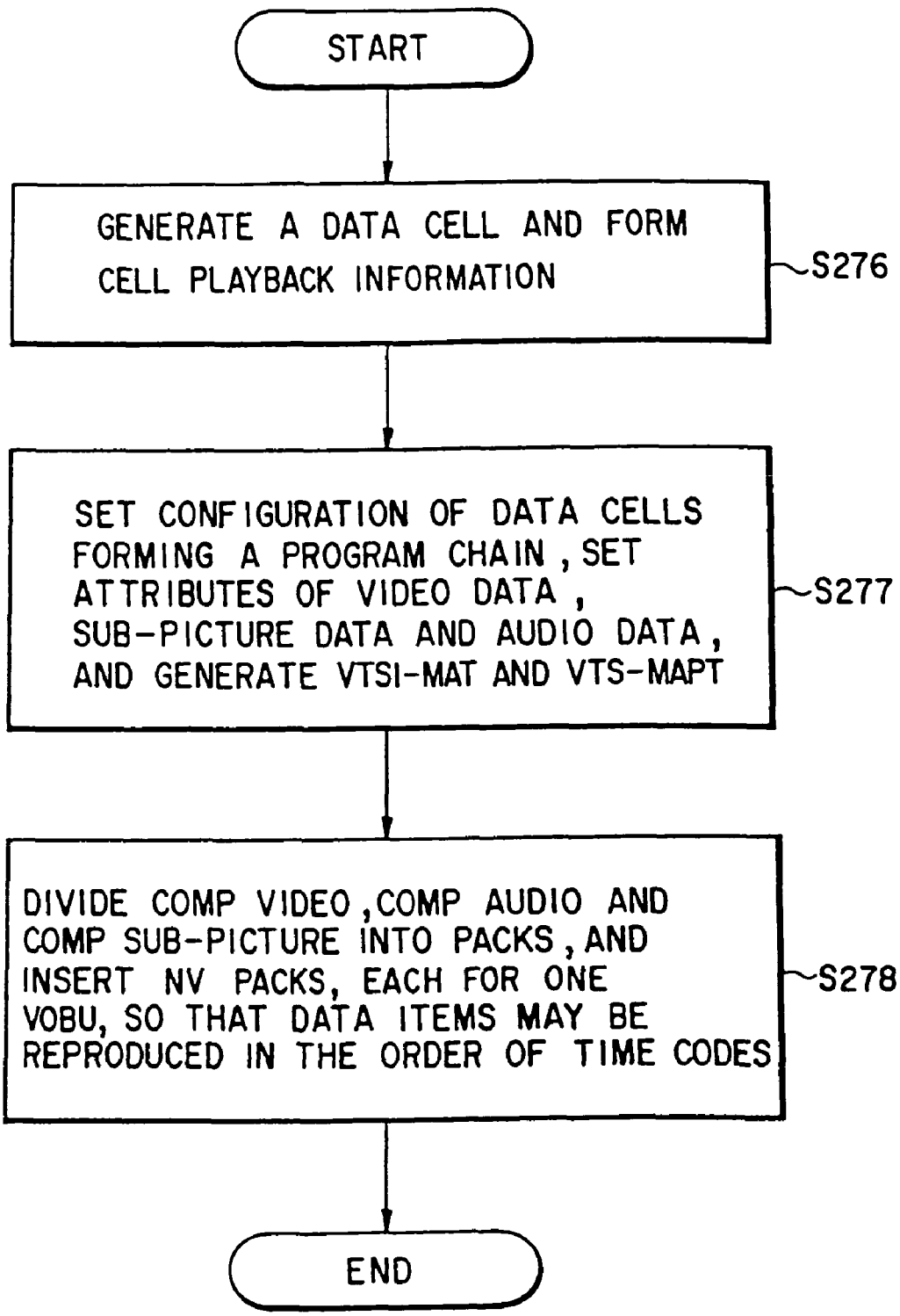
F I G. 90

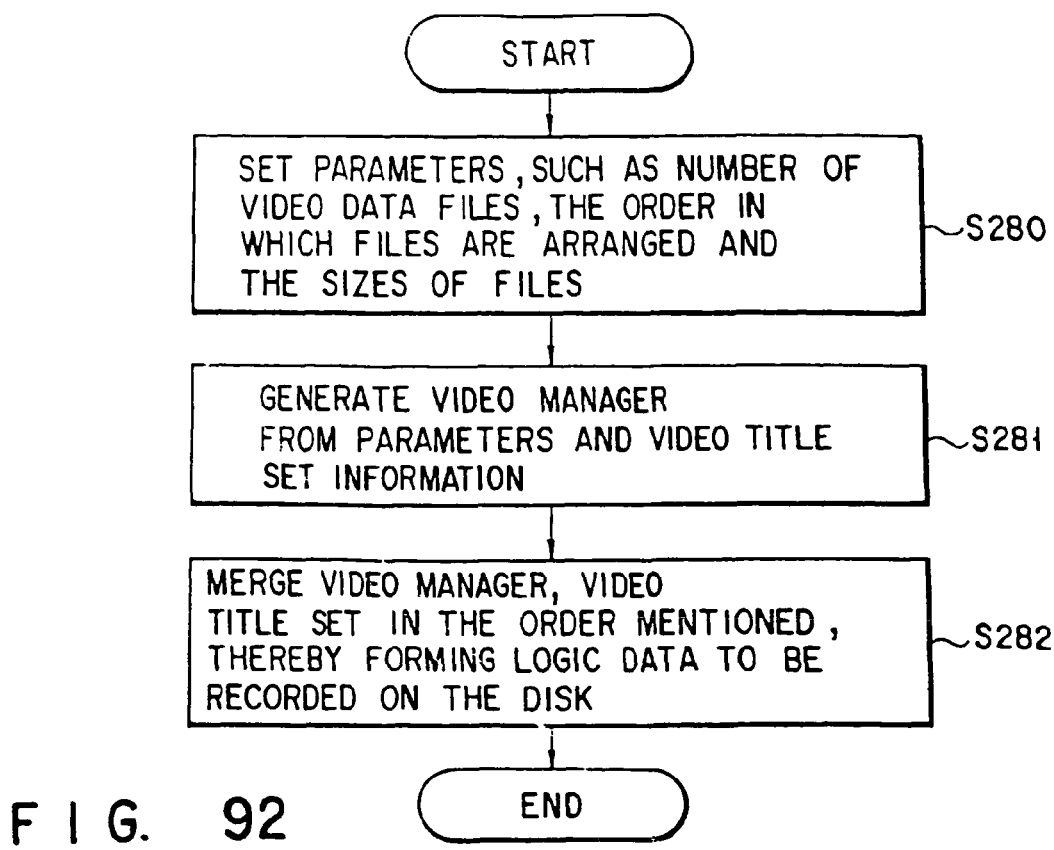
F I G. 92
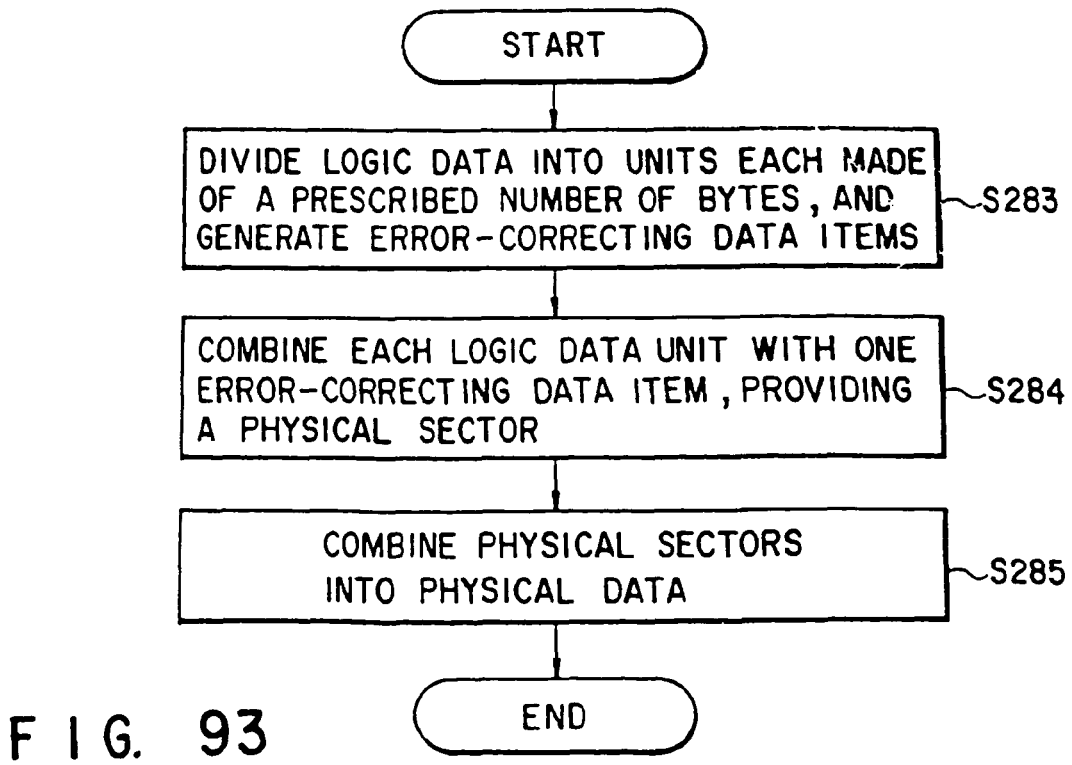
F I G. 93

RECORDING MEDIUM CAPABLE OF INTERACTIVE REPRODUCING AND REPRODUCTION SYSTEM FOR THE SAME

CROSS REFERENCE TO RELATED APPLICATIONS

This application is a continuation of U.S. application Ser. No. 11/018,549, filed on Dec. 22, 2004 now U.S. Pat. No. 7,203,414, and for which priority is claimed under 35 U.S.C. §120. U.S. application Ser. No. 11/018,549 is a divisional of U.S. application Ser. No. 09/609,247, filed on Jun. 30, 2000, now U.S. Pat. No. 6,895,171, which is a continuation of U.S. application Ser. No. 08/631,436, filed Apr. 12, 1996, now U.S. Pat. No. 6,167,189, for which priority is claimed under 35 U.S.C. §121 & 35 U.S.C. §120. This application is based upon and claims the benefit of priority under 35 U.S.C. §119 from the prior Japanese Patent Application No. 07-114017, filed on Apr. 14, 1995.

The entire contents of each of the above-identified applications for which priority is claimed is incorporated herein by reference in its entirety.

BACKGROUND OF THE INVENTION

1. Field of the Invention

The present invention relates to a large-capacity recording medium, a method of reproducing information from the large-capacity recording medium, a reproducing apparatus for reproducing information from the large-capacity recording medium, a method of recording information in the large-capacity recording medium, and a recording apparatus for recording information in the large-capacity recording medium. In particular, this invention relates to an optical disk on which reproduction information, such as at least one movie, a plurality of selectable languages associated with this movie, a plurality of sub-pictures and a number of audio streams, are recorded at high density thereon and from which selected reproduction information can be reproduced in an interactive environment, a method and an apparatus for selectively reproducing the reproduction information from the optical disk, and a method and an apparatus for recording the reproduction information on the optical disk at high density.

2. Description of the Related Art

Recently, with a progress in data compression technology and high-density recording technology, a high-density recording type optical disk has been developed as a recording medium capable of storing a great amount of data. This type of recording medium is able to store not only audio data but also video data as reproduction data, as well as video data and audio data of plural titles in the near future. Since this recording medium has a large memory capacity, it can store not only video data of a pre-designated single story or audio data of a single arrangement, but also video data of multiple stories or audio data of multiple arrangement which can be selected by the user. Thus, an interactive environment will be provided in the near future.

In an example of multi-story video data, the user positively selects a scene development of a movie or a program and reproduces selected scenes successively, thereby making it possible that the story is developed diversely according to the user's preference. Specifically, an ordinary movie story has a plot of "introduction," "development," "turn," and "conclusion." For example, the reproduced movie begins with a portion of the story, i.e. a segment story, corresponding to the "introduction." A plurality of segment stories, e.g. two segment stories, are prepared as "development" segment stories. Further, a plurality of segment stories, e.g. two segment stories, are prepared as "turn" segment stories corresponding to each "development" segment story. Thus, four "turn" segment stories are prepared in total. Then, a plurality of segment stories, e.g. two segment stories, are prepared as "conclusion" segment stories corresponding to each "turn" segment story. Thus, eight "conclusion" segment stories are prepared in total. In this example, the user can select a desired segment story at each change point of the story, thus enjoying different scene developments.

Besides, a quiz program may be produced in the multi-story structure. Thereby, a quiz program with different levels of difficulty can be produced. In particular, a quiz program focused on a field of questions in which the user is interested can be produced. In the case of a fortune-telling program, a result of the fortune-telling may be displayed according to "YES/NO" of the user and/or the date of birth of the user. In an example of multi-arrangement audio data, a "solo" sound scene or a "ensemble" sound scene may be selected in a specific movement of an orchestra music.

Regarding the recording medium on which the multi-story video data or multi-arrangement audio data is recorded as reproduction data, selection information or branch information for selecting a certain segment story following a preceding subsequent segment story is, in general, not recorded on the medium itself but on special application software. The application software associates the recorded contents with the branch information, and the branch information is selected based on the application software. Thus, an exclusive-use application program is needed for each recording medium. In other words, even if recording mediums are common, an exclusive-use application program must be developed according to the data recorded on each recording medium.

There is a recording medium of the type in which the branch information or selection information is recorded on the recording medium itself. In this recording medium, branch information or selection information is stored in a specific region of the recording medium. The specific region is always referred to read out the branch information or selection information. In this type of recording medium, along time may be needed to access the selection information. Besides, when the recorded data is re-recorded on another recording medium and the re-recorded data is reproduced, the branch information or selection information may be lost, resulting in a problem of reproduction.

SUMMARY OF THE INVENTION

A first object of the invention is to provide a recording medium in which selectable items or movie stories are recorded, the selectable items or movie stories being capable of being reproduced in accordance with a user's demand in an interactive environment.

A second object of the invention is to provide a method of and apparatus for reproducing data from a recording medium in which selectable items or movie stories are recorded, the selectable items or stories being capable of being reproduced in accordance with a user's demand in an interactive environment.

A third object of the invention is to provide a method of and apparatus for producing data in which selectable items or movie stories are recorded, the selectable items or stories being capable of being reproduced in accordance with a user's demand in an interactive environment.

A fourth object of the invention to a recording medium in which reproducing data including selectable items or movie stories and management data are recorded, the selectable items or movie stories being capable of being reproduced with reference to the management data in accordance with a user's demand in an interactive environment.

A fifth object of the invention is to provide an apparatus for reproducing data from a recording medium in which reproducing data including selectable items or movie stories and management data are recorded, the selectable items or stories being capable of being reproduced with reference to the management data in accordance with a user's demand in an interactive environment.

A sixth object of the invention is to provide a method of producing data in which reproducing data including selectable items or movie stories and management data are recorded, the selectable items or stories being capable of being reproduced with reference to the management data in accordance with a user's demand in an interactive environment.

A seventh object of the invention is to provide a communication system for transferring reproduction data with management data, in which selectable items or movie stories are recorded, the selectable items or stories being capable of being reproduced in accordance with a user's demand in an interactive environment.

According to first aspect of the invention, there is provided a recording medium comprising:
a data area in which
a first data arrangement containing a plurality of video data cells in each of which video data has been stored and
first management information for managing the first data arrangement and includes first cell playback information specifying the playback order of video data cells in the first data arrangement and first content information on the contents of the first data arrangement have been recorded.

according to second aspect of the invention, there is provided a method of reproducing video data cells from a recording medium having a data area in which a first data arrangement containing a plurality of video data cells in each of which video data has been stored and first management information that is for managing the first data arrangement and includes first cell playback information specifying the playback order of video data cells in the first data arrangement and first content information on the contents of the first data arrangement, have been recorded, the method comprising the steps of:
Acquiring the first content information and setting a playback state according to the first content information; and
acquiring the first cell playback information and reproducing video data cells according to the first cell playback information.

According to third aspect of the invention, there is provided an apparatus for reproducing video data cells from a recording medium having a data area in which a first data arrangement containing a plurality of video data cells in each of which video data has been stored and first management information that is for managing the first data arrangement and includes first cell playback information specifying the playback order of video data cells in the first data arrangement and first content information on the contents of the first data arrangement, have been recorded, the apparatus comprising:
means for searching the recording medium for the first management information and the first data arrangement;
means for storing the read-out first management information;
means for setting a playback state according to the first content information in the first management information;

means for transferring video data cells in the first data arrangement according to the first cell playback information in the first management information; and
means for converting the transferred video data cells into video signals.

According to fourth aspect of the invention, there is provided a recording method comprising the steps of:
creating a first data arrangement containing a plurality of video data cells in each of which video data has been stored;
creating first management information that is for managing the first data arrangement and includes first cell playback information specifying the playback order of video data cells in the first data arrangement and first content information on the contents of the first data arrangement; and
recording the first management information in a first segment area of the data area on a recording medium and the first data arrangement in a second segment area different from the first segment area of the data area on the recording medium.

According to fifth aspect of the invention, there is provided a recording apparatus comprising:
means for creating not only a first data arrangement containing a plurality of video data cells in each of which video data has been stored, but also first management information that is for managing the first data arrangement and includes first cell playback information specifying the playback order of video data cells in the first data arrangement and first content information on the contents of the first data arrangement; and
means for recording not only the first management information in a first segment area of the data area on a recording medium, but also the first data arrangement in a second segment area different from the first segment area of the data area on the recording medium.

According to sixth aspect of the invention, there is provided a communication system for transferring playback data with navigation data, comprising:
means for creating not only a first data arrangement containing a plurality of video data cells in each of which video data pack and audio data packs, each containing compressed and packed data, have been stored, but also first management information that is for managing the first data arrangement and includes first cell playback information specifying the playback order of video data cells in the data arrangement and first content information on the contents of the first data arrangement; and
means for transferring the first data arrangement after having transferred the first management information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram schematically showing an optical disk apparatus;

FIG. 2 is a block diagram showing details of the mechanism of a disk drive section shown in FIG. 1;

FIG. 3 is a perspective view schematically showing the structure of an optical disk shown in FIG. 1;

FIG. 7 is an explanatory view illustrating the hierarchical structure of a video data area of the file shown in FIG. 6;

FIG. 8 is an explanatory view showing 1 GOP (Group of Pictures) constituting a video cell shown in FIG. 7;

FIG. 9 is an explanatory view showing parameters described on a cell information table in a file management information area shown in FIG. 6;

FIG. 10 is an explanatory view showing parameters described on a sequence information table in the file management information area shown in FIG. 6;

FIG. 11 is an explanatory view showing parameters described on a file management table in the file management information area shown in FIG. 6;

FIG. 12 is a flowchart illustrating a completion-type sequence;

FIGS. 22A to 22D are explanatory views similarly showing the relationship between the cell information and sequence information;

FIG. 27 shows a structure of a video manager shown in FIG. 26;

FIG. 28 shows a structure of a video object set (VOBS) shown in FIG. 27;

FIG. 29 shows parameters and contents of a volume manager information management table (VMGI_MAT) in the video manager (VMGI) shown in FIG. 27;

FIG. 30 shows a structure of a title search pointer table (TSPT) in the video manager (VMGI) shown in FIG. 27;

FIG. 31 shows parameters and contents of title search pointer table information (TSPTI) of the title search pointer table (TSPT) shown in FIG. 30;

FIG. 32 shows parameters and contents of a title search pointer (TT_SRP) corresponding to an input number of the title search pointer table (TSPT) shown in FIG. 30;

FIG. 33 is a view for describing the structure of a program chain stored in the file;

FIG. 37 shows a structure of a video manager menu language unit shown in FIG. 34;

FIG. 38 shows parameters and contents of video manager menu language unit information shown in FIG. 37;

FIG. 39 shows parameters and contents of video manager menu program chain information shown in FIG. 37;

FIG. 40 shows a structure of a video title set attribute table shown in FIG. 27;

FIG. 41 shows parameters and contents of video title set attribute table information shown in FIG. 40;

FIG. 42 shows parameters and contents of a video title set attribute search pointer shown in FIG. 40;

FIG. 43 shows parameters and contents of video title set attribute shown in FIG. 40;

FIG. 45 shows parameters and contents of a management table (VTSI_MAT) of video title set information (VTSI) shown in FIG. 44;

FIG. 50 shows a structure of a table (VTS_PGCIT) of video title set program chain information shown in FIG. 46;

FIG. 51 shows parameters and contents of information (VTS_PGCITI) of a table (VTS_PGCIT) of video title set program chain information shown in FIG. 50;

FIG. 52 shows parameters and contents of a search pointer (VTS_PGCIT_SRP) of the table (VTS_PGCIT) of the video title set program chain information shown in FIG. 50;

FIG. 53 shows a structure of program chain information (VTS_PGCI) for video title set corresponding to the program chain of video title set program chain information (VTS_PGCI) shown in FIG. 50;

FIG. 54 shows parameters and contents of general information (PGC_GI) of a program chain of program chain information (VTS_PGCI) shown FIG. 53;

FIG. 55 is a bit map table showing description of PGC_CNT shown in FIG. 54;

FIG. 63 shows a structure of a cell playback information table (C_PBIT) of program chain information (VTS_PGCI) shown in FIG. 53;

FIG. 64 shows parameters and contents of cell playback information (C_PBI) on the cell playback information table (C_PBIT) shown in FIG. 63;

FIG. 65 shows a structure of cell position information (C_POSI) of program chain information (VTS_PGCI) shown in FIG. 63;

FIG. 66 shows parameters and contents of the cell position information (C_POSI) shown in FIG. 65;

FIG. 67 shows a structure of a video title set menu PGC unit table;

FIG. 68 shows parameters and contents of video title set PGCI unit table information shown in FIG. 67;

FIG. 69 shows parameters and contents of a video title set language search pointer shown in FIG. 67;

FIG. 73 shows a structure of a navigation pack shown in FIG. 28;

FIG. 74 shows a structure of a video, audio or sub-picture pack shown in FIG. 28;

FIG. 75 shows parameters and contents of presentation control information (PCI) of the navigation pack shown in FIG. 73;

FIG. 76 shows parameters and contents of general information (PCI_GI) in presentation control information (PCI) shown in FIG. 75;

FIG. 77 shows parameters and contents of disk search information (DSI) of the navigation pack shown in FIG. 73;

FIG. 78 shows parameters and contents of DSI general information (DSI_GI) of disk search information (DSI) shown in FIG. 77;

FIG. 79 shows parameters and contents of synchronous playback information (SYNCI) of video object (VOB) shown in FIG. 77;

FIG. 80 shows an operation flow from the start of the operation of the apparatus to the acquisition of the video title set;

FIG. 81 is a flow chart of a video manager menu search operation;

FIG. 82 shows an example of a video manager menu;

FIG. 83 is a flow chart illustrating a video title set menu search operation;

FIG. 84 shows an example of a video title set menu;

FIG. 88 is a block diagram showing an encoder system for encoding video data and generating a video file;

FIG. 90 is a flowchart illustrating a process of forming a video data file by combining video data, audio data and sub-picture data encoded by the flow of FIG. 89;

FIG. 91 is a block diagram showing a disk formatter system for recording a formatted video file on the optical disk;

FIG. 92 is a flow chart for producing logic data to be recorded on the disk, in the disk formatter shown in FIG. 91;

FIG. 93 is a flow chart for producing, from the logic data, physical data to be recorded on the disk.

DETAILED DESCRIPTION OF THE PREFERRED EMBODIMENTS

Figure 4:
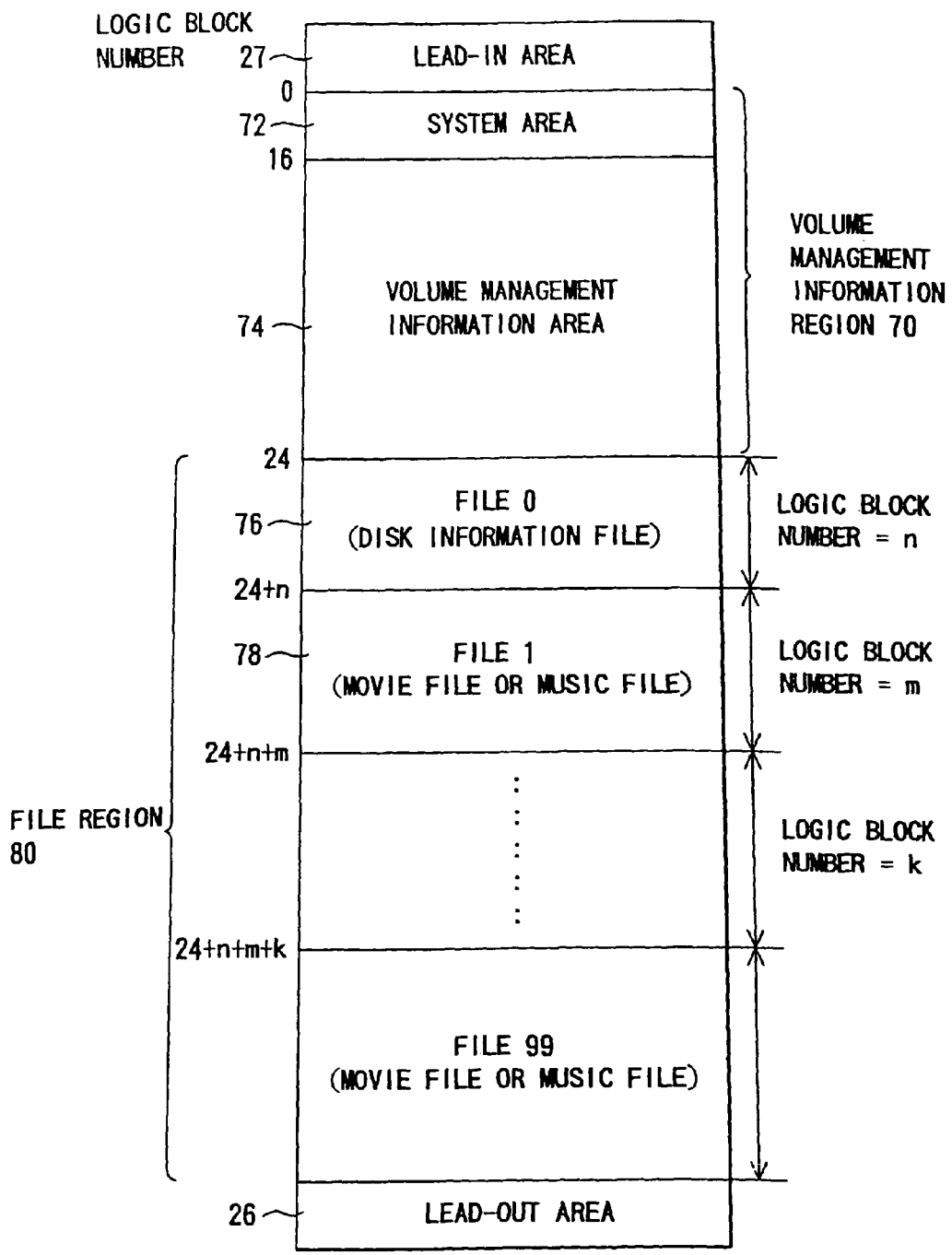
FIG. 4 is an explanatory view illustrating the structure of a logic format of the optical disk shown in FIG. 3 according to an initial version.

Hereinafter, referring to the accompanying drawings, an optical disk reproducing apparatus according to an embodiment of the present invention will be explained.

FIG. 1 is a block diagram of an optical disk reproducing apparatus that reproduces data from an optical disk associated with the embodiment of the present invention. FIG. 2 is a block diagram of a disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the audio signals and the speaker section 8 generates sound according to the audio signals.

It is known that the optical disk 10 is available with various structures. For instance, one type of the optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues to be clamped at the clamping areas 24.

As shown in FIG. 3, the optical disk 10 has an information zone 25 around the clamping zone 24 on each side, the information zones allowing the information to be recorded on the optical disk 10. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which reproduction data, video data, sub-picture data, and audio data are recorded in the form of pits (that is, in the form of changes in the physical state), as will be explained later. With the read-only optical disk 10, a train of pits is formed in advance in the transparent substrate 14 by a stamper, a reflecting layer is formed by deposition on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus, as shown in FIG. 1, further comprises a disk drive section 30, a system CPU section 50, a system ROM/RAM section 52, a system processor section 54, a data RAM section 56, a video decoder section 58, an audio decoder section 60, a sub-picture decoder section 62, and a D/A and data reproducing section 64.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The motor 33 is driven by the driving signal and moves in and out the optical head 32 across the radius of the optical disk 10. The optical head 32 is provided with an objective lens 34 positioned so as to face the optical disk 10. The objective lens 34 is moved according to the driving signal supplied from the focus circuit 36 so as to move along its optical axis.

To reproduce the data from the above optical disk 10, the optical head 32 projects a laser beam on the optical disk 10 via the objective lens 34. The objective lens 34 is moved little by little across the radius of the optical disk 10 according to the driving signal supplied from the tracking circuit 38. Furthermore, the objective lens 34 is moved along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, as the objective lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to track, for example, at a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in the data RAM section 56 by the system processor section 54, which is controlled by the system CPU section 50 operated in accordance with the programs stored in the system ROM/RAM section 52. The stored reproduced data is processed in the system processor section 54, which sorts the data into video data, audio data, and sub-picture data, are supplied to the video decoder section 58, audio decoder section 60, and sub-picture decoder section 62, respectively, and are decoded at the respective decoders. The D/A and data-reproducing section 64 converts the decoded video data, audio data, and sub-picture data into an analog video signal and an analog audio signal, and supplies the resulting video signal to the monitor 6 and the resulting audio signal to the speaker 8. Then, on the basis of the video signal and sub-picture signal, images are displayed on the monitor section 6 and according to the audio signal, sound is simultaneously reproduced at the speaker section 8.

The structure of the logic format of the optical disk apparatus shown in FIG. 1 will now be described. At present, an initial version and a new version produced by improving the initial version are available as the logic format of the optical disk apparatus. At first, the logic format of the initial version will be described with reference to FIGS. 4 to 11. Then, with reference to FIGS. 15 to 79, the logic format of the new version will be described. The operation of the optical disk apparatus shown in FIG. 1 will be described in greater detail along with the logic formats of the initial version and new version of the optical disk 10.

A data recording region 28 beginning with the read-in area 27 and ending with the read-out area 26 on the optical disk 10 shown in FIG. 1 has a volume structure, as shown in FIG. 4. This volume structure comprises a hierarchical volume management information region 70 and a hierarchical file region 80. The volume management information region 70 corresponds to logic block numbers 0 to 23 defined according to ISO9660. A system area 72 and a volume management area 74 are assigned to the volume management information region 70. The system area 72 is normally an empty area and the contents thereof are not defined. For example, the system area 72 is provided for an editor or a provider for editing data to be recorded on the optical disk 10 or a person who provides a title. A system program for achieving the drive of the optical disk apparatus according to the editor's intention is stored in the system area 72 on an as-needed basis. The volume management area 74 stores volume management information for managing a disk information file 76 in the file region 80 (hereinafter referred to simply as "disk information file 76") and a file 78 such as a movie file or a music file, i.e. data on the recording positions, recording capacities, file names, etc. of all files.

Files 76 and 78 of file numbers 0 to 99 designated by logic block numbers beginning with block number 24 are provided in the file region 80. The file 76 with file number 0 is assigned as disk information file 76. The files 78 with file numbers from 1 to 99 are assigned as movie files or video files or music files.

Figure 5:
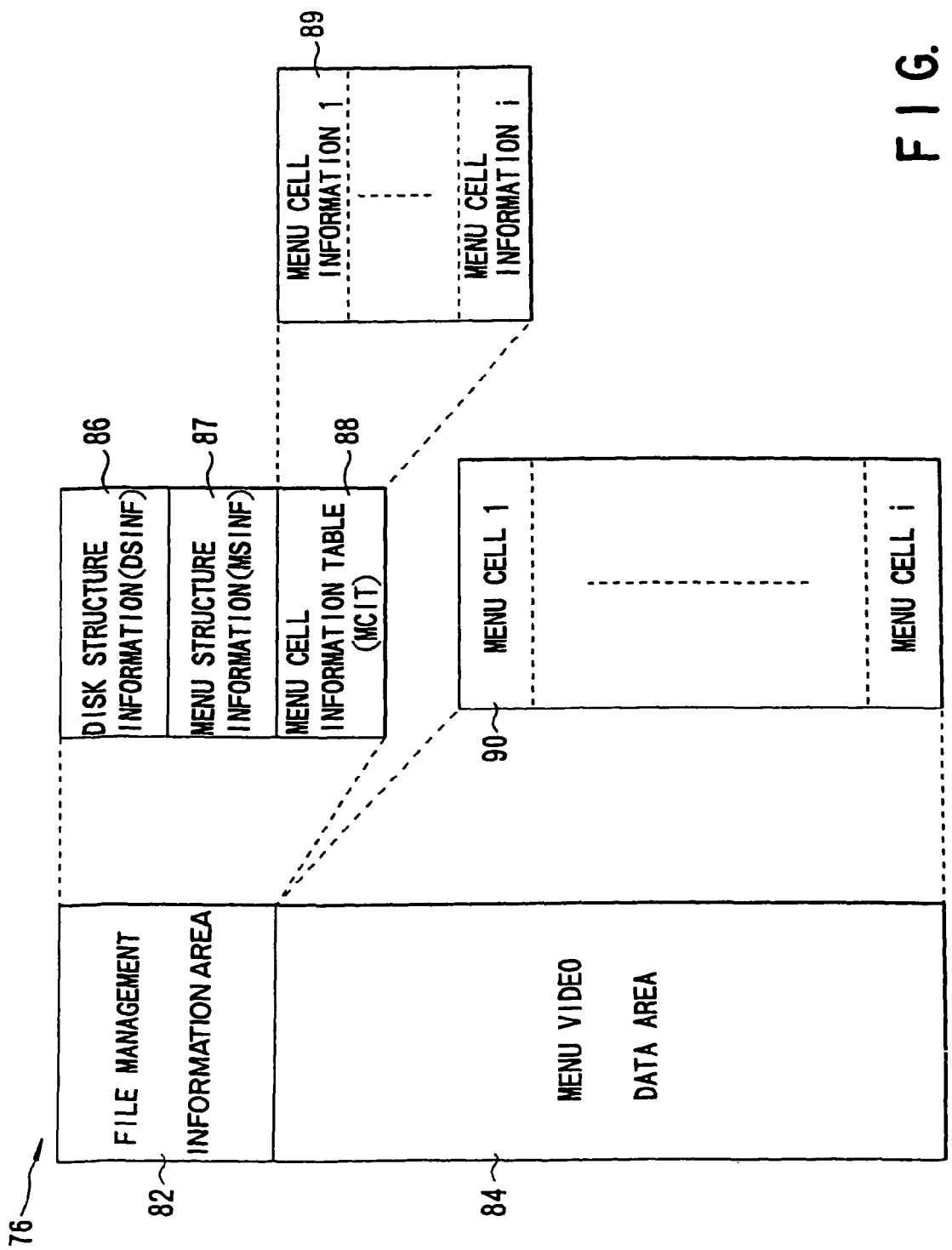
FIG. 5 is an explanatory view illustrating the structure of a disk information file shown in FIG. 4.

As is shown in FIG. 5, the disk information file 76 comprises a file management information area 82 and a menu video data area 84. The file management information area 82 stores a selectable sequence recorded on the entire optical disk 10, i.e., file management information for selecting a video title or an audio title. The menu video data area 84 stores, in units of a menu data cell 90, image data of a menu screen for displaying a selection menu of a title, etc. As will be described later in detail, the menu video data of the menu video data area 84 is divided into units of a size necessary for a purpose, i.e., an i-number of menu cells 90 sequentially numbered from #1 in the order in which the cells 90 are recorded on the menu video data area 84 on the disk 10. The menu cells 90 store video data, sub-picture data or audio data relating to selection of a movie title or an audio title, selection of a program of each title, etc.

As shown in FIG. 5, the file management information area 82 comprises three information areas: a disk structure information area 86 for storing a disk structure information (DSINF), a menu structure information area 87 for storing menu structure information (MSINF), and a menu cell information table (MCIT) 88 for storing cell information. These three information areas are arranged in this order.

The disk structure information area 86 principally stores disk structure information such as the number (expressed as parameter DSINF between numerals 1 and 99) of movie files and music files, i.e., reproduction files 78, recorded in the file region 80 of the disk 10, and the number of sequences (i.e., sets of video data including video data, audio data and sub-picture data, as will be described later in detail) being present within each file 78, i.e., the number of titles (expressed as parameter FSINF).

The menu structure information area 87 stores information such as the total number (i.e., parameter NOMCEL) of menu cells 90 in the menu video data area 84 recorded in the disk information file 76 and a start cell number (i.e., parameter TMSCEL) of the title menu cells 90 constituting a series of menu video data for selecting the title present within the disk.

The menu cell information table 88 is defined as an aggregation of an number of cell information areas 89 in which cell information necessary for reproduction of the menu cells 90 is stated in the order of the cell numbers. When the file 76 includes no picture data for displaying the menu, the menu information table is not described. The cell information table 88 stores information relating to the position (i.e., parameter MCSLBN described by an offset logic block number from the beginning of the file) of the menu cell 90 in the file 76, and the size (i.e., parameter MCNLB described by the logic block number), etc. The disk structure information (DSINF) and menu structure information (MSINF) are successively described in the file management information area 82. The menu cell information table (MCIT) 88 is aligned at a boundary of logic blocks.

Figure 6:
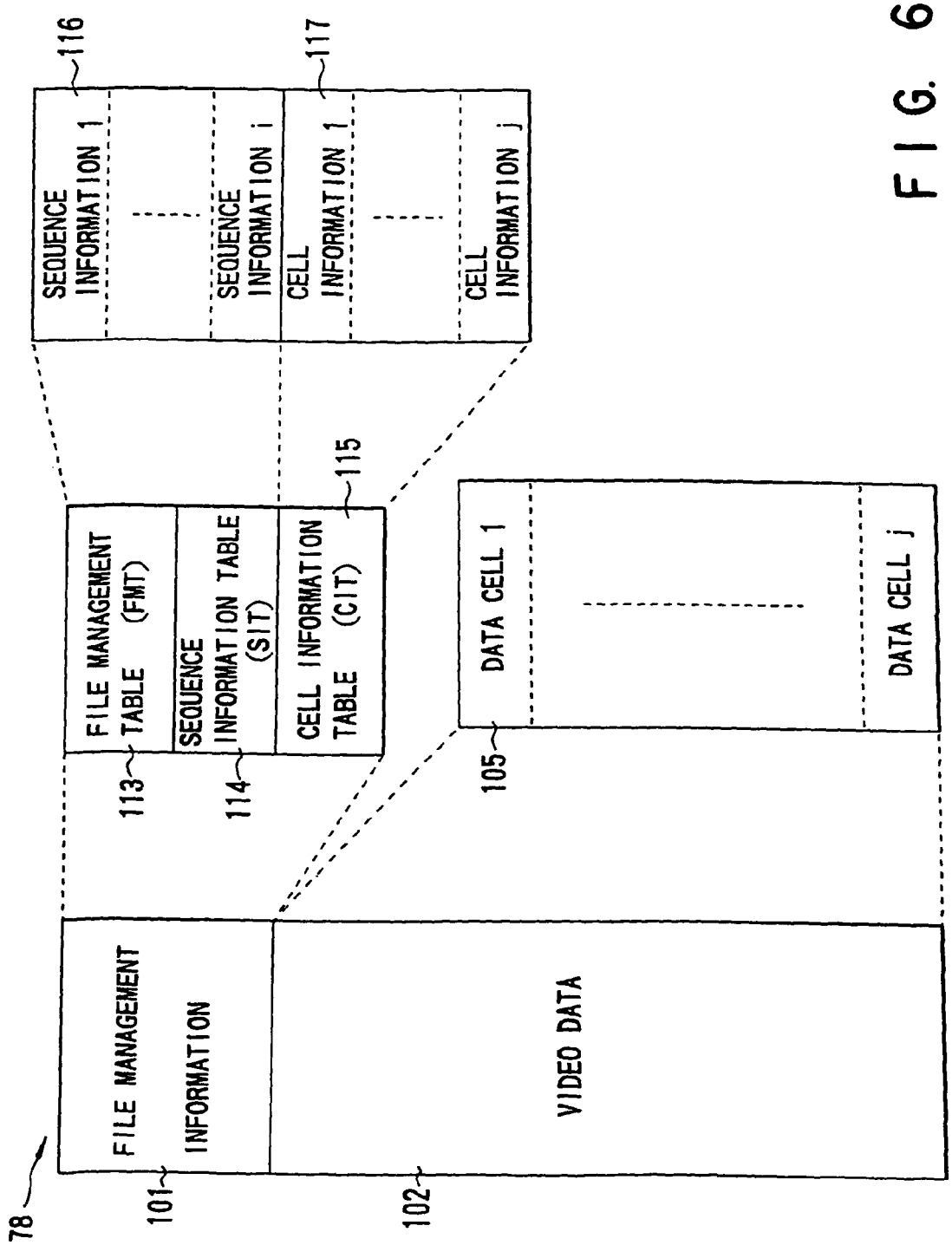
FIG. 6 is an explanatory view illustrating the structure of a file, such as a movie file or a music file as shown in FIG. 4.

Music data or movie data of one or more titles are stored in the movie files or music files 78 corresponding to file numbers 1 to 99. Each file 78 has a file structure, as shown in FIG. 6, comprising a file management information area 101 storing information on the data contained in the file 78, i.e. management information (e.g., address information, presentation control information, etc.), and a video data area 102 storing moving video data (including video data, audio data and sub-picture data) in the file 78. In the video data area 102, video data is divided in units, like the menu cells 90 of the disk information file 76, and the picture data is arranged as a j-number of picture data cells 105.

In general, movie data or audio data of a certain title is expressed as an aggregation of successive sequences 106. For example, the story of a movie is expressed by successive sequences 106 corresponding to "introduction," "development," "turn," and "conclusion." Accordingly, the video data area 102 of each file 78 is defined as an aggregation of sequences 106, as shown in FIG. 7. Each sequence 106 is expressed by a plurality of video programs 107 corresponding to various scenes of the story. Each video program 107 comprises a plurality of video data cells 105. Each video data cell 105, as shown in FIG. 8, comprises a plurality of groups of pictures (GOP) in each of which a control pack (DSI) 92, a video pack 93, a sub-picture pack 95 and an audio pack 98 are combined. The structure of the video cell 105 is substantially the same as that of the menu cell 90. The video data 102 consists of movie data, audio data, sub-picture data, etc., which have been compressed according to a compression standard of, e.g. MPEG1 (Moving Picture Expert Group) or MPEG2 and recorded in a data format corresponding to a system layer of MPEG2. Specifically, the video data 102 is a program stream defined by the MPEG standard. Further, each of the packs 92, 93, 95 and 98 has a pack structure comprising a pack header 97 and a packet 99 corresponding to the pack defined by the MPEG1 or MPEG2.

The file management information area 101 comprises a file management table (FMT) 113, a sequence information table (SIT) 114, a cell information table (CIT) 115 and a disk search map (DSM).

The video data cells in the video data area 102 are assigned sequential numbers from #1 in the order of record on the disk, and the cell numbers and cell information associated with the cell numbers are stated on the cell information table 115. Specifically, the cell information table 115 is defined as a group of areas 117 storing a j-number of cell information (CI) units which are necessary for reproduction of the video data cells and are stated in the order of the cell numbers. The cell information (CI) includes information on the position, size, playback time, etc. of the cell within the file 78.

FIG. 9 shows the contents of the cell information (CI) stored on the cell information table 115. In the cell information (CI), such contents as start positions and sizes of video cells formed by dividing the video data in units associated with objects are described as parameters. Specifically, the cell information (CI) comprises cell classification information (CCAT) indicating the content of the video cell, i.e., one of a movie, a "karaoke" and an interactive menu, cell playback information (CTIME) indicating a total playback time of the video cell, cell start position information (CSLBN) indicating the start position of the video cell, i.e., the start address, and cell size information (CNLB) indicating the size of the video cell.

The sequence information table 114 is defined as a group of areas 116 for storing an i-number of sequence information (SI) units representing, for example, the order of selecting and reproducing the cells 105 in a range designated for each sequence 106. Each sequence information (SI) unit contains information on the order of reproduction of video cells 105 recorded in the sequence 106 and on presentation control information relating to the reproduction. The sequences 106 are classified into two types: a completion-type sequence which is completed by a single sequence, and a connection-type sequence which is branched and connected to the next sequence. Connection-type sequences include: a connection-type head sequence which is ahead sequence of video data corresponding to a multi-story and can be branched and connected to the next sequence, i.e., a connection-type head sequence in which the story varies according to the manner of choice of the story; a connection-type intermediate sequence which is a branch of another connection-type sequence and is connected to still another sequence; and a connection-type end sequence which is connected to another connection-type sequence and is completed, i.e., a connection-type end sequence with which the story is completed. Sequence numbers 1 to i are assigned to these sequence information units. The beginning point information of each sequence information unit is written on the file management information table 113.

FIG. 10 shows the contents of the sequence information (SI) unit stored on the sequence information table (SIT) 114 in the file management information area 101 shown in FIG. 6. As shown in FIG. 10, the sequence information area 116, the order of playback of video cells, the sequence information, etc. are described. The number of the sequence information (SI) corresponds to the number of the sequence. The sequence information units are stored on the sequence information table 114 in the order of the numbers thereof. The sequence number 1 is a default reproduction sequence. It is desirable that the cells of the sequence be arranged successively in a designated order. The sequence information 116 comprises sequence classification information (SCAT), sequence playback time (STIME), connection sequence number information (SNCSQ), sequence number list information (SCSQN) and sequence control information (SCINF). The sequence classification information (SCAT) indicates one of the completion-type sequence which is completed by reproduction of a single sequence; the connection-type head sequence which is a head sequence of video data corresponding to a multi-story and can be branched and connected to the next sequence; the connection-type intermediate sequence which is a branch of another connection-type sequence and is connected to still another sequence; and the connection-type end sequence which is connected to another connection-type sequence and is completed. The sequence classification information (SCAT) also indicates the use of the sequence, i.e., one of a movie, a "karaoke" and an interactive menu. The sequence playback time (STIME) indicates the total playback time of the sequence. The connection sequence number information (SNCSQ) indicates the number of sequences which are connectable to a connection-type sequence after this connection-type sequence is reproduced. The sequence number list information (SCSQN) indicates a list of sequence numbers of the connectable sequences described in the connection sequence number information (SNCSQ). The sequence control information (SCINF) describes the order of playback of cells of the sequence, according to which order the cells are reproduced and the sequence is executed. A range in which one of plural cells is selected and reproduced is described as a block or an aggregation of cells. By designating the block, the sequence of the block is executed.

The file management table (FMT) 113 stores various data on the video file 78. The file management table 113 describes, as shown in FIG. 11, the name of the file (FFNAME) and an identifier (FFID) for determining whether or not the file can be reproduced by the optical disk reproducing apparatus in which the optical disk is mounted. The file identifier (FFID) is, for example, an identifier for identifying a movie file. The file management table 113 also describes the start addresses (FSASIT, FSACIT) of the sequence information table (SIT) 114 and cell information table (CIT) 115, the number (FNSQ) of sequence information (SI) units and the number (FNCEL) of cell information (CI) units stated in these tables, the start address (FSAESI) of each sequence indicated by a relative distance from the beginning of the sequence information table (CIT) 114, the start address (FSADVD) of the video data in the video data area 102, and data attributes or information for reproducing each data unit. In the start address (FSASIT) of the sequence information table 114, the start address of the sequence information table 114 from the beginning of the file 78 to which the file management table 113 belongs is described by an offset block logic number. In the sequence information start address (FSAESI), the start address and size of each sequence information unit in the sequence information table 114 are described with respect to all the sequences in the order of the description of the sequences. The start address is described by an offset byte number from the beginning of the sequence information table 114.

Referring back to FIG. 1, the operation for reproducing movie data from the optical disk 10 having the logic format shown in FIGS. 4 to 11 will now be described. In FIG. 1, solid-like arrows between the blocks indicate data buses, and broken-line arrows indicate control buses.

In the optical disk apparatus shown in FIG. 1, when power is supplied, the system CPU section 50 reads out an initial operation program from the system ROM/RAM section 52 and activates the disk drive section 30. The disk drive section 30 starts a read-out operation from the read-in area 27 and reads out volume management information from the volume management information area 74 of the volume management information region 70 following the read-in area 27. Specifically, the system CPU section 50 delivers a read command to the disk drive section 30 in order to read out the volume management information from the volume management information area 74 recorded on a predetermined position on the disk 10 set in the disk drive section 30. Thus, the system CPU section 50 reads out the volume management information and temporarily stores the read-out information in the data RAM section 56 via the system processor section 54. The system CPU section 50 extracts, from the volume management information data sequence stored in the data RAM section 56, necessary management information such as the record position of each file, the record capacity, etc. The extracted information is transferred and saved in a predetermined location in the system ROM/RAM section 52.

The system CPU section 50 refers to the previously obtained information on the record position of each file, the record capacity, etc. in the system ROM/RAM section 52, and obtains the disk information file 76 corresponding to the file number 0. Specifically, the system CPU section 50 refers to the previously obtained information on the record position of each file, the record capacity, etc. in the system ROM/RAM section 52, delivers a read command to the disk drive section 30, reads out file management information of the disk information file 76 with the file number 0, and stores the read-out information in the data RAM section 56 via the system processor section 54. Similarly, the obtained information is transferred and saved in a predetermined location in the system ROM/RAM section 52.

The system CPU section 50 makes use of the disk structure information 86, menu structure information 87 and menu cell information table 88 of the file management information in the disk information file 76 and reproduces and presents on the screen the sequence (title) selection menu of the menu video data 84.

The user selects the sequence (title) to be reproduced of the title by the key/display section 4 on the basis of the selection numbers displayed on the menu screen. Thereby, the file number, sequence information and audio stream belonging to the selected sequence are specified. When the sequence is selected, there are two cases. In one case, all sequences are selected on the basis of the menu screen. In the other case, a top sequence is selected and when the top sequence has been completed, the next sequence is selected from menu cells included in the video cell. The selection of the sequence will be described later.

The operation until the designated video file 78 is acquired and the video data 102 is reproduced will now be described. In order to acquire the sequence information associated with the designated sequence number, the information on the record position and record capacity of each video file 78 is obtained from the volume management information 74 and is used. At first, the file management information 101 of the video file 78 belonging to the sequence to be reproduced is read out, as in the case of the disk information file 76, and stored in the data RAM section 56.

The system CPU section 50 obtains the sequence information corresponding to the designated sequence number from the sequence information table 114 of the file management information 101 stored in the data RAM section 56. The obtained data and the cell information 117 in the cell information table 115 necessary for reproducing the sequence are transferred and stored in the system ROM/RAM section 52.

The cell information on the cell which is to be first reproduced is obtained from cell playback order information in the thus acquired sequence information. On the basis of the video data reproduction start address and size data in the cell information, a read command for read from a target address is delivered to the disk drive section 30. The disk drive section 30 drives the optical disk 10 according to the read command and reads the data of the target address from the optical disk 10. The read-out data is sent to the system processor section 54. The system processor section 54 temporarily stores the sent data in the data RAM section 56 and determines the kind of data (video, audio, sub-picture, reproduction information, etc.) on the basis of header information added to the stored data. The data is transferred to the decoder section 58, 60 or 62 associated with the kind of the data.

Each decoder section 58, 60, 62 decodes the data according to the data format and sends the decoded data to the D/A and data reproducing section 64. The D/A and data reproducing section 64 converts the decoded digital signal to an analog signal and subjects the analog signal to a mixing process. The resultant signal is output to the monitor section 6 and speaker section 8.

In the process of determining the kind of data, if data is reproduction information representing the reproduction position of video data, etc., the reproduction data is not transferred and is stored in the data RAM section 56. The reproduction information is referred to by the system CPU section 50 on an as-needed basis and is used for monitoring in video data reproduction.

If the reproduction of one cell is completed, the cell information to be reproduced subsequently is obtained from the cell playback order information in the sequence information and the playback is continued.

Figure 13:
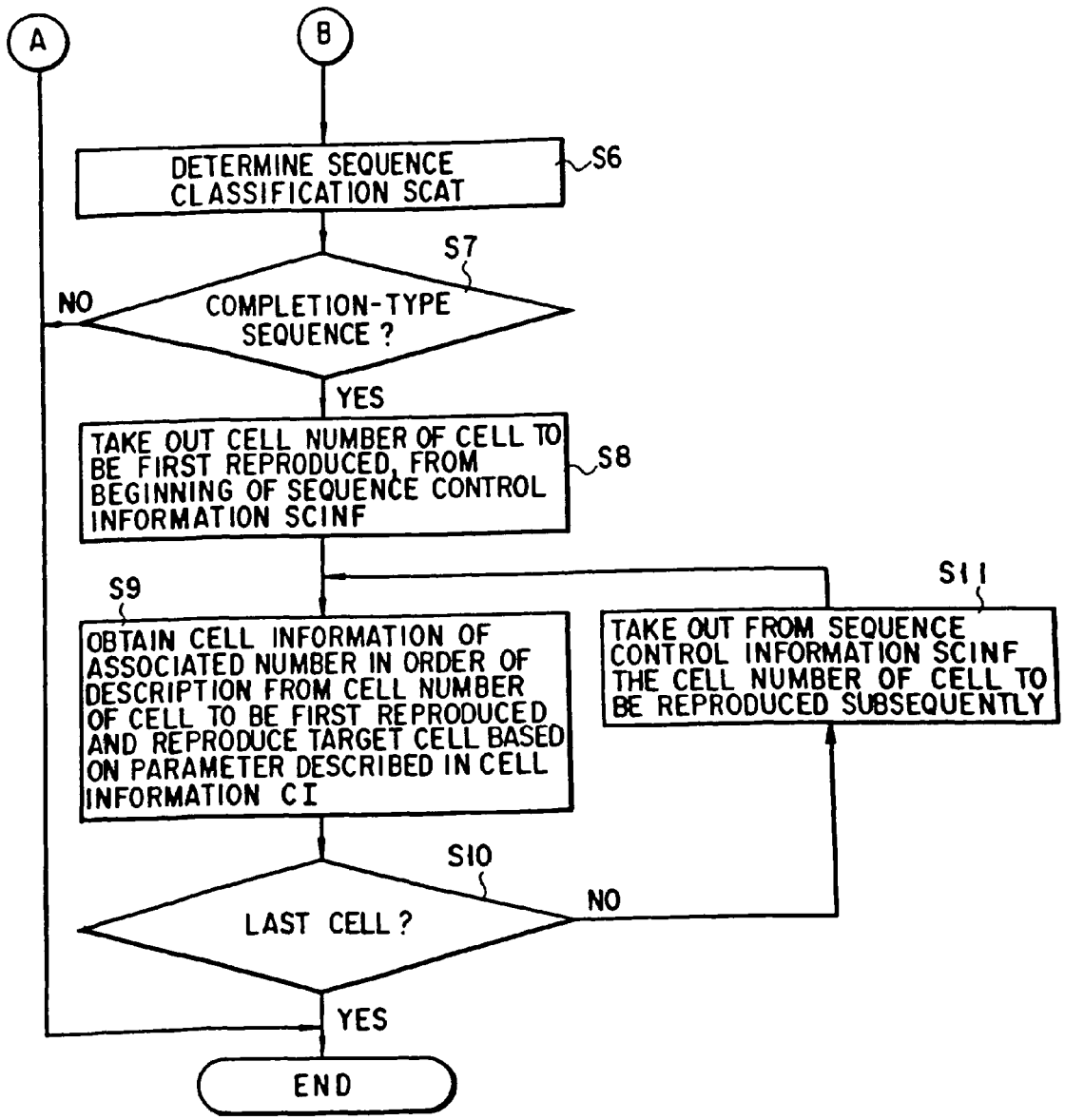
FIG. 13 is a flow chart similarly illustrating the completion-type sequence.

The operation of the completion-type sequence, which is an ordinary sequence in the present optical disk reproducing apparatus, will now be described with reference to the flow charts of FIGS. 12 and 13.

If the user designates the first sequence number (Req. NO), the completion-type sequence, which specifies the file 78 corresponding to the designated sequence, is started (step S0). The file management information of the specified file 78 having the file structure as shown in FIG. 6 is read out from the disk 10, and the read-out data is temporarily stored in the data RAM section 56 (step S1). From the file management table (FMT) 113 in the file management information stored in the data RAM section 56, the system CPU section 50 acquires the total sequence number (FNSQ), the start address (FSA-SIT) of the sequence information table (SIT), and the start address (FSAESI) of each sequence information (SI) unit (step S2).

The sequence number (Req. NO) designated by the user is compared with the total sequence number (FNSQ) in advance, and it is determined if the designated sequence number (Req. NO) is out of the range (step S3). If the designated sequence number (Req. NO) is out of the range, the operation is completed.

The parameters of the start address (FSASIT) of the sequence information table (SIT) and the start address (FSAESI) of the sequence information (SI), which were obtained from the sequence information table (SIT) of the file management information in step S2, are used to detect the presence/absence of the sequence information (SI) corresponding to the sequence number (Req. NO) designated by the user, and the target sequence information (SI) is obtained (step S4). In the start address (FSASIT) of the sequence information table 114, the start address of the sequence information table 114 from the beginning of the file 78, to which the file management table 113 belongs, is described by an offset logic block number. In the sequence information start address (FSAESI), the start address of each sequence information unit in the sequence information table 114 is described by an offset by the number from the beginning of the sequence information table 114. Thus, the sequence number (Req. NO) corresponds to bytes calculated by multiplying the offset logic block number of the start address (FSASIT) of the sequence information table 114 by 2048 bytes equivalent to one block and adding the resultant to the offset byte number of the designated sequence information start address (FSAESI). That is, SI (Req. NO)=FSASIT*2048+FSAESI (Req. NO).

From these two addresses (FSASIT, FSAESI), the following parameters in the sequence information (SI) are obtained: the sequence classification (SCAT), structure cell number (SNCEL), connection sequence number (SNCSQ), connection-destination sequence number (SCSQN) and sequence control information list (SCINF) (step S5). From the sequence information (SI), the first acquired sequence classification (SCAT) is determined (step S6). If the determined classification is not the completion-type sequence, the operation is completed (step S7).

If the determined result is the completion-type sequence, the cell number of the cell to be first reproduced is taken out from the beginning of the sequence control information (SCINF) (step S8).

From the cell information table (CIT) 115 in the file management information, the cell information (CI) of the associated number is obtained in the order of description from the first reproduced cell number. Based on the cell playback address information, the system CPU section 50 reproduces, from the video data area 10 in the file shown in FIG. 6, the target video cell by delivering a read-out/reproduction command to the optical disk drive section 30 (step S9).

If the reproduction of the cell is completed, it is determined whether there is a cell to be reproduced subsequently (i.e., whether the last cell or not) (step S10). Since the number of structure cells (SNCEL) of one sequence is described as sequence information (SI), it is possible to determined whether the reproduced cell is the last one, by determining the cell number of the taken-out video cell.

If the taken-out video cell is not the last one, the cell number of the cell to be reproduced subsequently is taken out from the sequence control information (SCINF), and step S9 is executed once again (step S11).

Figure 14:
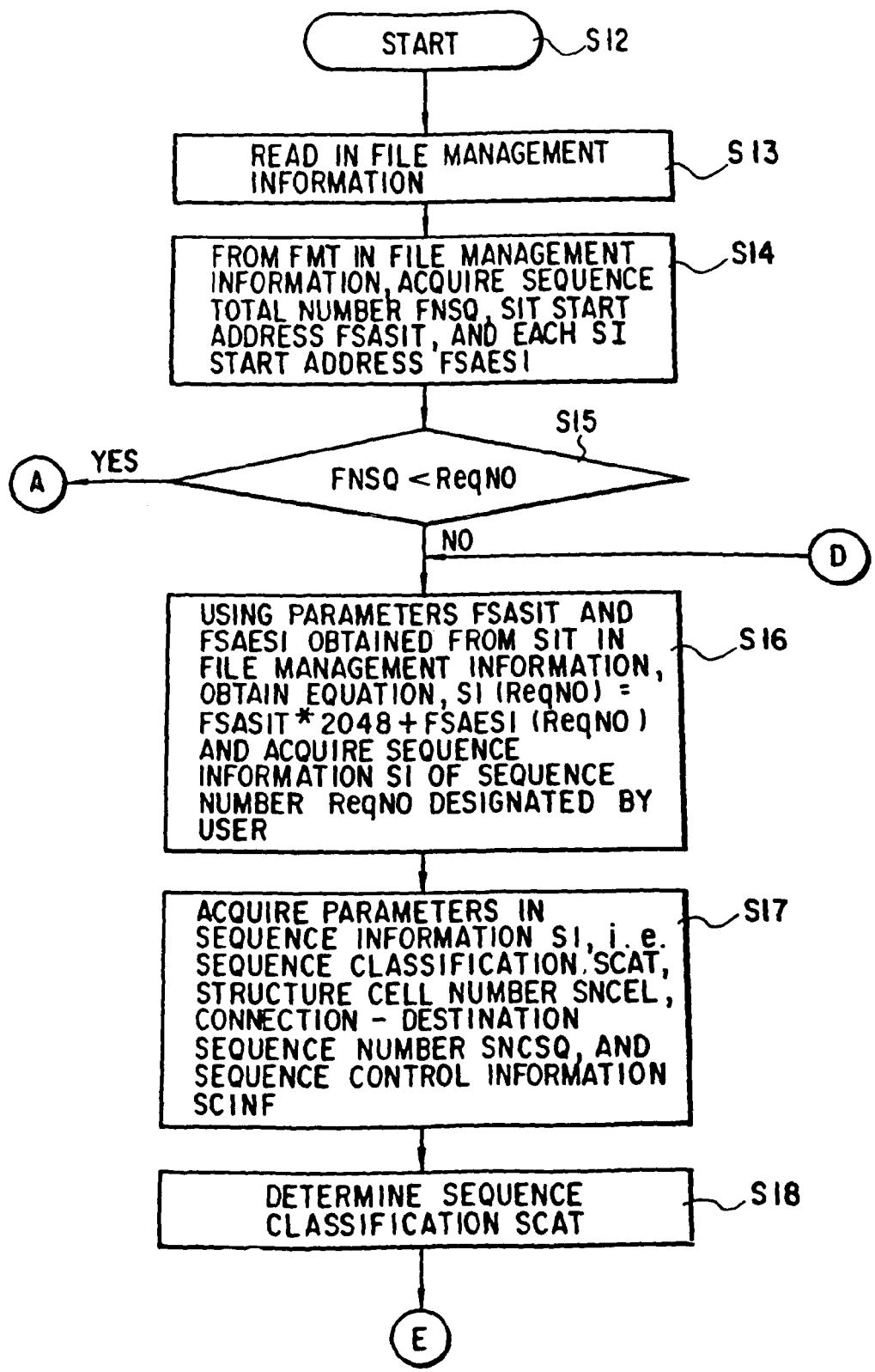
FIG. 14 is a flowchart illustrating a connection-type sequence.
Figure 15:
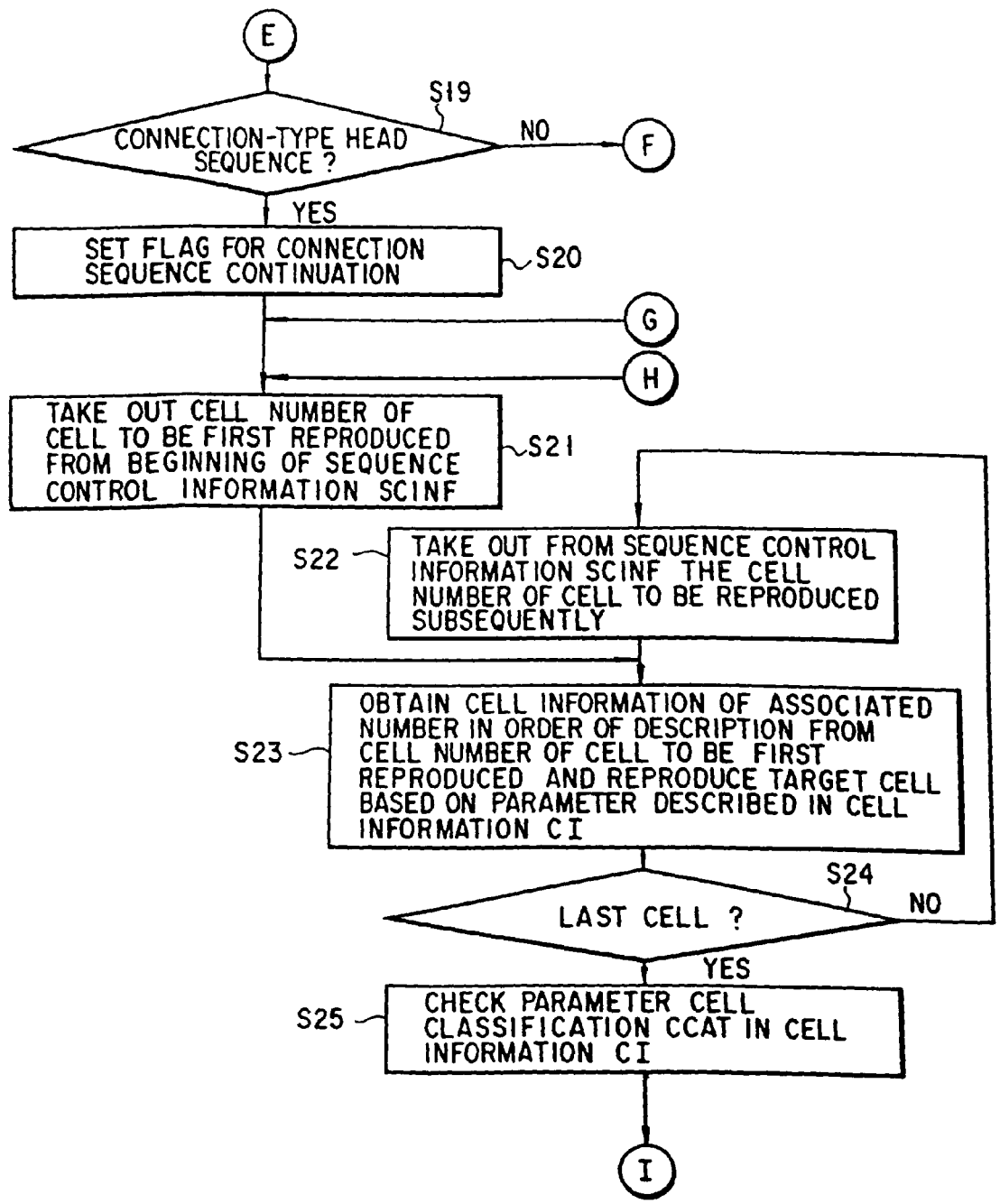
FIG. 15 is a flow chart similarly illustrating the connection-type sequence.
Figure 16:
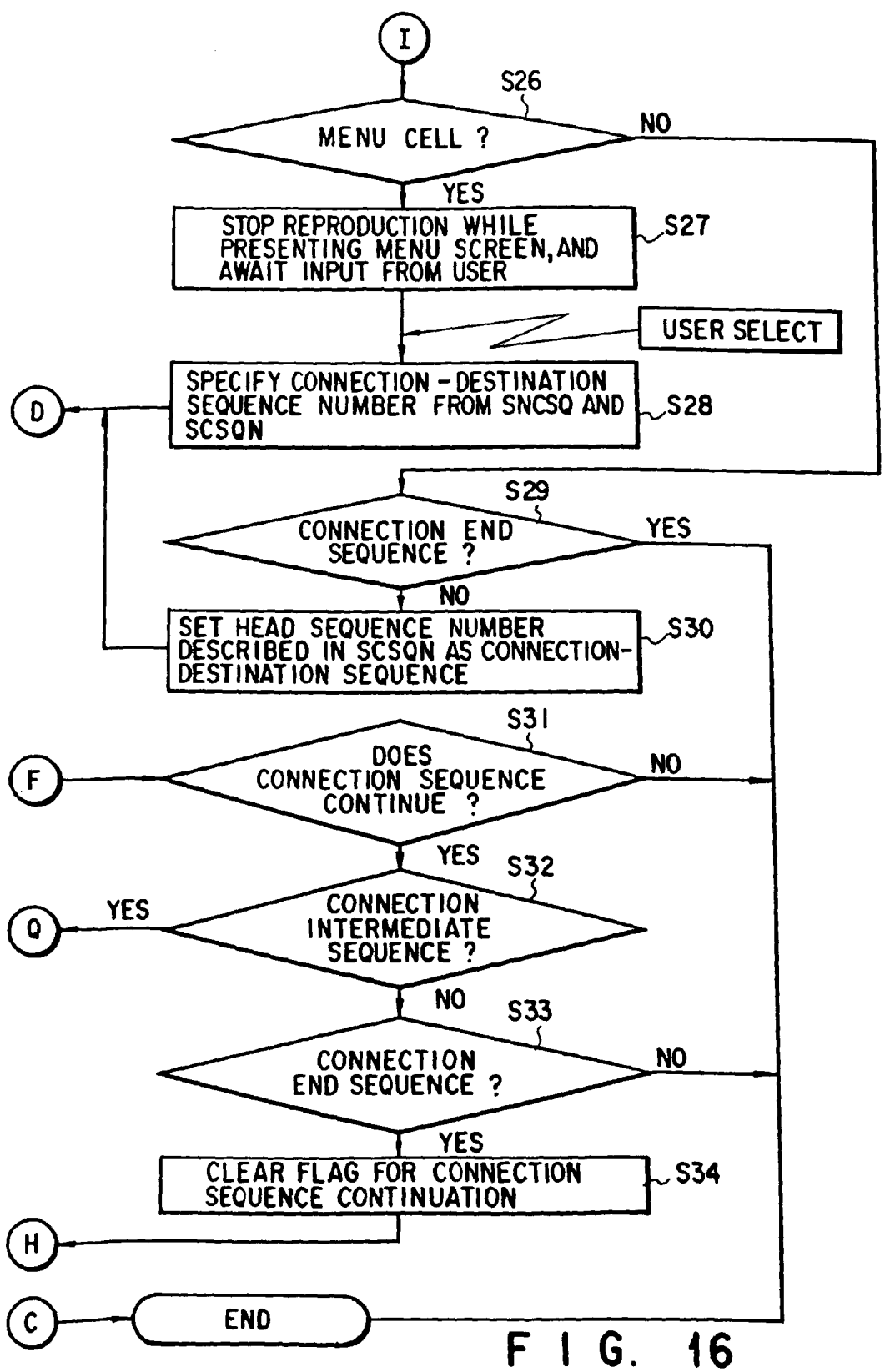
FIG. 16 is a flow chart similarly illustrating the connection-type sequence.

The operation of the connection-type sequence, which is an interactive sequence in the present optical disk reproducing apparatus, will now be described with reference to the flow charts of FIGS. 14, 15 and 16.

If the user designates the first sequence number (Req. NO), the connection-type sequence, which specifies the file 78 corresponding to the designated sequence, is started (step S12). The file management information of the file 78 designated by the user and having the file structure as shown in FIG. 6 is read out from the disk 10, and the read-out data is temporarily stored in the data RAM section 56 (step S13). From the file management table (FMT) 113 in the file management information stored in the data RAM section 56, the system CPU section 50 acquires the total sequence number (FNSQ), the start address (FSASIT) of the sequence information table (SIT) 114, and the start address (FSAESI) of each sequence information (SI) unit (step S14).

The sequence number (Req. NO) designated by the user is compared with the total sequence number (FNSQ) in advance, and it is determined if the designated sequence number (Req. NO) is out of the range (step S15). If the designated sequence number (Req. NO) is out of the range, the operation is completed.

The parameters of the start address (FSASIT) of the sequence information table (SIT) and the start address (FSAESI) of the sequence information (SI), which were obtained from the sequence information table (SIT) of the file management information in step S14, are used to detect the presence/absence of the sequence information (SI) corresponding to the sequence number (Req. NO) designated by the user, and the target sequence information (SI) is obtained (step S16). As has already been described, in the start address (FSASIT) of the sequence information table 114, the start address of the sequence information table 114 from the beginning of the file 78, to which the file management table 113 belongs, is described by an offset logic block number. In the sequence information start address (FSAESI), the start address of each sequence information unit in the sequence information table 114 is described by an offset by the number from the beginning of the sequence information table 114. Thus, the sequence number (Req. NO) corresponds to bytes calculated by multiplying the offset logic block number of the start address (FSASIT) of the sequence information table 114 by 2048 bytes equivalent to one block and adding the resultant to the offset byte number of the designated sequence information start address (FSAESI). That is, SI (Req. NO)=FSASIT*2048+FSAESI (Req. NO).

From these two addresses (FSASIT, FSAESI), the following parameters in the sequence information (SI) are obtained: the sequence classification (SCAT), structure cell number (SNCEL), connection sequence number (SNCSQ), connection-destination sequence number (SCSQN) and sequence control information list (SCINF) (step S17). From the sequence information (SI), the first acquired sequence classification (SCAT) is determined (step S18). If the determined classification is not the completion-type sequence, the operation is completed (step S19).

If the determined result is the connection-type head sequence, a flag for connection sequence continuation is set (step S20) and the cell number of the cell to be first reproduced is taken out from the beginning of the sequence control information (SCINF) (step S21).

From the cell information table (CIT) 115 in the file management information, the cell information (CI) of the associated number is obtained in the order of description from the first reproduced cell number. Based on the cell playback address information, the system CPU section 50 reproduces, from the video data area 10 in the file shown in FIG. 6, the target video cell by delivering a read-out/reproduction command to the optical disk drive section 30 (step S23).

If the reproduction of the cell is completed, it is determined whether there is a cell to be reproduced subsequently (i.e., whether the last cell or not) (step S24) Since the number of structure cells (SNCEL) of one sequence is described as sequence information (SI), it is possible to determined whether the reproduced cell is the last one, by determining the cell number of the taken-out video cell.

If the taken-out video cell is not the last one, the cell number of the cell to be reproduced subsequently is taken out from the sequence control information (SCINF) (step S22), and step S23 is executed once again (step S23).

In step S23, if the taken-out video cell is the last cell, the parameter cell classification (CCAT) in the cell information (CI) is checked (step S25). It is determined whether the cell classification (CCAT) of the last cell is a menu cell (step S26).

If the cell classification (CCAT) of the last cell is the menu cell, the system CPU 50 executes a presentation control and stops the reproduction while presenting the menu screen, and the system CPU 50 waits for a menu selection input from the user (step S27).

If the selection input is performed by the user through the key/display section 4, the system CPU 50 specifies the connection-destination sequence number from the aforementioned connection sequence number (SNCSQ) and connection-destination sequence number (SCSQN) (step S28). If the connection-type sequence number is specified, the control is returned to step S16, and the reproduction of the target sequence selected by the user on the menu is executed in the aforementioned process.

In step S26, if it is determined that the last cell is not the menu cell, it is determined by using the sequence classification (SCAT) of sequence information (SI) whether the currently reproduced sequence is a connection-type end sequence (step S29). If the determination result shows that the currently reproduced sequence is not the connection-type end sequence, the head sequence number described in the connection-destination sequence number (SCSQN) of the sequence information (SI) is set as connection-destination sequence (step S30) and the control is returned to step S16. Thus, the specified sequence is reproduced with the head sequence number.

In step S29, if the currently reproduced sequence is determined to be the connection-type end sequence, a series of reproducing operations is completed.

In step S19, if the sequence classification (SCAT) obtained from the sequence information (SI) is not the connection-type head sequence, it is then determined if the flag for connection sequence continuation is set (step S31). In step S31, if the flag for connection sequence continuation is set, it is then determined whether the reproduced sequence is a connection-type intermediate sequence (step S32). In step S32, if the sequence is determined to be the intermediate sequence, the control returns to step S21 and the aforementioned step is executed.

In step S32, if the sequence is not determined to be intermediate sequence, it is then determined whether the sequence is the connection-type end sequence (step S33).

In step S33, if the sequence is determined to be the end sequence, the flag for continuation is cleared, and the control returns to step S21 to execute the aforementioned step (step S34).

In step S33, if the sequence is not determined to be the end sequence, the operation is completed.

In step S31, if the continuation flag is not set, the operation is completed.

Figure 17:
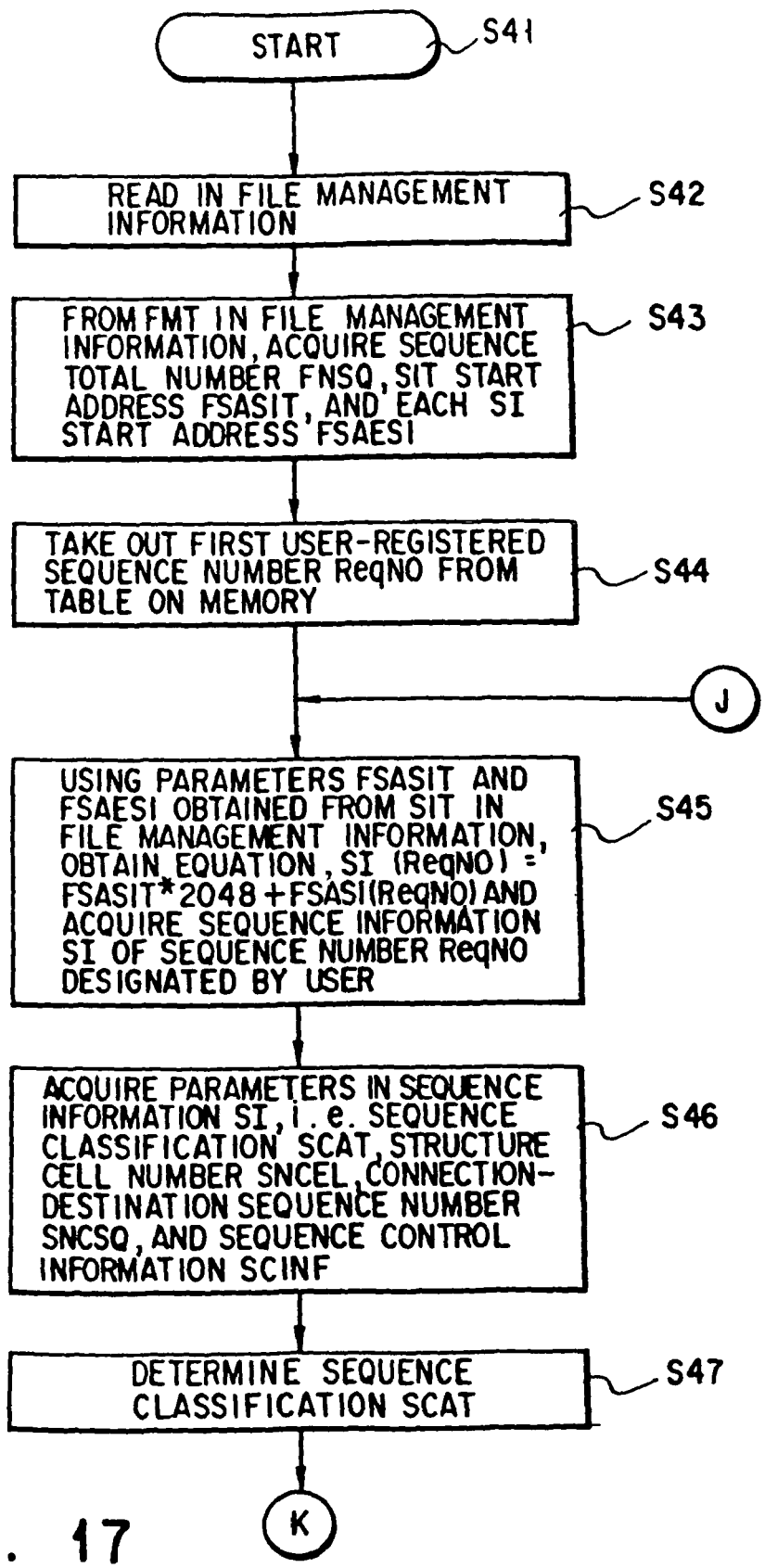
FIG. 17 is a flow chart illustrating another connection-type sequence.
Figure 18:
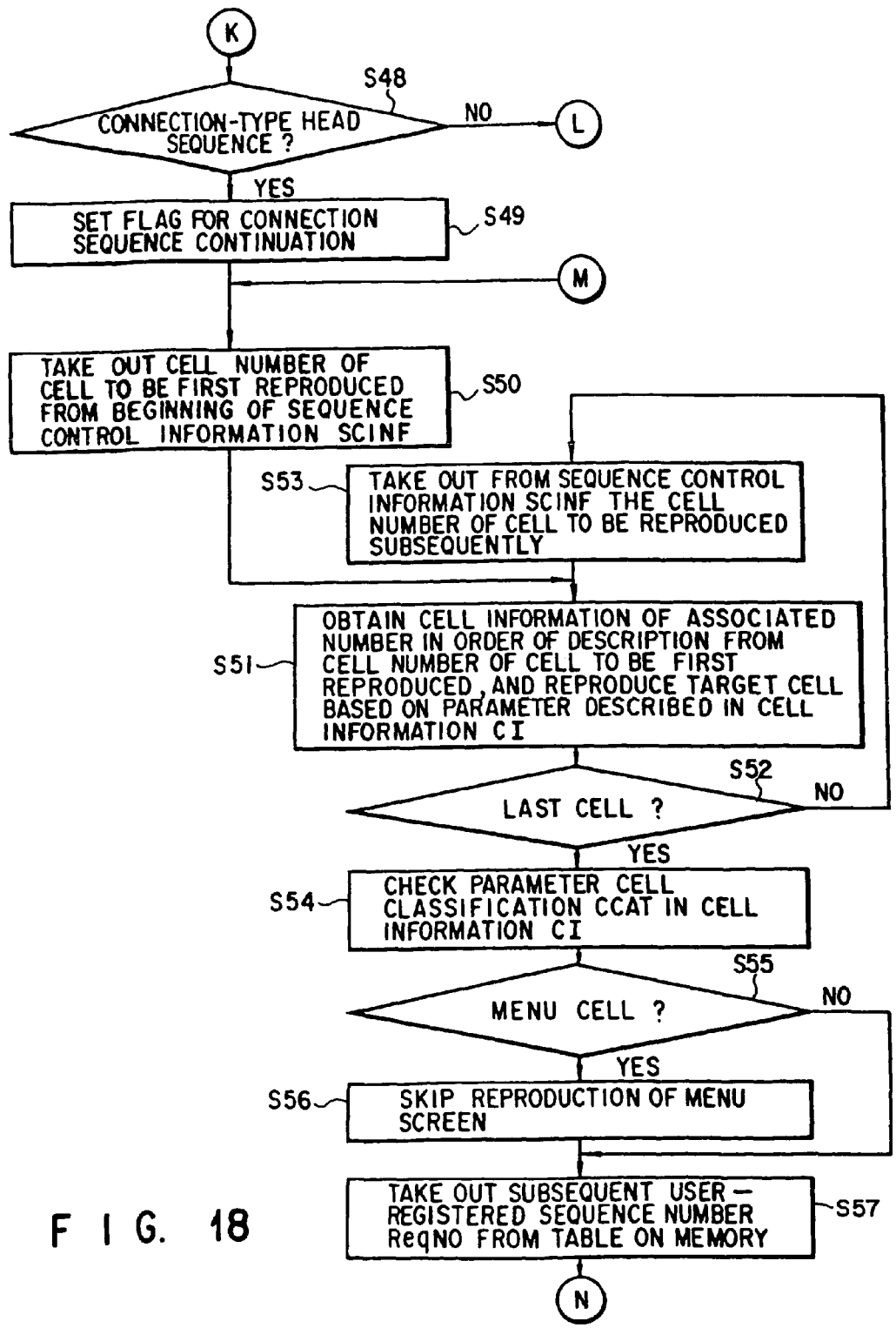
FIG. 18 is a flow chart similarly illustrating the connection-type sequence.
Figure 19:
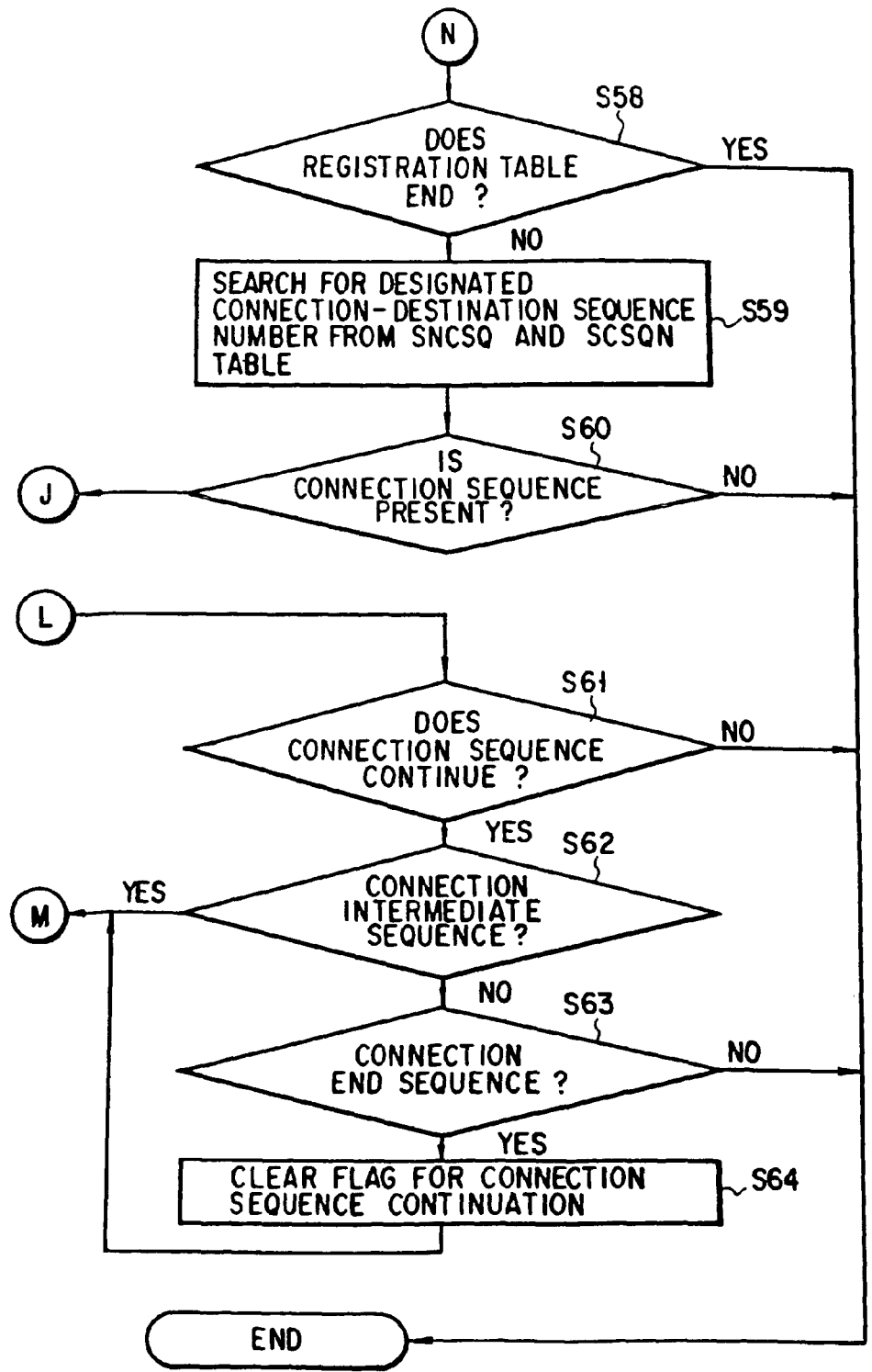
FIG. 19 is a flow chart similarly illustrating the connection-type sequence.

The flow charts of FIGS. 17, 18 and 19 show an example of an operation wherein in the case where a selection process of a sequence number selected by the user is registered in advance in a memory, etc. the associated sequence is automatically reproduced according to the registered content at the time of sequence reproduction. The operation of sequence reproduction according to the registered content of the sequence will now be described with reference to FIGS. 17, 18 and 19.

At first, the user selects a connection sequence number (Req. NO) on the menu screen and inputs the order of sequence reproduction through the key/display section 4. Then, a connection sequence number relating to the order of sequence reproduction is stored on a memory table at a predetermined location in the system ROM/RAM section 52. Thus, the operation for the connection-type sequence begins (step S41). Like the above-described operation flow of the connection-type sequence, the file management information of the file 78 designated by the user and having the file structure as shown in FIG. 6 is read out from the disk 10, and the read-out data is temporarily stored in the data RAM section 56 (step S42). From the file management table (FMT) 113 in the file management information stored in the data RAM section 56, the system CPU section 50 acquires the total sequence number (FNSQ), the start address (FSASIT) of the sequence information table (SIT) 114, and the start address (FSAESI) of each sequence information (SI) unit (step S43).

The head sequence number (Req. NO) of the series of sequence numbers (Req. NO) selected in advance and stored on the memory table is taken out from this memory table (step S44).

The parameters of the start address (FSASIT) of the sequence information table (SIT) and the start address (FSAESI) of the sequence information (SI), which were obtained from the sequence information table (SIT) of the file management information in step S43, are used to detect the presence/absence of the sequence information (SI) corresponding to the sequence number (Req. NO) designated by the user, and the target sequence information (SI) is obtained (step S45). As has already been described, in the start address (FSASIT) of the sequence information table 114, the start address of the sequence information table 114 from the beginning of the file 78, to which the file management table 113 belongs, is described by an offset logic block number. In the sequence information start address (FSAESI), the start address of each sequence information unit in the sequence information table 114 is described by an offset by the number from the beginning of the sequence information table 114. Thus, the sequence number (Req. NO) corresponds to bytes calculated by multiplying the offset logic block number of the start address (FSASIT) of the sequence information table 114 by 2048 bytes equivalent to one block and adding the resultant to the offset byte number of the designated sequence information start address (FSAESI). That is, SI (Req. NO)=FSASIT*2048+FSAESI (Req. NO).

From these two addresses (FSASIT, FSAESI), the following parameters in the sequence information (SI) are obtained: the sequence classification (SCAT), structure cell number (SNCEL), connection sequence number (SNCSQ), connection-destination sequence number (SCSQN) and sequence control information list (SCINF) (step S46). From the sequence information (SI), the first acquired sequence classification (SCAT) is determined (step S47). If the determined classification is not the completion-type sequence, the operation is completed (step S48).

If the determined result is the connection-type head sequence, a flag for connection sequence continuation is set (step S49) and the cell number of the cell to be first reproduced is taken out from the beginning of the sequence control information (SCINF) (step S50).

From the cell information table (CIT) 115 in the file management information, the cell information (CI) of the associated number is obtained in the order of description from the first reproduced cell number. Based on the cell playback address information, the system CPU section 50 reproduces, from the video data area 10 in the file shown in FIG. 6, the target video cell by delivering a read-out/reproduction command to the optical disk drive section 30 (step S51).

If the reproduction of the cell is completed, it is determined whether there is a cell to be reproduced subsequently (i.e., whether the last cell or not) (step S52). Since the number of structure cells (SNCEL) of one sequence is described as sequence information (SI), it is possible to determined whether the reproduced cell is the last one, by determining the cell number of the taken-out video cell.

If the taken-out video cell is not the last one, the cell number of the cell to be reproduced subsequently is taken out from the sequence control information (SCINF), and step S51 is executed once again (step S53).

In step S52, if the taken-out video cell is the last cell, the parameter cell classification (CCAT) in the cell information (CI) is checked (step S54). It is determined whether the cell classification (CCAT) of the last cell is a menu cell (step S55).

If the cell classification (CCAT) of the last cell is the menu cell, the system CPU 50 skips the menu screen since the user has already selected the subsequent sequence (step S56).

The subsequent sequence number (Req. NO) of the series of sequence numbers (Req. NO) selected in advance and stored on the memory table is taken out from this memory table (step S57). It is determined whether the sequence registered on the memory table has been completed (step S58). If all sequences registered have been completed, the reproducing operation is finished.

If there is still a subsequent sequence, the system CPU 50 checks whether there is the designated connection-destination sequence number from the aforementioned connection sequence number (SNCSQ) and connection-destination sequence number (SCSQN) (step S59). If there is no connection-destination sequence, the reproducing operation is finished. If there is still a connection-destination sequence, the control returns to step S45 and the reproduction of the target sequence selected by the user at the initialization is executed in the above-described process.

In step S48, if the sequence classification (SCAT) obtained from the sequence information (SI) is not the connection-type head sequence, it is then determined if the flag for connection sequence continuation is set (step S61). In step S61, if the flag for the connection sequence continuation is set, it is then determined whether the reproduced sequence is a connection-type intermediate sequence (step S62). In step S62, if the sequence is determined to be the intermediate sequence, the control returns to step S50 and the aforementioned step is executed.

In step S62, if the sequence is not determined to be intermediate sequence, it is then determined whether the sequence is the connection-type end sequence (step S63).

In step S63, if the sequence is determined to be the end sequence, the flag for continuation is cleared, and the control returns to step S50 to execute the aforementioned step (step S64).

In step S63, if the sequence is not determined to be the end sequence, the operation is completed.

In step S63, if the continuation flag is not set, the operation is completed.

It is possible to prepare a disk in which video data of a video cell immediately before the last cell, excluding the menu cell, of the video cell group constituting the aforementioned sequence is accompanied with information indicating in advance to the user the presence of plural sequences selected after the video data is reproduced. Thereby, the change of the story development can be indicated to the user in the automatic reproduction by the program, as illustrated in FIGS. 17, 18 and 19.

Figure 20:
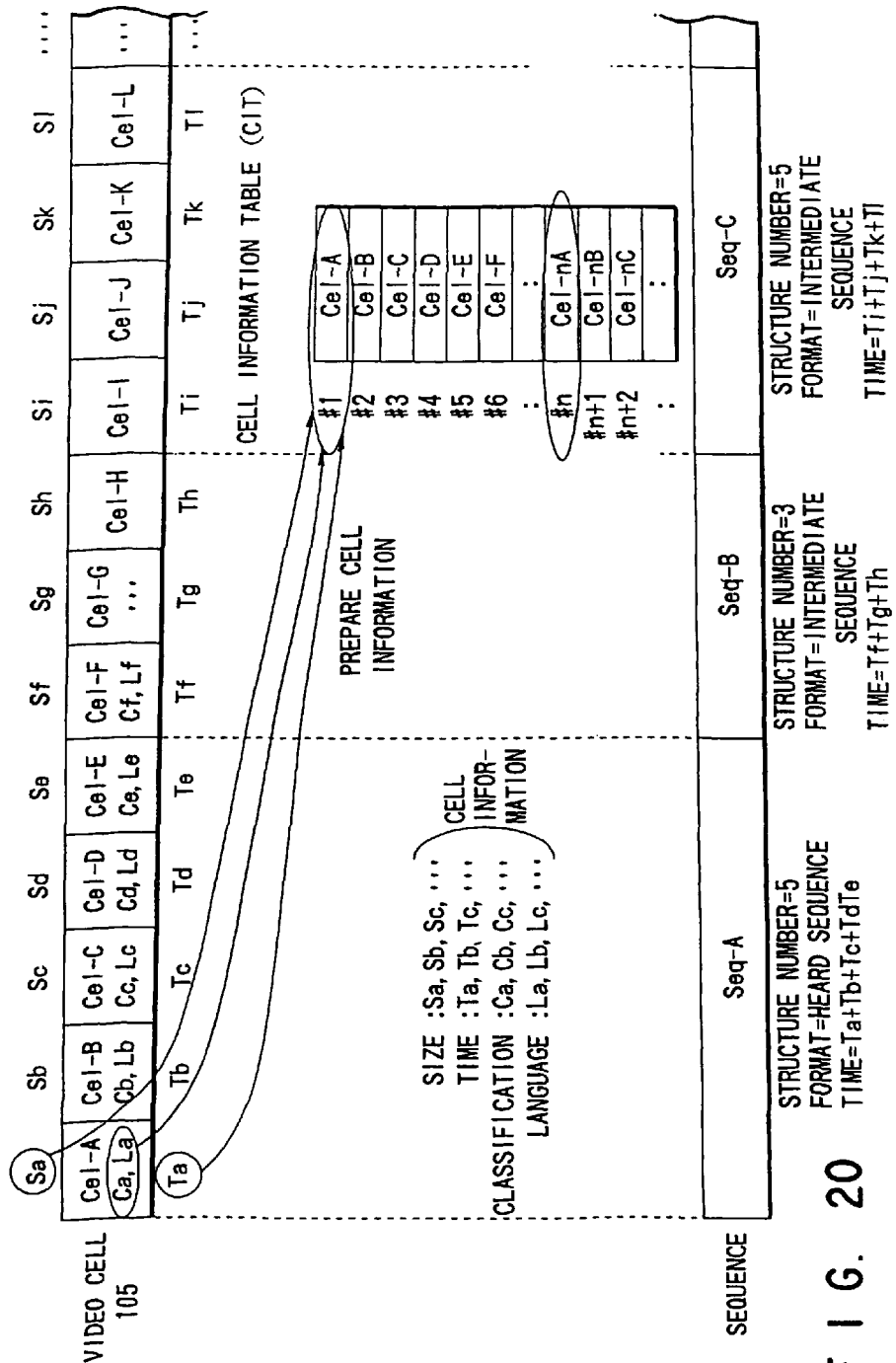
FIG. 20 is an explanatory view showing the relationship between cell information and sequence information.
Figure 21:
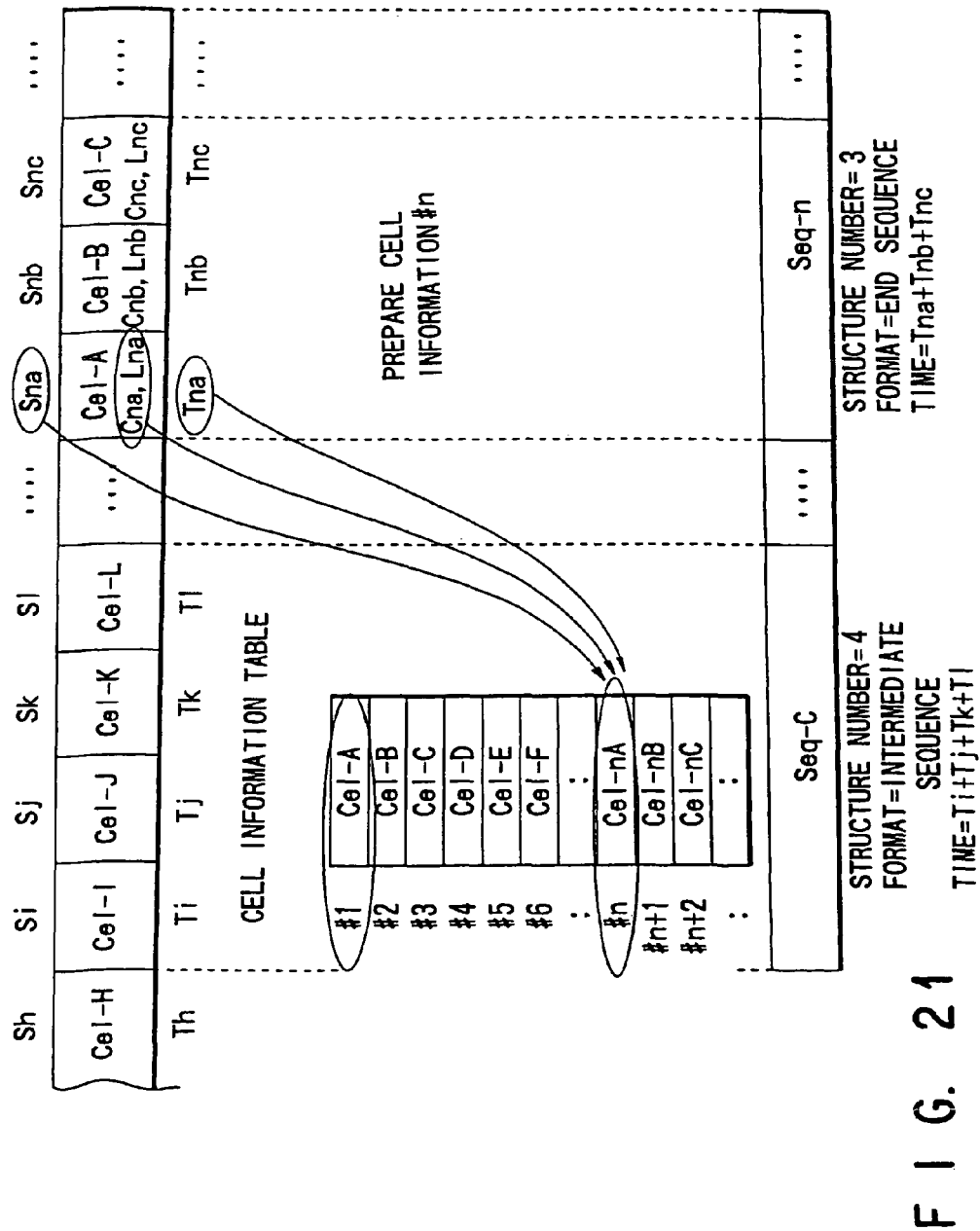
FIG. 21 is an explanatory view similarly showing the relationship between the cell information and sequence information.
Figure 23:
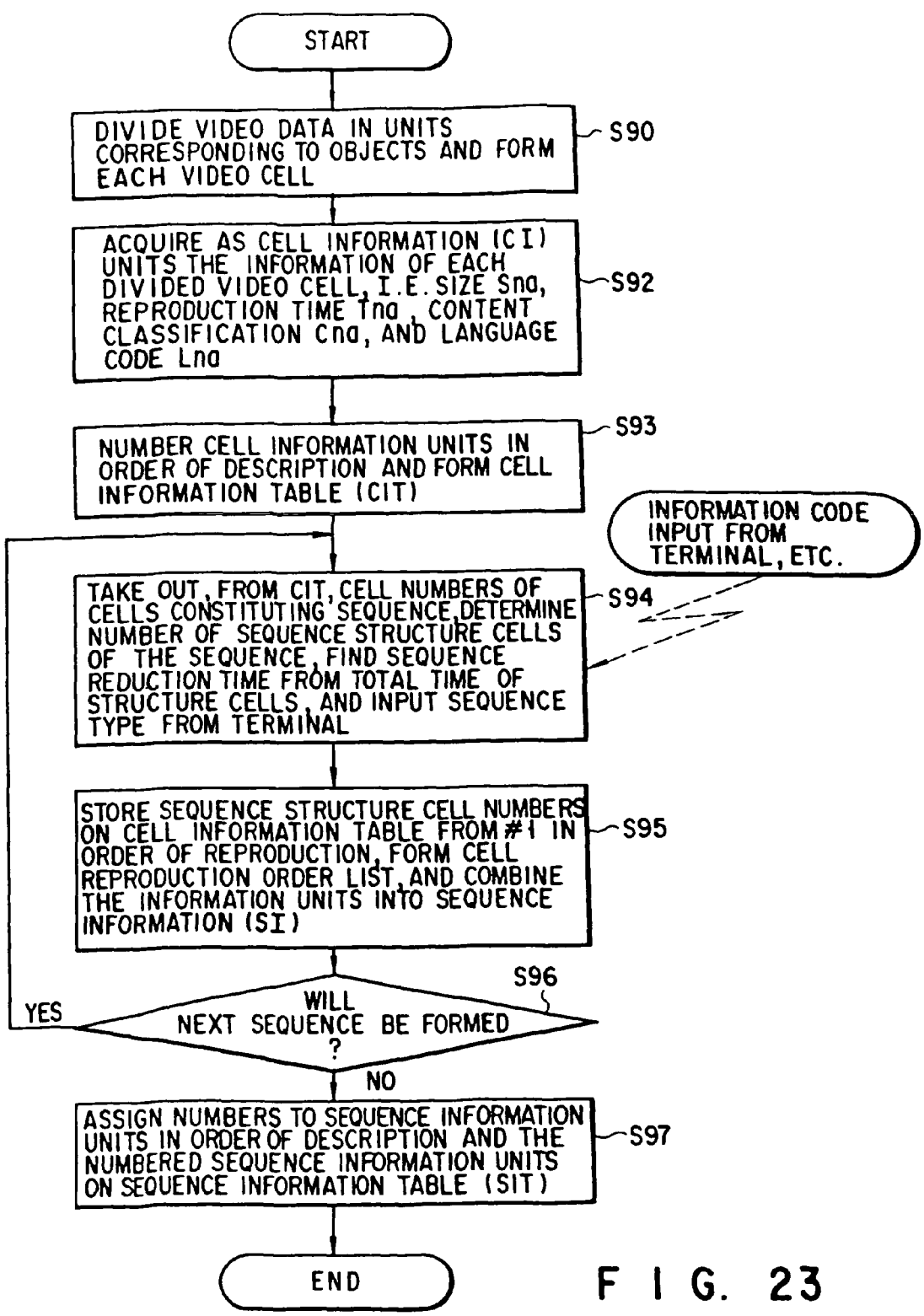
FIG. 23 is a flowchart illustrating a process of forming cell information and sequence information.
Figure 24:
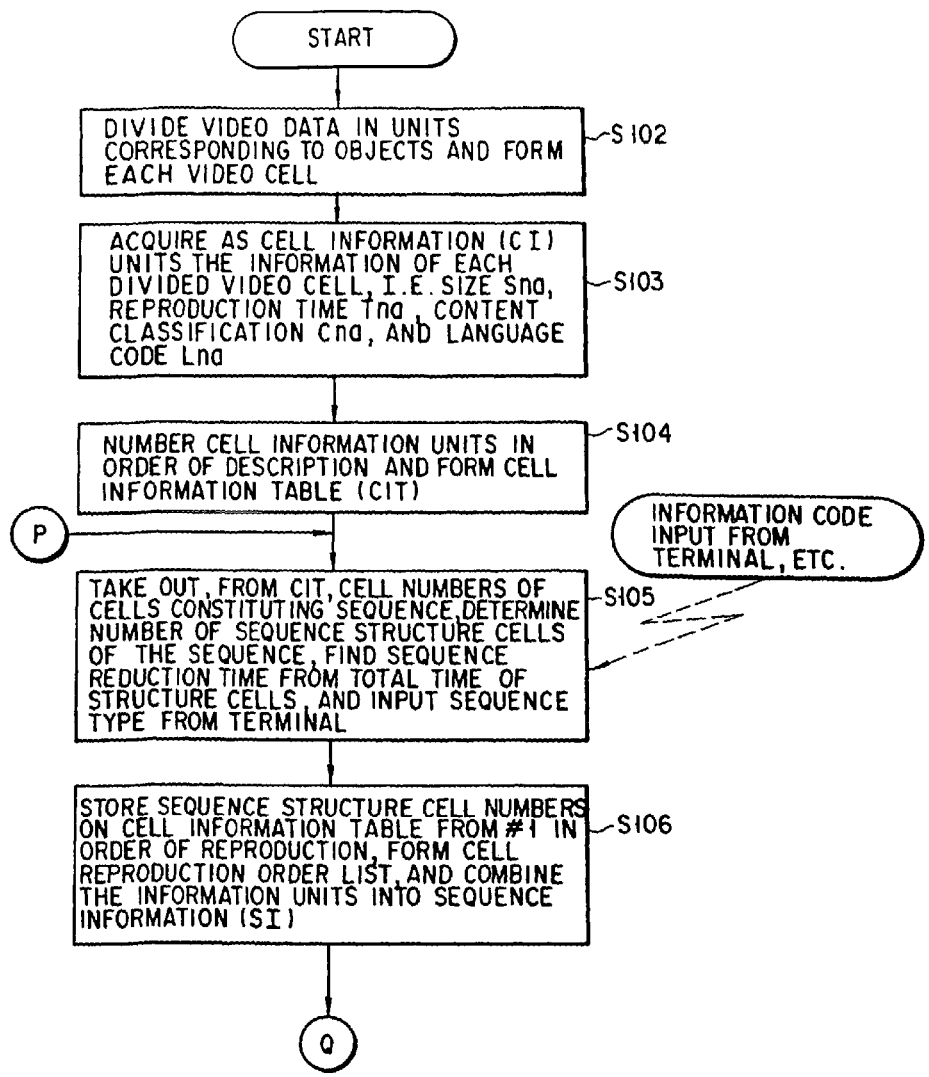
FIG. 24 is a flow chart similarly illustrating the process of forming the cell information and sequence information.
Figure 25:
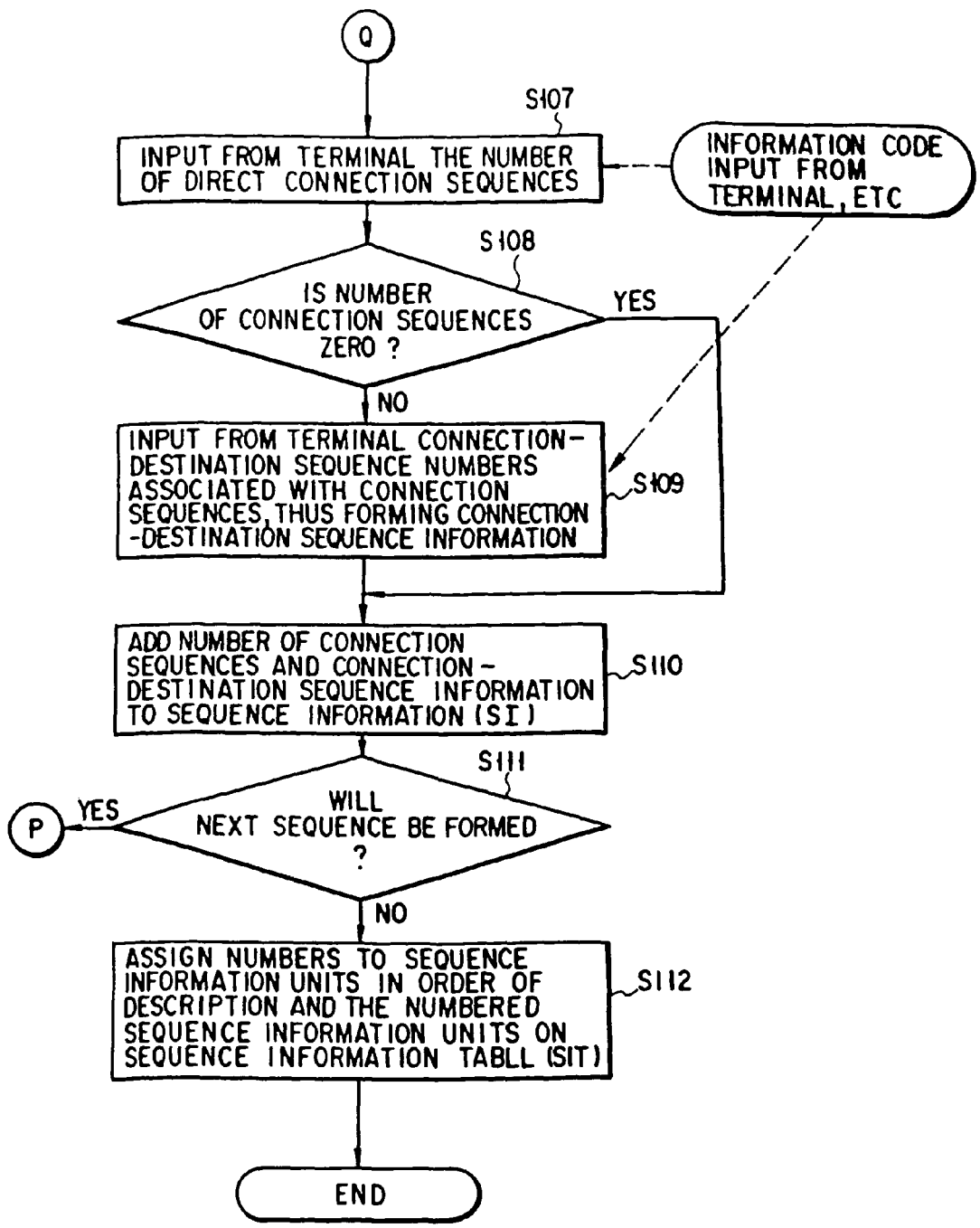
FIG. 25 is a flow chart similarly illustrating the process of forming the cell information and sequence information.

Encoded video data, audio data and sub-picture data (Com Video, Comp Audio, Comp Sub-pict), which will be described later, are combined and converted to a video data file structure. In the step of forming the video data file, one or more sequences are prepared. In the step of forming the sequences, sequence information and cell playback order are acquired. The step of acquiring the sequence information and cell playback order will be described in greater detail with reference to FIGS. 20 to 25. FIGS. 20 and 21 show the relationship between the cell information (CI) associated with the reproduction order of the video cells 105 and the sequence information (SI) associated with sequence 106. FIGS. 20 and 21 are halves of a single drawing. FIGS. 23, 24 and 25 are flow charts illustrating a process of forming the sequence from the sequence information (SI) and cell information (CI) shown in FIGS. 20 and 21.

Now consider the case of forming a sequence (Seq-n) in FIGS. 20 and 21. Video data is divided into units of a necessary size in accordance with objects, thereby preparing plural video cells (step S90 in FIG. 23). In step S92, information items of each of the prepared video cells, i.e. size (Sna) of each video cell, playback time (Tna), content classification (Cna) and associated language code (Lna), are acquired as cell information (CI) units. In step 93, the cell information (CI) units are arranged on a table in the order of description, and a cell information table (CIT) is formed. In step S94, from the cell information table (CIT), cell numbers (#n, #n+1, #n+2) of cells constituting the sequence (Seq-n) are taken out, and the number of sequence structure cells of the sequence is determined. A sequence playback time is found from the total time (Tna+Tnb+Tnc) of the structure cells. In step S95, the sequence structure cell numbers are stored on the cell information table (CIT) from #1 in the order of reproduction, thereby forming a cell playback order list for determining the sequence reproduction order. Thus, the cell playback order list, as shown in FIGS. 22A to 22D, is formed.

The information items on the sequence structure cell number, sequence playback time and cell playback order list are combined to form sequence information (SI)#n. Then, in step S96, the next sequence is formed similarly. In step S97, if there is no sequence to be formed, numbers are assigned to all sequence information (SI) units from #1 in the order of description and the numbered sequence information (SI) units are stored on the sequence information table (SIT). Thus, the formation of the sequence is completed. Finally, the data items on the total sequence number, the start position of the sequence information table, the start position of each sequence information unit and the start position of the cell information table are stored at predetermined locations on the file management table. Thus, the file is formed.

FIGS. 24 and 25 are flow charts illustrating a process of forming a sequence including the number of connection sequences connectable after sequence reproduction and the connection-destination sequence numbers corresponding to the connection sequences. Like the flow of FIG. 23, in step S103, information items of each of the prepared video cells, i.e. size (Sna) of each video cell, playback time (Tna), content classification (Cna) and associated language code (Lna), are acquired as cell information (CI) units. In step 104, the cell information (CI) units are arranged on a table in the order of description, and a cell information table (CIT) is formed. In step S105, from the cell information table (CIT), cell numbers (#n, #n+1, #n+2) of cells constituting the sequence (Seq-n) are taken out, and the number of sequence structure cells of the sequence is determined. A sequence playback time is found from the total time (Tna+Tnb+Tnc) of the structure cells. In addition, the sequence type is input from the terminal. Specifically, the sequence type indicates whether the sequence is a completion-type one or a connection-type one, and indicates, if the sequence is the connection-type one, whether the sequence is a head one, an intermediate one, or an end one. In step 107, if the sequence is a head one or an intermediate one, the number of connection sequences which are reproducible and connectable to the sequence is input. In step S109, the connection-destination sequence numbers associated with the input connection sequences is input and these information items are added to the sequence information (SI). Thus, the sequence is formed (step S110). If the sequence is a completion-type end one or connection-type end one, the number of connection sequences is set to zero in step S108 and the sequence information (SI) is formed without describing information indicating the connection-destination sequence number. In step S106, the sequence structure cell numbers are stored on the cell information table (CIT) from #1 in the order of reproduction, thereby forming a cell playback order list for determining the sequence reproduction order.

The information items on the sequence structure cell number, sequence playback time and cell playback order list are combined to form sequence information (SI)#n. Then, in step S111, the next sequence is formed similarly. In step S112, if there is no sequence to be formed, numbers are assigned to all sequence information (SI) units from #1 in the order of description and the numbered sequence information (SI) units are stored on the sequence information table (SIT). Thus, the formation of the sequence is completed.

In FIGS. 20 and 21, for example, if the sequence (Seq-A) of sequence number #1 is a connection-type sequence connectable immediately after and is connected to either of the sequence (Seq-B) of sequence number #2 and sequence (Seq-C) of sequence number #3, the successive cells constitutes the sequence (Seq-A) and the reproduced last cell (video cell Cel-E in this case) is provided with a menu image for sequence selection. Thus, the sequence (Seq-A) of sequence number #1 is formed.

A theoretical format for a new version which is different from the initial version shown in FIGS. 4 to 11 and is obtained by improving the initial version is explained with reference to FIGS. 26 to 73. The detail operation of the optical disk apparatus shown in FIG. 1 based on the theoretical format for the new version is explained after the theoretical format for the new version which is obtained by improving the initial version is explained.

Figure 26:
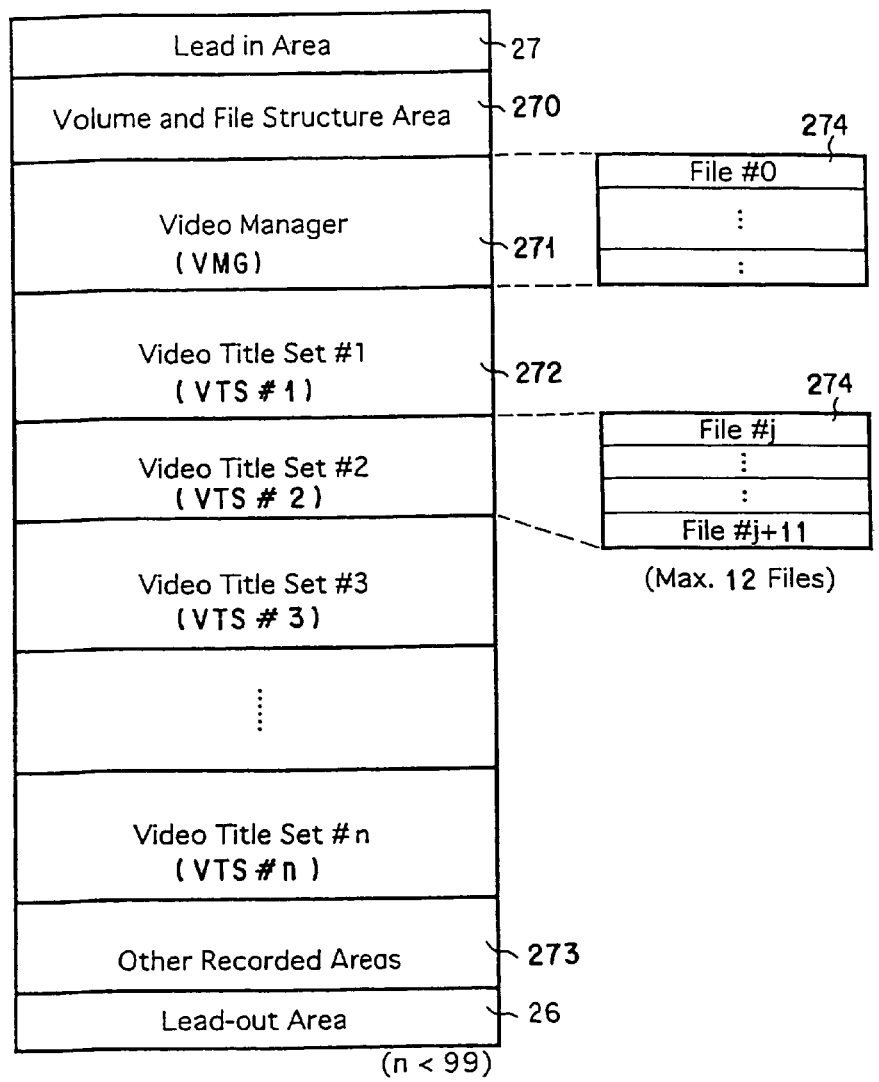
FIG. 26 shows a structure of a logic format of an optical disk according to an improved version of the logic format of the optical disk according to the initial version shown in FIG. 4.

FIG. 26 shows the structure of the theoretical format for the new version which is obtained by improving the initial version. The data recording area 28 between the lead-in area 27 and the lead-out area 26 on the optical disk of FIG. 1 has a volume and file structure as shown in FIG. 26. The structure has been determined in conformity to specific logic format standards, such as micro UDF or ISO 9660. The data recording area 28 is physically divided into a plurality of sectors as described earlier. These physical sectors are assigned serial numbers. In the following explanation, a logical address means a logical sector number (LSN) as determined in micro UDF or ISO 9660. Like a physical sector, a logical sector contains 2048 bytes. The numbers (LSN) of logical sectors are assigned consecutively in ascending order as the physical sector number increments.

As shown in FIG. 26, the volume and file structure is a hierarchical structure and contains a volume and file structure area 270, a video manager (VMG) 271, at least one video title set (VTS) 272, and other recorded areas 273. These areas are partitioned at the boundaries between logical sectors. As with a conventional CD, a logical sector is defined as a set of 2048 bytes. Similarly, a logical block is defined as a set of 2048 bytes. Therefore, a single logical sector is defined as a single logical block.

The volume and file structure area 270 corresponds to a management area determined in micro UDF or ISO 9660. According to the description in the management area, the video manager 271 is stored in the system ROM/RAM section 52. As explained with reference to FIG. 27, the information used to manage video title sets is described in the video manager, which is composed of a plurality of files 274, starting with file #0. In each video title set (VTS) 272, compressed video data, compressed audio data, compressed sub-picture data, and the playback information about these data items are stored as explained later. Each video title set is composed of a plurality of files 274. The number of video title sets is limited to 99 maximum. Furthermore, the number of files 74 (from File #j to File #j+12) constituting each video title set is 12 at most. These files are also partitioned at the boundaries between logical sectors.

In the other recorded areas 273, the information capable of using the video title sets 272 is recorded. The other recorded areas 273 are not necessarily provided.

As shown in FIG. 27, the video manager 271 contains at least three items each corresponding to individual files 274. Specifically, the video manager 271 is made up of video manager information (VMGI) 275, a video object set (VMGM_VOBS) 276 for video manager menu, and backup (VMGI_BUP) 277 of video manager information. Here, the volume manager information (VMGI) 275 and the backup (VMGI_BUP) 277 of video manager information are determined to be indispensable items, and the video object set (VMGM_VOBS) 276 for video manager menu is determined to be an optional item. In the video object set (VMGM-VOBS) 276 for VMGM, the video data, audio data, and sup-picture data for a menu of the volumes of the optical disk managed by the video manager 271 are stored.

As in the case of video reproduction which will be explained later, the volume name of the optical disk and the explanation of the audio and sub-picture accompanied by the display of the volume name are displayed by the video object set (VMGM_VOBS) 276 for VMGM, and selectable items are displayed by the sub-picture. If video data of all matches a boxer X had fought until he won the world championship is reproduced by the video object set (VMGM_VOBS) 276, the fighting pose of Boxer X will be displayed along with the volume name showing his glorious fighting history, the theme song for him will be generated, and his fighting history will be displayed by the sub-picture. Further, questions are made to the user as to in which language (English, Japanese, or any other language) the narration should be presented, and as to in which other language the subtitle should be presented by the sub-picture. Thus, the video object set (VMGM_VOBS) 276 for VMGM enables the user to enjoy seeing any match Boxer X has fought, while listing to the narration in, for example, English and reading the subtitle in, for example, Japanese.

Figure 28:
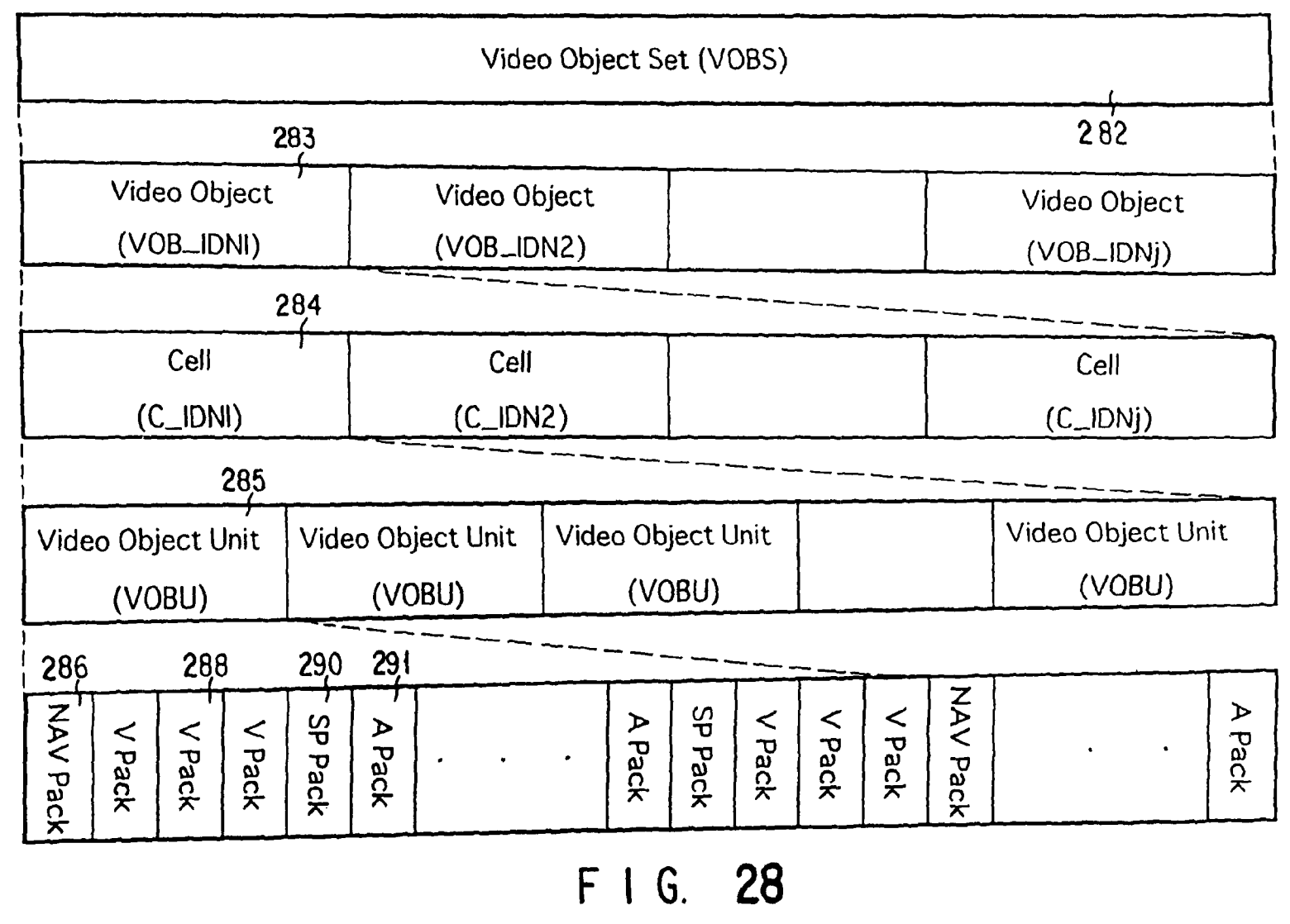

The structure of a video object set (VOBS) 282 will be described with reference to FIG. 28. FIG. 28 shows an example of a video object set (VOBS) 282. The video object set (VOBS) 282 is provided in three types 276, 295 and 296 for two menus and a title. Specifically, in the video object set (VOBS) 282, a video title set (VTS) 272 contains a video object set (VTSM_VOBS) 295 for a menu of video title sets and a video object set (VTSTT_VOBS) for the titles of at least one video title set, as will be explained later. Each video object 282 set has the same structure except that their uses differ.

As shown in FIG. 28, a video object set (VOBS) 282 is defined as a set of one or more video objects (VOB). The video objects 283 in a video object set (VOBS) 282 are used for the same application. A video object set (VOBS) 282 for menus is usually made up of a single video object (VOB) 283 and stores the data used to display a plurality of menu screens. In contrast, a video object set (VTSTT_VOBS) 282 for title sets is usually composed of a plurality of video objects (VOB) 283.

Taking the boxing match as example, a video object (VOB) 283 corresponds to the video data of each match played by Boxer X. Specifying a particular video object (VOB) enables, for example, Boxer X's eleventh match for a world championship to be reproduced on a video. The video object set (VTSM_VOBS) 95 for a menu of the video title sets 272 contains the menu data for the matches played by boxer X. According to the presentation of the menu, a particular match, for example, BoxerX's eleventh match for a world championship, can be specified. In the case of a usual single story movie, one video object 283 (VOB) corresponds to one video object set (VOBS) 282. One video stream is completed with one video object set (VOBS) 282. In the case of a collection of animated cartoons or an omnibus movie, a plurality of video streams each corresponding to individual stories are provided in a single video object set (VOBS) 282. Each video stream is stored in the corresponding video object. Accordingly, the audio stream and sub-picture stream related to the video stream are also completed with each video object (VOB) 283.

An identification number (IDN#j) is assigned to a video object (VOB) 283. By the identification number, the video object (VOB) 283 can be identified. A single video object (VOB) 283 is made up of one or more cells 284. Although a usual video stream is made up of a plurality of cells, a menu video stream, or a video object (VOB) 283 may be composed of one cell. A cell is likewise assigned an identification number (C_IDN#j). By the identification number (C_IDN#j), the cell 284 is identified.

As shown in FIG. 28, each cell 284 is composed of one or more video object units (VOBU) 285, usually a plurality of video object units (VOBU) 285. A video object unit (VOBU) 285 is defined as a pack train having a single navigation pack (NAV pack) 286 at its head. Specifically, a video object unit (VOBU) 285 is defined as a set of all the packs recorded, starting at a navigation pack (NAV pack) to immediately in front of the next navigation pack. The playback time of the video object unit (VOBU) corresponds to the playback time of the video data made up of one or more GOPs (Group of Pictures) contained in the video object (VOBU). The playback time is set at 0.4 seconds or more second and less than one second. In the MPEG standard, a single GOP is set at, usually, 0.5 seconds; it is compressed screen data for reproducing about 15 screens during that period.

When a video object unit includes video data as shown in FIG. 28, more than one GOP composed of video packs (V packs) 288, a sub-picture pack (SP pack) 290, and an audio pack (A pack) 291 all determined in the MPEG standard, are arranged to produce a video data stream. Regardless of the number of GOPs, a video object unit (VOBU) 285 is determined on the basis of the playback time of a GOP. The video object always has a navigation pack (NAV pack) 286 at its head. Even when the playback data consists only of audio and/or sub-picture data, it will be constructed using the video object unit as a unit. Specifically, even if a video object unit is constructed only of audio packs, the audio packs to be reproduced within the playback time of the video object unit to which the audio data belongs will be stored in the video object unit, as with the video object of video data.

The video manager 271 will be explained with reference to FIG. 27. The video management information 75 placed at the head of the video manager 271 contains information on the video manager itself, the information used to search for titles, the information used to reproduce the video manager menu, and the information used to manage the video title sets (VTS) 272 such as the attribute information on video titles. The volume management information contains at least three tables 278, 279 and 280 in the order shown in FIG. 27. Each of these tables 278, 279 and 280 is aligned with the boundaries between logical sectors. A first table, a video manager information management table (VMGI_MAT) 278, is a mandatory table. Written in the first table are the size of the video manager 271, the start address of each piece of the information in the video manger 271, and the start address of and the attribute information about the video object set (VMGM_VOBS) 276 for a video manager menu. As explained later, the attribute information includes the video attribute information, the audio attribute information, and the sub-picture attribute information. According to these pieces of attribute information, the modes of the decoders 58, 60 and 62 are changed, thereby enabling the video object set (VMGM_VOBS) 276 to be reproduced in a suitable mode.

Written in a second table of the video manager 271, i.e., a title search pointer table (TT_SRPT) 279, are the start addresses of the video titles stored on the optical disk that are selectable according to a title number entered from the key/display section 4 on the apparatus.

Described in a third table of the video manager 271 are a video title set attribution table (VTS_ATRT) 280, the attribute information determined in the video title set (VTS) 272 in the volumes of the optical disk. Specifically, in this table, the following items are described as attribute information the number of video title sets (VTS) 272, video title set (VTS) 272 numbers, video attributes, such as a video data compression scheme, audio stream attributes, such as an audio coding mode, and sub-picture attributes, such as the type of sub-picture display.

The details of the contents of the volume management information management table (VMGI_MAT) 278, title search pointer table (TT_SRPT) 278, and video title set attribute table (VTS_ATRT) 280 will be described with reference to FIGS. 29 to 43.

As shown in FIG. 29, described in the volume management information management table (VMGI_MAT) 278 are an identifier (VMG_ID) for the video manager 271, the size of video management information in the number of logical blocks (a single logical block contains 2048 bytes, as explained earlier), the version number (VERN) related to the standard for the optical disk, commonly known as a digital versatile disk (digital multipurpose disk, hereinafter, referred to as a DVD), and the category (VMG_CAT) of the video manger 271.

Described in the category (VMG_CAT) of the video manager 271, a flag indicating whether or not the DVD video directory inhibits copying. Further described in the table (VMGI_MAT) 278 are a volume set identifier (VLMS_ID), the number of video title sets (VTS_Ns), the identifier for a provider supplying the data to be recorded on the disk (PVR_ID), the start address (VMGM_VOBS_SA) of the video object set (VMGM_VOBS) 276 for a video manager menu, the end address (VMGI_MAT_EA) of a volume manager information management table (VMGI_MAT) 278, and the start address (TT_SRPT_SA) of a title search pointer table (TT_SRPT). If the video object set (VMGM_VOBS) 295 for the VMG menu is absent, "00000000h" will be described in its start address (VMGM_VOBS_SA). The end address (VMGI_MAT_EA) of VMG_MAT 278 is described by the number of bytes, relative to the head byte of VMGI_MAT 278. The start address (TT_SRPT_SA) of the TT-SRPT 279 is described by the number of logical blocks, relative to the head logical block of VMGI 275.

Furthermore, in the table 278 the start address (VTS_ATRT_SA) of the attribute table (VTS_ATRT) of video title sets 272 (VTS) is represented by the number of bytes, relative to the first byte in the VMGI manager table (VMGI_MAT) 271. Also described in the table 278 is the video attribute (VMGM_V_AST) of the video manager menu (VMGM) video object set 276. Further described in the table 278 are the number (VMGM_AST_Ns) of audio streams in the video manager menu (VMGM), the attributes (VMGM_AST_ATR) of audio streams in the video manager menu (VMGM), the number (VMGM_SPST_Ns) of sub-picture streams in the video manager menu (VMGM), and the attributes (VMGM_SPST_ATR) of sub-picture streams in the video manager menu (VMGM). When the video manager menu (VMGM) is not present, "00000000h" is described in the video manager menu PGCI unit table (VMGM_PGCI_UT) 248.

An explanation of the structure shown in FIG. 27 will be resumed. In the title search pointer table (TT_SRPT) 279 of FIG. 27, the title search pointer table information (TSPTI) is first described as shown in FIG. 30. Then, as many title search pointers (TT_SRP) for input numbers 1 to n (n<=99) as are needed are described consecutively. When only the playback data for a single title, for example, only the video data for a single title, is stored in a volume of the optical disk, only a single title search pointer (TT_SRP) 293 is described in the table (TT_SRPT) 279.

The title search pointer table information (TSPTI) 292 contains the number of entry program chains (EN_PGC_Ns) and the end address (TT_SRPT_EA) of the title search pointer (TT-SRP) 293 as shown in FIG. 31. The address (TT_SRPT_EA) is represented by the number of bytes, relative to the first byte in the title search pointer table (TT_SRPT) 279. As shown in FIG. 32, described in each title search pointer (TT_SRP) are: a video title set number (VTSN), the number of parts of title (TT_Ns), the title in the video title set searched by the title search pointer (TT_SRP), and the video start address (VTS_SA) of the video title set 272. The video start address (VTS_SA).

The contents of the title search pointer (TT_SRP) 293 specifies a video title set to be reproduced and a program chain (PGC) as well as a location in which the video title set 272 is to be stored. The start address (VTS_SA) of the video title set 272 is represented by the number of logical blocks in connection with the title set specified by the video title set number (VTSN).

A program chain 287 is defined as a set of programs 289 that reproduce the story of a title. In the case of a program chain for a menu, still picture programs or moving picture programs are reproduced one after another to complete a menu for a single title. In the case of a program chain for a title set, a program chain corresponds to a chapter in a story consisting of programs and the movie of a single title is completed by reproducing program chains consecutively. As shown in FIG. 33, each program 289 is defined as a set of aforementioned cells 284 arranged in the order in which they are to be reproduced. To reproduce the program chain 287, a pre-navigation command (PRE_NV_CMD) 322 is executed to reproduce the programs 289 stored in the program chain 287. Upon completion of the execution of the command 322, a post command 324 is executed. Further, an inter-cell navigation command 326 is provide for a cell 284, if necessary, to control the reproduction in the program 289. The pre-navigation command 322, post command 324 and inter-cell navigation command 326 will be explained later in detail, with reference to FIG. 61.

Figures 34, 35, 36:
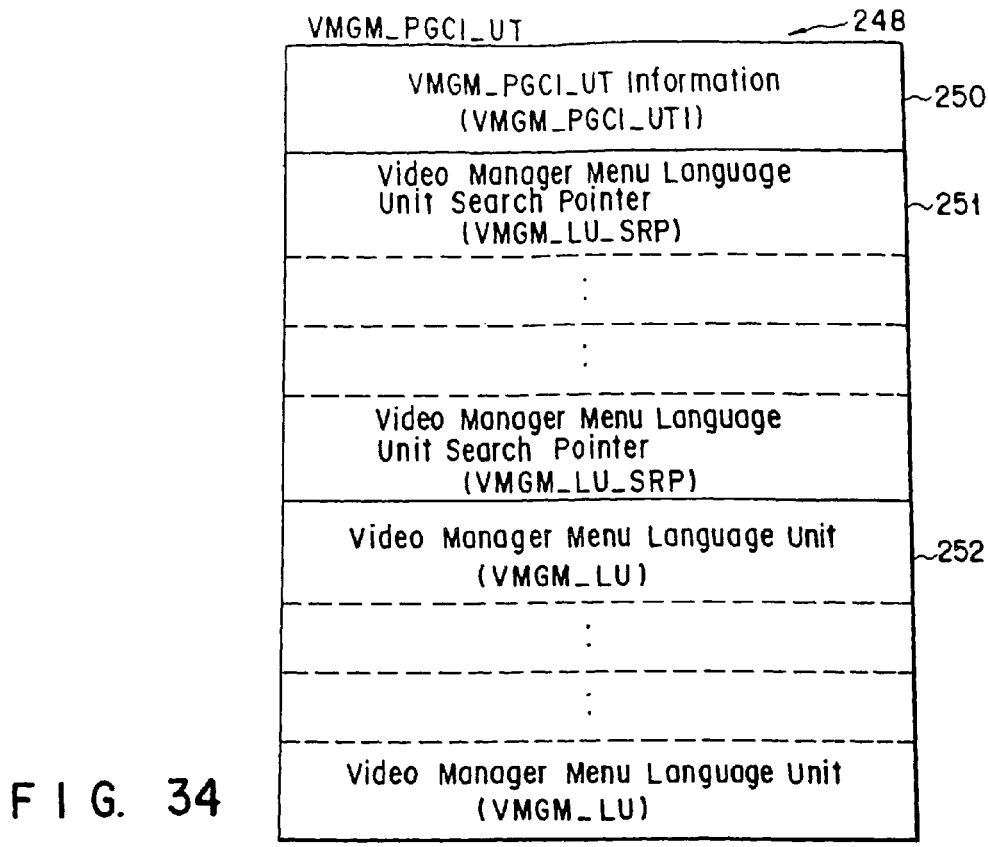
FIG. 34 shows a structure of a video manager menu PGCI unit table (VMGM_PGCI_UT) shown in FIG. 27.
FIG. 35 shows parameters and contents of VMGM_PGCI unit table information shown in FIG. 23.
FIG. 36 shows parameters and contents of a video manager menu language unit search pointer shown in FIG. 35.

In the video manager menu PGCI unit table (VMGM_PGCI_UT) 280 shown in FIG. 27, video manager men PGCI unit table information (VMGM_PGCI_UTI) 250 is first described as shown in FIG. 34. Video manager menu language unit search pointers (VMGM_LU_SRP) 251 are successively described in the same numbers as the number n of languages. And the video manager menu language unit (VMGM_LU) 252 searched for by the search pointer is described. In this case, it is supposed that the menu defined by the video manager menu language unit (VMGM_LU) must contain only one PGC.

In the video manager menu PGCI unit table information (VMGM_PGCI_UTI) 280, the number (VMGM_LU_Ns) of VMGM language units (VMGM_LU) and the end address (VMGM_PGCI_UT_EA) of the VMGM_PGCI unit table (VMGM_PGCI_UT) 280 are described as shown in FIG. 35. In each of n video manager menu language unit search pointers (VMGM_LU_SRP) 251 prepared for respective languages, the language code (VMGM_LCD) of the video manager menu and the start address (VMGM_LU_SA) of the language unit (VMGM_LU) of the video manager menu (VMGM) are described as shown in FIG. 36. The end address (VMGM_PGCI_UT_EA) of the VMGM_PGCI_UT 280 and the start address (VMGM_LU_SA) of the VMGM_LU 252 are described by use of the logical block number from the head byte of the VMGM_PGCI unit table (VMGM_PGCI_UT) 280.

In each of n VMGM language units (VMGM_LU) 252 prepared for the respective languages, the video manager menu language unit information (VMGM_LUI) 253 and VMGM_PGCI search pointers (VMGM_PGCI_SRP) of a number corresponding to the number of menu program chains are provided as shown in FIG. 37, and VMGM_PGC information items (VMGM_PGCI) 255 searched for by the search pointer and corresponding in number to the program chains for menu are provided.

In each language unit information (VMGM_LUI) 253, the number (VMGM_PGCI_Ns) of VMGM_PGCIs and the end address (VMGM_LUI_EA) of the language unit information (VMGM_LUI) are described as shown in FIG. 38. Further, in each VMGM_PGCI search pointer (VMGM_PGCI_SRP), the VMGM_PGC category (VMGM_PGC_CAT) and the start address (VMGM_PGCI_SA) of VMGM_PGCI are described as shown in FIG. 39. The end address (VMGM_LUI_EA) of VMGM_LUI and the start address (VMGM_PGCI_SA) of VMGM_PGCI are described by use of the relative logical block number from the head byte of VMGMLU. As the VMGM_PGC category (VMGM_PGC_CAT), information indicating that the program chain is an entry program chain or title menu is described.

As shown in FIG. 40, the video title set attribute table (VTS_ART) 280 describing the attribute information on the video title set (VTS) 272 (shown in FIG. 27) contains video title set attribute table information (VTS_ATRTI) 266, n video title set attribute search pointers (VTS_ATR_SRP) 267, and n video title set attributes (VTS_ARTR) 268, which are arranged in that order. The video title set attribute table information (VTS_ATRTI) 266 contains information on the table 280. In the video title set attribute search pointers (VTS_ATR_SRP) 267, description is made in the order corresponding to the title sets #1 to #n. Similarly, description is made of the pointers for searching for the video title set attributes (VTS_ATR) 268 written in the order corresponding to the title sets #1 to #n. Described in each of the video title set attributes (VTS_ATR) 268 is the attribute of the corresponding title set (VTS).

More specifically, the video title set attribute information (VTS_ATRTI) 266 contains a parameter (VTS_Ns) for the number of video titles and a parameter (VTS_ATRT_EA) for the end address of the video title set attribute table (VTS_ART) 280 as shown in FIG. 41. As shown in FIG. 42, in each video title set attribute search pointer (VTS_ATR_SRP) 267 there is described a parameter (VTS_ATR_SA) for the start address of the corresponding video title set attribute (VTS_ATR) 268. As shown in FIG. 43, the video title set attribute (VTS_ATR) 268 contains a parameter (VTS_ATR_EA) for the end address of the video title set attribute (VTS_ATR) 268, a parameter (VTS_CAT) for the category of the corresponding video title set, and a parameter (VTS_ATRI) for attribute information on the corresponding video title set. Because the attribute information on the video title set contains the same contents of the attribute information on the video title set described in the video title set information management table (VTS_MAT), which will be explained later with reference to FIGS. 31 and 32, explanation of it will be omitted.

The structure of the logic format of the video title set (VTS) 272 shown in FIG. 26 will be explained with reference to FIG. 44. In each video title set (VTS) 272, four items 294, 295, 296 and 297 are described in the order shown in FIG. 44. Each video title set (VTS) 272 is made up of one or more video titles having common attributes. The video title set information (VTSI) contains the management information on the video titles 272, including information on playback of the video object set 296, information on playback of the title set menu (VTSM), and attribute information on the video object sets 272.

Each video title set (VTS) 272 includes the backup 297 of the video title set information (VTSI) 294. Between the video title set information (VTSI) 294 and the backup (VTSI_BUP) of the information, a video object set (VTSM_VOBS) 295 for video title set menus and a video object set (VTSTT_VOBS) 296 for video title set titles are arranged. Both video object sets (VTSM_VOBS and VTSTT_VOBS) 295 and 296 have the structure shown in FIG. 28, as explained earlier.

The video title set information (VTSI) 294, the backup (VTSI_BUP) 297 of the information, and the video object set (VTSTT_VOBS) 296 for video title set titles are items indispensable to the video title sets 272. The video object set (VTSM_VOBS) 295 for video title set menus is an option provided as the need arises.

Figure 44:
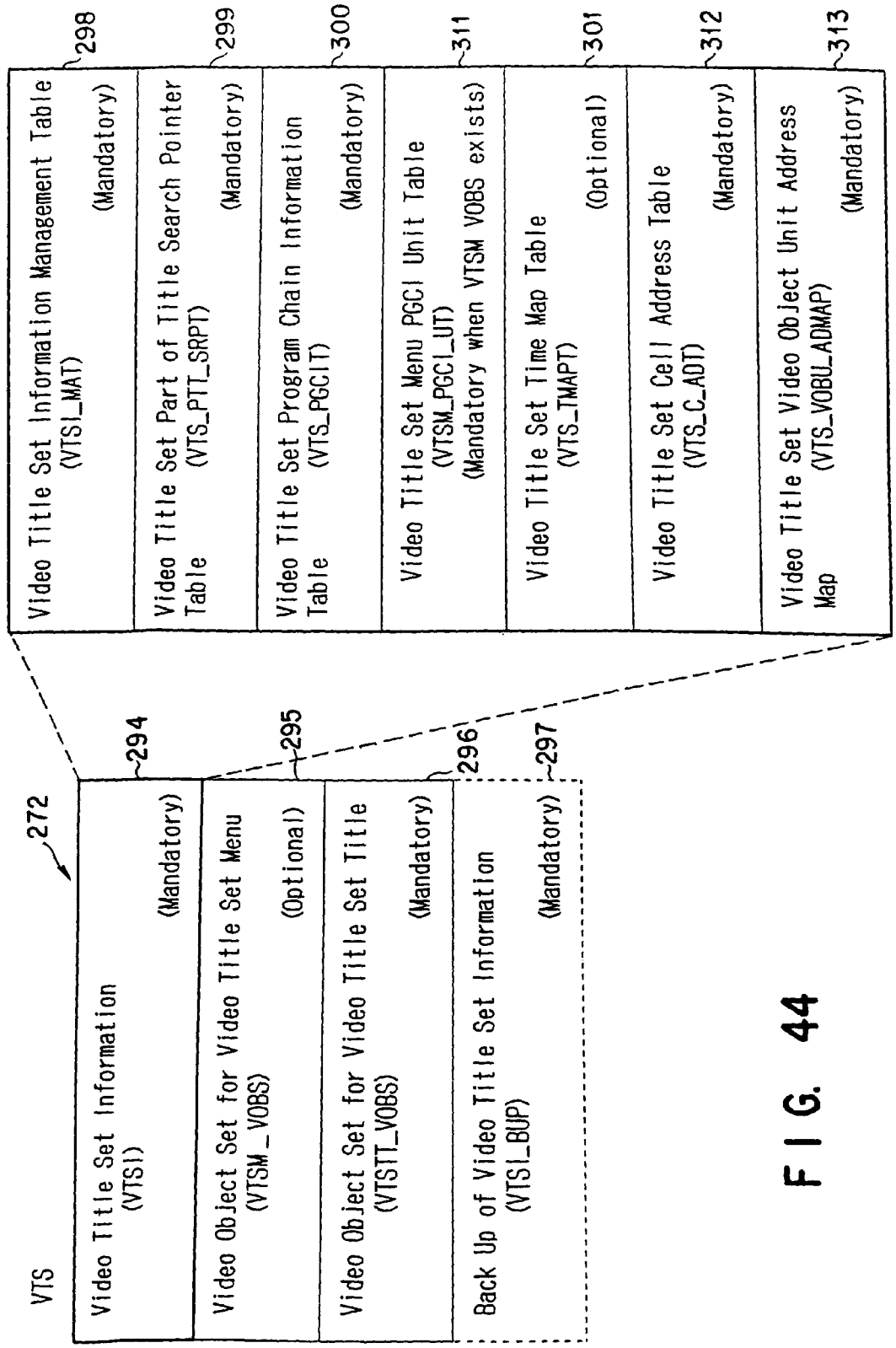
FIG. 44 shows a structure of a video title set shown in FIG. 26.

The video title set information (VTSI) 294 consists of seven tables 298, 299, 300, 301, 311, 312 and 313 as shown in FIG. 44. These seven tables 298, 299, 300, 301, 311, 312 and 313 are forced to align with the boundaries between logical sectors.

The video title set information management table (VTSI_MAT) 298, i.e., the first table, is a mandatory table. Described in the table 298 are the size of the video title set (VTS) 272, the start address of each piece of information in the video title set (VTS) 272, and the attributes of the video object sets (VOBS) 282 in the video title set (VTS) 272.

The video title set part-of-title search pointer table (VTS_PTT_SRPT) 299, which is the second table, is mandatory table. It is in this table that the selectable video titles, that is, program chain (PGC) or programs (PG) contained in the selectable video title set 272 are descried in accordance with the number that the user has entered from the key/display section 4. Entering the desired one of the entry numbers listed in the pamphlet coming with the optical disk 10 from the key/display section 4, the user can watch the video, starting with the section in the story corresponding to the entered number.

The video title set program chain information table (VTS_PGCIT) 300, which is the third table, is a mandatory table. Described in this table 300 is the VTS program chain information (VTS_PGCI) or information on VTS program chains.

The video title set menu PGCI unit table (VTSM_PGCI_UT) 311, which is the fourth table, is a mandatory item when the video object set (VTSM_VOBS) 95 for video title set menus is provided. Described in the table 311 are information on program chains for reproducing the video title set menu (VTSM) provided for each language. By referring to the video title set menu PGCI unit table (VTSM_PGCI_UT) 311, a program chain for the specified language in the video object set (VTSM_VOBS) 295 can be acquired and reproduced as a menu.

The video title set time search map table (VTS_MAPT) 301, which is the fifth table, is an optional table provided as the need arises. Described in the table 301 is information on the recording location of the video data in each program chain (PGC) in the title set 272 to which the map table (VTS_MAPT) belongs, for a specific period of time of display.

The video title set cell address table (VTS_C_ADT) 312, which is the sixth table, is a mandatory item. Described in the table 312 are the addresses of each cell 84 constituting all the video objects 83 or the addresses of cell pieces constituting cells in the order the identification numbers of the video objects are arranged. Here, a cell piece is a piece constituting a cell. Cells undergo an interleaving process in cell pieces and are arranged in a video object 283.

The video object title set video object unit address map (VTS_VOBU_ADMAP) 313, which is the seventh table, is a mandatory item. Described in the table 313 are the start addresses of all the video object units 285 in the video title set are described in the order of arrangement.

The video title information management table (VTSI_MAT) 298, video title set part-of-title search pointer table (VTS_PTT_SRPT) 299, video title set program chain information table (VTS_PGCIT) 300 and video title set menu PGCI unit table (VTSMPGCI_UT) 311, all shown in FIG. 44, will be described with reference to FIG. 45 to 72.

FIG. 45 shows the contents of the video title information manager table (VTSI_MAT) 298, in which the video title set identifier (VTS_ID), the size (VTS_SZ) of the video title set 272, the version number (VERN) of the DVD video specification, the category (VTS_CAT) of the video title set 272, and the end address (VTSI_MAT_EA) of the video title information manager table (VTSI_MAT) 298 are described in that order.

Furthermore, described in the table (VTSI_MAT) 298 are the start address (VTSM_VOBS_SA) of the video object set (VTSM_VOBS) 295 for the VTS menu (VTSM) and the start address (VTSTT_VOB_SA) of the video object for the title in the video title set (VTS). If the video object set (VTSM_BOBS) 295 for the VTS menu (VTSM) is absent, "00000000h" will be described in the start address (VTSM_VOBS_SA). The end address (VTSI_MAT_EA) of VTSI_MAT is expressed by the number of logical blocks, relative to the first byte in the video title set information management table (VTI_MAT) 94. The start address (VTSTM_VOB_SA) of VTSM_VOBS and the start address (VTSTT_VOB_SA) of VTSTT_VOB are expressed by logical blocks (RLBN) relative to the head logical block in the video title set (VTS) 272.

In the table (VTSI_MAT) 298, the start address (VTS_PTT_SRPT_SA) of the video title set information part-of-title search pointer table (VTS_PTT_SRPT) 299 is represented by the number of blocks, relative to the head logical block in the video title set information (VTSI) 294. Furthermore, in the table (VTSI_MAT) 298, the start address (VTS_PGCIT_SA) of the video title set program chain information table (VTS_PGCIT) 300 and the start address (VTS_PGCI_UT_SA) of the PGCI unit table (VTS_PGCI_UT) 311 of video title set menus represented by the number of blocks, relative to the head logical block in the video title set information (VTSI) 294, and the start address (VTS_MAPT_SA) of the time search map table (VTS_MAPT) 301 in the video title set (VTS) is described in logical sectors which follows the first logical sector in the video title set (VTS) 272. Similarly, the VTS address table (VTS_C_ADT) 312 and the address map (VTS_VOBU_ADMAP) 313 for VTS_VOBU are described in logical sectors which follows the head logical sector in the video title set (VTS) 272.

Described in the table (VTSI_MAT) 298 are the video attribute (VTSM_V_ATR) of the video object set (VTSM_VOBS) 295 for the video title set menu (VTSM) in the video title set (VTS) 272, the number of audio streams (VTSM_AST_Ns), the attributes (VTSM_AST_ATR) of the audio streams, the number of sub-picture streams (VTSM_SPST_Ns), and the attributes (VTSM_SPST_ATR) of the sub-picture streams. Similarly, further described in the table (VTSI_MAT) 298 are the video attribute (VTS_V_ATR) of the video object set (VTSM_VOBS) 296 for the video title set (VTSTT) for the video title set (VTS) in the video title set (VTS) 272, the number of audio streams (VTS_AST_Ns), the attributes (VTS_AST_ATR) of the audio streams, the number of sub-picture streams (VTS_SPST_Ns), and the attributes (VTS_SPST_ATR) of the sub-picture streams. Also described in this table (VTSI_MAT) 298 are the attribute (VTS_MU_AST_ATR) of the multi-channel audio stream in the video title set (VTS).

At most eight audio streams are provided, and at most 32 sub-picture streams are provided. Attribute is described in each of these streams. In the sub-picture stream attribute (VTS_SPST_ATR) it is described whether the sub-picture is a language or not.

Figures 46, 47, 48, 49:
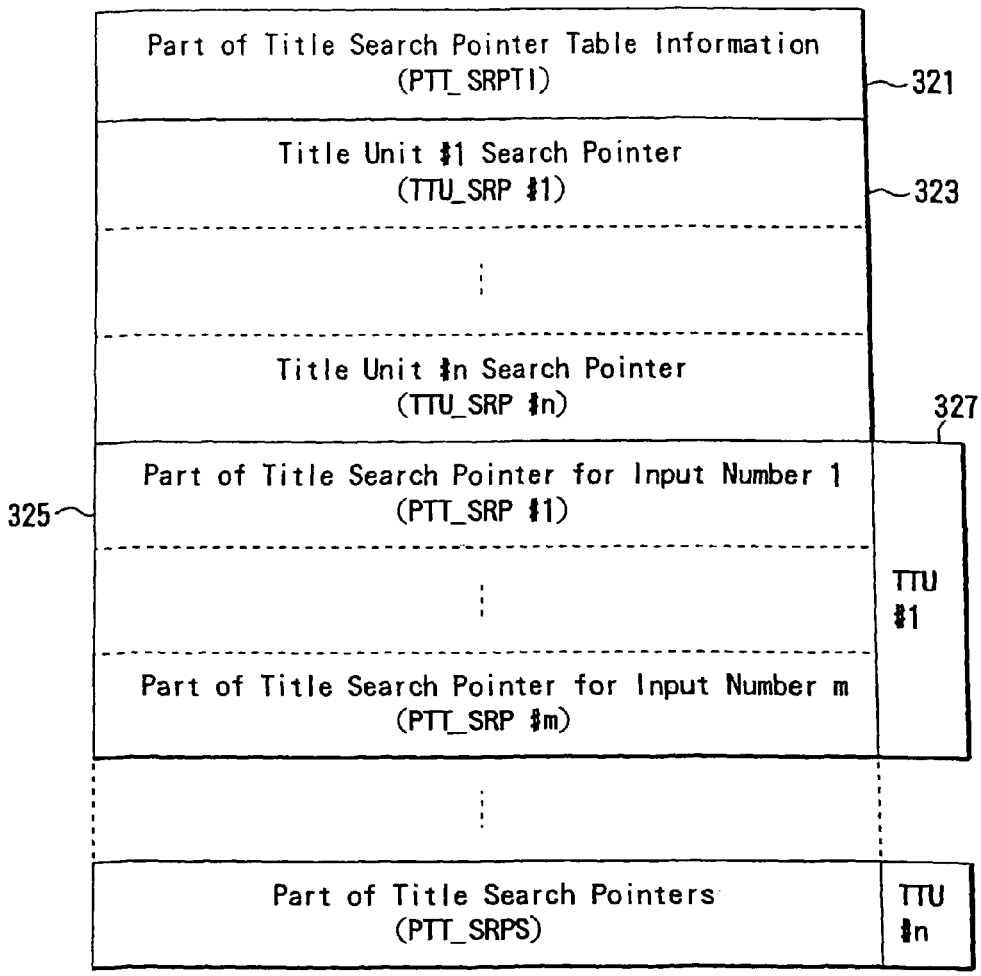
FIG. 46 shows a structure of a video title set part of title search pointer table (VTS_PTT_SRPT) shown in FIG. 44.
FIG. 47 shows parameters and contents of part of title search pointer information (PTT_SRPTI) shown in FIG. 46.
FIG. 48 shows parameters and contents of a title unit search pointer (TTU_SRP) shown in FIG. 46.
FIG. 49 shows parameters and contents of a part of title search pointer (PTT_SRP) shown in FIG. 46.

The video title set part-of-title search pointer table (VTS_PTT_SRPT) 299 shown in FIG. 44 has the structure shown in FIG. 46. As seen from FIG. 46, the table 299 has three items. Described in the first item is part-of-title search pointer table information (PTT_SRPTI) 321. Described in the second item are n search pointers (TTU_SRP#1 to TTU_SRP#n) 323 for title units #1 to #n 323. Described in the third item are m part-of-title search pointers (PTT_SRP#1 to PTT_SRP#m) 325 for m input numbers #1 to #m. In the part-of-title search pointer table information (PTT_SRPTI) 321, there are described the number (VTS_TTU_Ns) of title pointers in the video title set (VTS) and the end address (VTS_PTT_SRPT-EA) of the table (VTS_PTT_SRPT) 299, as is illustrated in FIG. 47. The maximum number of title search pointers which can be described is 99. Described in the end address (VTS_PTT_SRP#n) 323 is the start address (TTU_SA) of the title unit (TTU), i.e., a set of title search pointers (PTT_SRP#1 to PTT_SRP#m). The start address (TTU_SA), which is the start address of the first table (VTS_PTT_SRPT) 299, is described as the number of relative logical blocks, relative to the head byte of the table (VTS_PTT_SRPT) 299. Described in the title search pointer (PTT_SRP#m) 325 are the program chain number (PGC_N) and program number PG_N which are designated by the title search pointer #m (PTT_SRP#m), as is illustrated in FIG. 49.

The VTS program chain information table (VTS_PGCIT) 300 of FIG. 44 has a structure as shown in FIG. 50. In the information table (VTS_PGCIT) 300 there is described information on the VTS program chains (VTS_PGC). The first item of this information is information (VTS_PGCIT_I) 302 on the information table (VTS_PGCIT) 300 of VTS program chains (VTS_PGC). In the information table (VTS_PGCIT) 300, the information (VTS_PGCIT_I) 302 is followed by as many VTS_PGCI search pointers (VTS_PGCIT_SRP) used to search for VTS program chains (VTS_PGC) as the number (from #1 to #n) of VTS program chains in the information table (VTS_PGCIT) 300. At the end of the table, there are provided as many pieces of information (VTS_PGCI) 304 on the respective VTS program chains (VTS_PGC) as the number (from #1 to #n) of VTS program chains (VTS_PGC).

The information (VTS_PGCIT_I) 302 in the VTS program chain information table (VTS_PGCIT), as shown in FIG. 51, contains the number (VTS_PGC_Ns) of VTS program chains (VTS_PGC) and the end address (VTS_PGCIT_EA) of the table information (VTS_PGCIT_I) expressed by the number of bytes, relative to the first byte of the information table (VTS_PGCIT) 300.

Furthermore, as shown in FIG. 52, the VTS_PGCIT search pointer (VTS_PGCIT_SRP) 303 contains the attributes (VTS_PGC_CAT) 272 of the program chains (VTS_PGC) in the video title set (VTS) and the start address (VTS_PGCI_SA) of the VTS_PGC information (VTS_PGCI) expressed by the number of bytes, relative to the first byte of the VTS_PGC information table (VTS_PGCIT) 300. Here, the VTS_PGC attribute (VTS_PGC_CAT) contains, for example, an attribute indicating whether an entry program chain (Entry PGC) is the first one to be reproduced. Usually, an entry program chain (PGC) is described before program chains (PGC) that are not entry program chains (PGC).

As shown in FIG. 53, five items are described in the PGC information (VTS_PGCI) 304 for one PGC. The first item is a program chain general information (PGC_GI) 305. The second item is a program chain navigation command Table (PGC-CMDT) 309. The third, fourth and fifth items are described if a video object (VOB) exists. The third item is a program chain program map (PGC_PGMAP) 309, the fourth item is a cell playback information table (C_PBIT) 307, and the fifth item is a cell position information table (C_POSIT) 308.

As shown in FIG. 54, a PGC category (PGC_CAT) of the PGC chain (PGC), the contents (PGC_CNT) of the program chain (PGC), and a PGC playback time (PGC_PB_TM) are described in the program chain general information (PGC_GI) 305.

If the PGC is a menu PGC, a data showing whether or not the PGC is an entry PGC is described in the PGC category (PGC_CAT), along with a menu ID. The menu ID is not used to designate a menu. Rather, there is designated a VMG title menu for displaying or selecting a title, a VTS sub-picture menu for selecting a sub-picture, a VTS audio menu for selecting audio data, or a VTS menu for displaying or selecting a program. Referring to the contents (PGC_CNT) of the program chain (PGC), the user can designate any one of these menus. If the PGC is one for titles, in the PGC category (PGCI_CAT) contains the block mode of the PCG, the block type of the PCG, and the type of a field to which the program chain is applied. The type of the field indicates whether or not the PGC can be copied and whether the program in the PGC is playbacked continuously or at random. In the block mode of the PGC, it is described that the PGC exists outside the block. If the PGC exists in the block, it is described in the mode that the PGC is the head PGC, the last PGC or neither the head PGC nor the last PGC. In the type of PGC it is described that the PGC is not a part of any block or that the PGC belongs to a specific block.

The contents (PGC_CNT) of PGC contain the description of the program chain structure, that is, the number of programs, the number of cells, etc. The playback time (PGC_PB_TIME) of PGC contains the total playback time of the programs in the PGC. The playback time is the time required to continuously play back the programs in the PGC, regardless of the playback procedure.

Further described in the program chain general information (PGC_GI) 305 are, as shown in FIG. 54, PGC user operation control (PGC_UOP_CTL), PGC sub-picture stream control (PGC_SPST_CTL), PGC audio stream control (PGC_AST_CTL), and PGC navigation control (PGC_NV_CTL). In the PGC user operation control (PGC_UOP_CTL), there is described a user operation which is prohibited during the reproduction of the PGC. This user operation is calling of a menu, changing of a sub-picture or an audio stream, or the like. In the PGC sub-picture stream control (PGC_SPST_CTL), the number of a sub-picture stream which can be used in the PGC. Similarly, the number of audio stream which can be used in the PGC is described in the PGC audio stream control (PGC_AST_CTL). In the PGC navigation control (PGC_NV_CTL), eight bytes, i.e., 64 bits are described at bit numbers b0 to b63, as shown in FIG. 55. At bits b48 to b62 there is described the number of the next PGC to be reproduced. Described at bits b32 to b46 is the number of the PGC which should be playbacked immediately before the present PGC. Described at bits b16 to b30 is the number of the go-up PGC which will be processed after the present PGC is reproduced. Described at bits b8 to b15 is the loop sum total indicating the number of times the present PGC is reproduced repeatedly. Described at b0 to b7 is the still time value.

As shown in FIG. 55, the bit numbers b63, b47 and b31 are reserved for a future use. If there is not the number of the next PGC, that of the previous PGC or that of the go-up PGC, zeroes (0s) will be described at these bits. If there is no loop, zeroes (0s) will be described at the corresponding bits. If there is a loop that continues indefinitely, ones (1s) will be described at these bits. If there is no still time value, zeroes (0s) will be described at these bits. If the still time is indefinitely long, ones (1s) will be described at these bits.

The described contents of the PGC navigation control (PGC_NV_CTL) shown in FIG. 55 are utilized to reproduce PGCs one after another. More precisely, if the user operates the key operating and displaying section 4, designating "NEXT," or if the navigation command (later described) does not designate the number of the destination PGC, the number of the next PGC, which is described at bits b48 to b62, will be used to designate the next PGC as one that should be playbacked. If the user operates the section 4, designating "PREVIOUS," the number of the previous PGC, which is described at bits b32 to B46, will be used. If the user operates the section 4, designating "GO," the number of the go-up PGC, which is described at bits b16 to b30, will be used.

As shown in FIG. 54, further described in the program chain general information (PGC_GI) 305 are PGC sub-picture palette (PGC_SP_PLT); the start address (PGC_NV_CMDT_SA) of PGC navigation command table (PGC_NV_CMDT) 309, the start address (PgC_PGMAP_SA) of PGC program map (PGC_PGMAP) 306, and the start address (C_POSIT_SA) of cell position information table (C_POSIT) 308. Described in the PGC sub-picture palette (PGC_SP_PLT) are 16 color palettes for all sub-pictures of the PGC. The start addresses of the PGC navigation command table (PGC_NV_CMDT) 309, PGC program map (PGC_PGMAP) 306 and cell position information table (C_POSIT) 308 are described in the form of the numbers of logical blocks, relative to the head byte of the PGC. If neither the cell playback information table (C_PBIT) 307 nor the cell position information table (C_POSIT) 308 exists, zeroes (0s) will be described in their start addresses.

Described in the PGC navigation command table (PGC_NV_CMDT) 309 shown in FIG. 53 is information about the navigation command shown in FIG. 33. The table 309 has the structure illustrated in FIG. 56. It is constituted by four items. Described in the first item is program chain navigation command table information (PGC_NV_CMDTI) 320 representing the the PGC navigation command table (PGC_NV_CMDT) 309. Described in the second item are pre-process navigation commands (PGC_NV_CMD) 322. Described in the third item are post-process navigation commands (POST_NV_CMD) 324. Described in the fourth item are inter-cell navigation commands (IC_NV_CMD) 326. Command numbers #1 to #i are assigned to the pre-process navigation commands (PGC_NV_CMD) 322, command numbers #1 to #j to the post-process navigation commands (POST_NV_CMD) 324, and command numbers #1 to #k to the inter-cell navigation commands (IC_NV_CMD) 326. The total of these commands, i+j+k, is set at the maximum of 128.

Figures 56, 57:
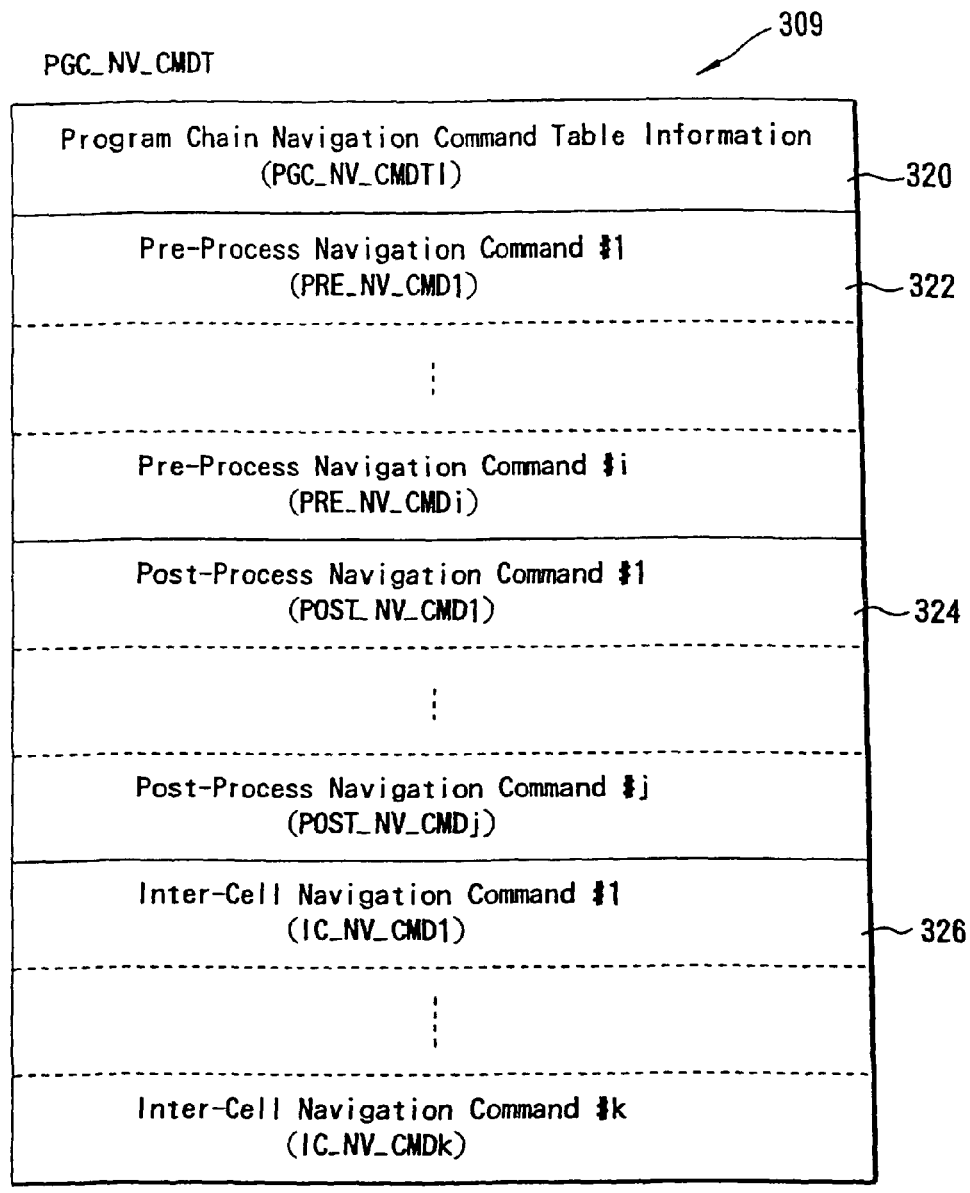
FIG. 56 shows a structure of a PGC navigation command table (PGC_NV_CMDT) shown in FIG. 53.
FIG. 57 shows parameters and contents of PGC navigation command table information (PGC_NV_CMDTI) shown in FIG. 56.

As illustrated in FIG. 57, the start address (PRE_NV_CMD_SA) of a pre-navigation command (PRE_NV_CMD) 322, the start address (POST_NV_CMD_SA) of a post navigation command (POST_NV_CMD) 324, and the start address (IC_NV_CMD-SA) of an inter-cell navigation command (IC_NV_CMD) 326 are described in the program chain navigation command table information (PGC_NV_CMDTI) 320, each in the form of number of logical blocks, relative to the head byte of the the PGC navigation command table (PGC_NV_CMDT) 309. If none of these commands 322, 324 and 326, zeroes (0s) will be described in their start addresses (PRE_NV_CMD_SA, POST_NV_CMD_SA, and IC_NV_CMD-SA). The contents of the pre-process navigation command, post-process navigation command and inter-cell navigation command are described in the navigation commands (PRE_NV_CMD, PST_NV_CMD, IC_NV_CMD) 322, 324 and 326, as is illustrated in FIGS. 58, 59 and 60, respectively.

Described in each of the the navigation commands 322, 324 and 326 are a link command, a jump command, a compare command and a go-to command. Various combinations of the link, jump, compare and go-to commands are used to accomplish various types of data reproduction. If a link command is described in any navigation command, the presentation will be linked to a specified program chain, program or cell. If a jump command is described in any navigation command, the presentation will jump to a specified title set, a specified part of the title set or a designated program chain of a specified title set. If a compare command is described in any navigation command, the value set in a register or the like during the data playback selected by the user will be compared with the navigation parameter set at the start of the data reproduction, to executed another command. If a go-to command is described in any navigation command, another navigation command will be executed or the execution of the navigation command is stopped. Specific methods of reproducing data, initiated by using navigation commands, will be explained later in conjunction with the reproduction of video data.

Figures 58, 59, 60, 61, 62:
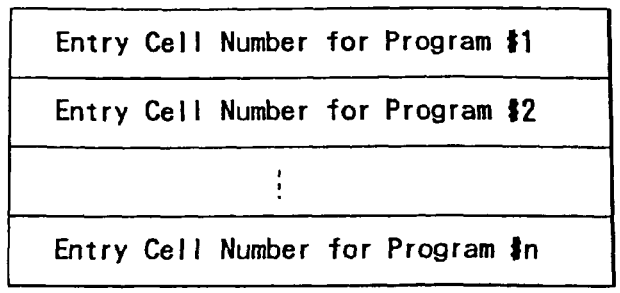
FIG. 58 shows parameters and contents of a prenavigation command (PRE_NV_CMD) shown in FIG. 56.
FIG. 59 shows parameters and contents of a post-process navigation command (POST_NV_CMD) shown in FIG. 56.
FIG. 60 shows parameters and contents of an inter-cell navigation command (IC_NV_CMD) shown in FIG. 56.
FIG. 61 shows a structure of a program chain map (PGC_PGMAP) of program chain information (VTS_PGCI) shown in FIG. 53.
FIG. 62 shows parameters and contents of an entry cell number (ECELLN) of a program described on a program chain map (PGC_PGMAP) shown in FIG. 61.

The program chain program map (PGC_PGMAP) 306 of the PGC information (VTS_PGCI) 304 shown in FIG. 53 is a map representing the structure of the program in the PGC, as can be understood from FIG. 61. Described in the the map (PGC_PGMAP) 306 are the entry cell numbers (ECELLN), the start cell numbers of the individual programs, in ascending order as shown in FIG. 62. In addition, program numbers are allocated, starting at 1, in the order in which the entry cell numbers are described. Consequently, the first entry number in the map (PGC_PGMAP) 306 must be #1.

The cell playback information table (C_PBIT) 307 defines the order in which the cells in the PGC are played back. In the cell playback information table (C_PBIT) 307 there are described pieces of the cell playback information (C_PBIT) consecutively as shown in FIG. 63. Basically, cells are playedback in the order of cell number. The cell playback information (C_PBIT) contains a cell category (C_CAT) as playback information (P_PBI) as shown in FIG. 64. Written in the cell category (C_CAT) are a cell block mode indicating whether the cell is one in the block and if it is, whether the cell is the first one, a cell block type indicating whether the cell is not part of the block or is one in an angle block, an STC discontinuity flag indicating whether the system time clock (STC) must be set again, a cell playback mode, a cell navigation control and an inter-cell command number. Here, a cell block is defined as a set of cells with a specific angle. The change of the angle is realized by changing the cell block. Taking baseball for example, the changing from an angle block of shooting scenes from the infield to an angle block of shooting scenes from the outfield corresponds to the change of the angle. The cell-reproducing mode is described to specify whether data is continuously reproduced within a cell or a still image is formed from each video object unit (VOBU). Described in the navigation control is the data about the still image formed after the reproduction of the cell. In other words, it is described in the navigation control that no still image is formed or that a still image lasts infinitely. In the number of the inter-cell command, the inter-cell navigation command to be executed upon completion of the cell playback is described in the form of the PGC_NV_CMD number 326 contained in the command table (PGC_NV_CMDT) 309. The PGC_NV_CMD number 326 is referred to during the reproduction of the cell. From the number 326 a PGC navigation command is acquired and executed after the cell described in the cell playback information (P_PBI).

As shown in FIG. 64, the playback information (P_PBI) of the cell playback information table (C_PBIT) 307 contains the cell playback time (C_PBTM) representing the total playback time of the PGC. When the PGC has an angle cell block, the playback time of the angle cell number 1 represents the playback time of the angle block, Also described in the cell playback information table (C_PBIT) 307 are the start address (C_FVOBU_SA) of the first video object unit (VOBU) 285 in the cell expressed by the number of logical blocks, relative to the first logical block in the video object unit (VOBU) 285 in which the cell is recorded and the start address (C_LVOBU_SA) of the end video object unit (VOBU) 285 in the cell expressed by the number of logical blocks, relative to the first logical block in the video object unit (VOBU) in which the cell is recorded.

The cell position information table (C_POSIT) 308 specifies the identification numbers (VOB_ID) of the video objects (VOB) in the cell used in the PGC and the cell identification number (C_ID). In the cell position information table (C_POSIT), pieces of cell position information (C_POSI) corresponding to the cell numbers written in the cell playback information table (C_PBIT) 307 as shown in FIG. 65 are described in the same order as in the cell playback information table (C_PBIT). The cell position information (C_POSI) contains the identification numbers (C_VOB_IDN) of the video object units (VOBS) in the cell and the cell identification number (C_IDN) as shown in FIG. 66.

Further, the structure of the video title set menu PGCI unit table (VTSM_PGCI_UT) 311 shown in FIG. 44 will be explained with reference to FIGS. 67 to 72. The video title set menu PGCI unit table (VTSM_PGCI_UT) 311 has substantially the same structure as the VMGM_PGCI unit table 280 shown in FIG. 34. That is, in the VTSM_PGCI unit table (VTSM_PGCI_UT) 311, VTS menu PGCI unit table information (VTSM_PGCI_UTI) 350 is first described as shown in FIG. 67, then VTS menu language unit search pointers (VMGM_LU_SRP) 351 of a necessary number n corresponding to the number n of languages are successively described, and the VTS menu language unit (VTSM_LU) 352 searched for by the search pointer is described.

In the VTS menu PGCI unit table information (VTSM_PGCI_UTI) 350, the number (VTSM_LU_Ns) of VTSM language units (VTSM_LU) and the end address (VTSM_PGCI_UT_EA) of the VTSM_PGCI unit table (VMGM_PGCI_UT) 311 are described as shown in FIG. 68. In each of n video manager menu language unit search pointers (VTSM_LU_SRP) 351 prepared for respective languages, the language code (VTSM_LCD) of the VTS menu and the start address (VTSM_LU_SA) of the VTS menu (VTSM) language unit (VTSM_LU) 252 are described as shown in FIG. 69. The end address (VTSM_PGCI_UT_EA) of VTSM_PGCI_UT 280 and the start address (VTSM_LU_SA) of VTSM_LU 352 are described by use of the logical block number from the first block of the VTSM_PGCI unit table (VTSM_PGCI_UT) 311.

Figures 70, 71, 72:
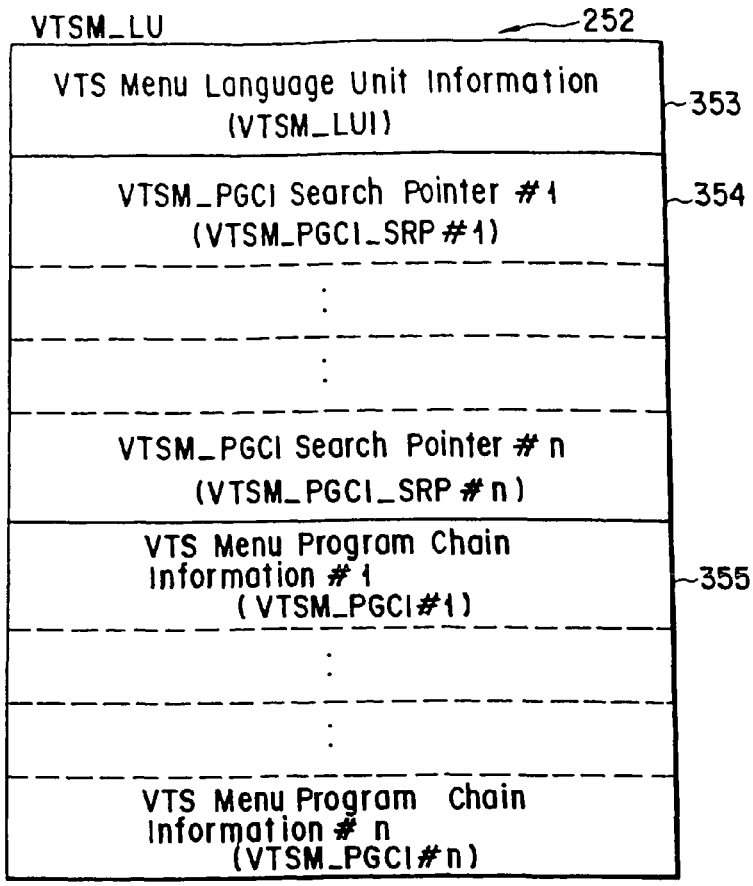
FIG. 70 shows a structure of a video title set menu language unit shown in FIG. 67.
FIG. 71 shows parameters and contents of video title set menu language unit information shown in FIG. 70.
FIG. 72 shows parameters and contents of a video title set PGCI search pointer shown in FIG. 70.

In each of n VTSM language units (VTSM_LU) 352 prepared for respective languages, VTSM menu language unit information (VTSM_LUI) 353 and VTSM_PGCI search pointers (VTSM_PGCI_SRP) 354 of a number corresponding to the number of menu program chains are provided as shown in FIG. 70, and VTSM_PGC information items (VTSM_PGCI) 355 searched for by the search pointers and corresponding in number to the menu program chains are provided as shown in FIG. 70.

In each language unit information (VTSM_LUI) 353, the number (VMGM_PGCI_Ns) of VMGM_PGCIs and the end address (VTSM_LUI_EA) of the language unit (VTSM_LU) are described as shown in FIG. 71. Further, in the VTSM_PGCI search pointer (VTSM_PGCI_SRP), the VTSM_PGC category (VTSM_PGC_CAT) and the start address (VTSM_PGCI SA) of VTSM_PGCI are described as shown in FIG. 72. The end address (VTSM_LU_EA) of VTSM_LU and the start address (VTSM_PGCI_SA) of VTSM_PGCI are described by the number of logical blocks, relative to the head byte of VTSM_LU. As the VTSM_PGC category (VTSM_PGC_CAT), information indicating that the program chain is an entry program chain or title menu is described.

As explained with reference to FIG. 28, a cell 284 is a set of video object units (VOBU) 285. A video object unit (VOBU) 285 is defined as a pack train starting with a navigation (NAV) pack 286. Therefore, the start address (C_FVOBU_SA) of the first video object unit (VOBU) 285 in a cell 284 is the start address of the NAV pack 286. As shown in FIG. 73, the NAV pack consists of a pack header 310, a system header 311, and two packets of navigation data—a presentation control information (PCI) packet 316 and a data search information (DSI) packet 317. As many bytes as shown in FIG. 73 are allocated to the respective sections so that one pack may contain 2048 bytes corresponding to one logical sector. The NAV pack is placed immediately in front of the video pack containing the first data item in the group of pictures (GOP). Even when the object unit 285 contains no video pack, a NAV pack is placed at the head of the object unit containing audio packs and/or sub-picture packs. As with an object unit containing object units, even with an object unit containing no video pack, the playback time of the object unit is determined on the basis of the unit in which video is reproduced.

Here, a GOP is determined in the MPEG standard and is defined as a data train constituting a plurality of screens as explained earlier. Specifically, GOP corresponds to compressed data. Expanding the compressed data enables the reproduction of a plurality of frames of image data to reproduce moving pictures. The pack header 310 and system header 111 are defined in the MPEG 2 system layer. The pack header 310 contains a pack start code, a system clock reference (SCR), and a multiplex rate. The system header 311 contains a bit rate and a stream ID. The packet header 312, 314 of each of the PCI packet 116 and DSI packet 317 contains a packet start code, a packet length, and a stream ID as determined in the MPEG2 system layer.

As shown in FIG. 74, another video, audio, or sub-picture pack 288, 290, 291 consists of a pack header 320, packet header 321, and a packet 322 containing the corresponding data as determined in the MPEG2 system layer. Its pack length is determined to be 2048 bytes. Each of these packs is aligned with the boundaries between logical blocks.

The PCI data (PCI) 313 in the PCI packet 316 is navigation data used to make a presentation, or to change the contents of the display, in synchronization with the playback of the video data in the VOB unit (VOBU) 285. Specifically, as shown in FIG. 75, the PCI data (PCI) 313 contains PCI general information (PCI_GI) as information on the entire PCI and angle information (NSMLS_ANGLI) as each piece of jump destination angle information in angle change. The PCI general information (PCI_GI) contains the address (NV_PCK_LBN) of the NAV pack (NAV_PCK) 286 in which the PCI 113 is recorded as shown in FIG. 76. The address is expressed in the number of blocks, relative to the logical sector of VOBU 285 in which the PCI 313 is recorded. The PCI general information (PCI_GI) contains the category (VOBU_CAT) of VOBU 285, the start playback time (VOBU_S_PTM) of VOBU, and the end playback time (VOBU_EPTM) of VOBU. Here, the start PTS (VOBU_SPTS) of VOBU 285 indicates the playback start time (start presentation time) of the video data in the VOBU 285 containing the PCI 313. The playback start time is the first playback start time in the VOBU 285. Normally, the first picture corresponds to I picture (intra-picture) data in the MPEG standard. The end PTS (VOBU_EPTS) in the VOBU 285 indicates the playback end time (end presentation time) of the VOBU 285 containing the PCI 313.

DSI data (DSI) 315 in the DSI packet 317 shown in FIG. 73 is navigation data used to search for the VOB unit (VOBU) 285. Described in the DSI data (DSI) 315 are DSI general information (DSI_GI), seamless information (SML_PBI), angle information (SML_AGLI), address information (NV_PCK_ADI) on a navigation pack, and synchronizing playback information (SYNCI), as shown in FIG. 77.

The DSI information (DSI_GI) contains information about the entire DSI 315. Specifically, as shown in FIG. 78, the DSI general information (DSI_GI) contains the system clock reference (NV_PCK_SCR) for the NAV pack 286. The system clock reference (NV_PCK_SCR) is stored in the system time clock (STC) built in each section of FIG. 1. On the basis of the STC, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NAV pack (NAV_PCK) 286 containing the DSI 315 expressed by the number of logical sectors (RLSN), relative to the first logical sector in the VOB set (VOBS) 282 containing the DSI 315, and the address (VOBU_EA) of the last pack in the VOB unit (VOBU) 285 containing the DSI 315 expressed by the number of logical sectors (RLSN), relative to the first logical sector in the VOB unit (VOBU).

Furthermore, the DSI general information (DSI_GI) contains the end address (VOBU_IP_EA) of the V pack (V_PCK) 288 containing the last address of the first I picture in the VOBU expressed by the number of logical sectors (RLSN), relative to the first logical sector in the VOB unit (VOBU) containing the DSI 315, and the identification number (VOBU_IP_IDN) of the VOBU 283 containing the DSI 315 and the identification number (VOBU_C_IDN) of the cell in which the DSI 315 is recorded.

The navigation pack address information of DSI contains the addresses of a specified number of navigation packs. Video fast-forward etc. are affected, referring to the addresses. The synchronizing information (SYNCI) includes address information on the sub-pictures and audio data reproduced in synchronization with the playback start time of the video data in the VOB unit (VOBU) containing DSI 315. Specifically, as shown in FIG. 79, the start address (A_SYNCA) of the target audio pack (A_PCK) 291 is expressed by the number of logical sectors (RLSN), relative to the NAV pack (NAV_PCK) 286 in which DSI 315 is recorded. When there are more than one audio stream (8 audio streams, at most), as many pieces of synchronizing information (SYNCI) as audio streams are described. Furthermore, the synchronizing information (SYNCI) includes the address (SP_SYNCA) of the NAV pack (NAV_PCK) 286 of the VOB unit (VOBU) 285 containing the target audio pack (SP_PCK) 291. The address is expressed by the number of logical sectors (RLSN), relative to the NAV pack (NAV_PCK) 286 in which DSI 315 is recorded. When more than one sub-picture stream (32 sub-picture streams, at most) exist, there described as many pieces of synchronizing information (SYNCI) as sub-picture streams.

Hereinafter, the operation of reproducing the movie data from the optical disk 10 with the logic format shown in FIGS. 26 to 79 will be explained with reference to FIG. 1. In FIG. 1, the solid-line arrows indicate data buses and the broken-line arrows represent control buses.

To begin with, the operation of acquiring the video title set (VTS) 272 by the use of the video manager (VMG) 271 will be explained by reference to FIG. 80. With the optical disk apparatus of FIG. 1, when the power supply is turned on and an optical disk 10 is loaded, the system CPU section 50 reads the initial operation program from the system ROM/RAM section 52 and operates the disk drive section 30, which then starts a search operation as shown in step S241. Namely, the disk drive section 30 starts to read the data from the lead-in area 27 and then from the adjoining volume and file structure area 270, in which a volume structure and a file structure are determined in accordance with ISO-9660. Specifically, to read the data from the volume and file structure area 270 located in a specific position on the optical disk 10 set in the disk drive section 30, the system CPU section 50 gives a read instruction to the disk drive section 30 to read the contents of the volume and file structure area 270, and stores the data temporarily in the data RAM section 56 via the system processor section 54. The system CPU section 50 extracts information about the recording position and recording size of each file and management information necessary for other managing actions via the path table and directory record stored in the data RAM section 56, and transfers and stores these pieces of information in specific locations in the system ROM/RAM section 52.

Then, as shown in step S242, the system CPU section 50 acquires a video manager 271 composed of files, starting with file number 0, by reference to the information about the recording position and recording capacity of each file in the system ROM/RAM section 52. Specifically, referring to the recording position and recording capacity of each file acquired from the system ROM/RAM section 52, the system CPU section 50 gives a read instruction to the disk drive section 30, acquires the positions and sizes of a plurality of files constituting the video manager 271 existing on the root directory, reads the video manager (VMG) 271, and stores it in the data RAM section 56 via the system processor section 54. Thereafter, the system CPU section 50, as shown in step S243, acquires the start addresses of the individual tables (TT_SRPT, VMGM_PGCI_UT, VTS_ART) written in the video management information table (VMGI_MAT) 278, thereby enabling the acquisition of each table. Here, when the user looks at a title brochure in which titles have been written, gets a number specifying a video title set, and enters the number directly from the key/display section 4 as shown in step S244, control will be passed to step S248. When there is no input entered by the user from the key/display section 4, it will be confirmed as shown in step S245 whether or not a VMGM video object set (VMGM_VOBS) 276 is present as menu data in the video management information table (VMGI_MAT) 278. If there is no VMGM video object set (VMGM_VOBS) 276, the user may enter a video title set or a predetermined video title set may be selected, and control will be passed to step S248. If a VMGM video object set (VMGM_VOBS) 276 is present, the video attribute information (VMGM_V_ATR) on VMGM and the attribute information (VMGM_AST_ATR, VMGM_SPST_ATR) on audio and sub-picture streams will be acquired from the video management information table (VMGI_MAT) 278. Thereafter, as shown in step S247, a menu will be displayed as shown in step S247, which will be explained in detail later by reference to FIG. 81. According to the menu representation, the user selects the video title set (VTS) 272. Once the video title set (VTS) 272 has been selected, the video title set number (VTSN) corresponding to the selected video title set, title number (VTS_TT), and the start address (VTS_SA) of the video title set are acquired from the title search pointer table (TT_SRPT) 278 in the video manager (VMG) 271. Furthermore, the system CPU 50 obtains attribute information (VTS_V_ATR, VTS_AST_ATR, VTS_SPST) of the acquired video title set number (VTSN) from the video title set attribute table (VTS_ATRT) 280. On the basis of these pieces of attribute information (VTS_V_ATR, VTS_AST_ATR, VTS_SPST), the parameters necessary for playback of the video manager menu are set in the video decoder section 58, audio decoder section 60, and sub-picture decoder section 62, respectively. Furthermore, according to the pieces of attribute information, the video processing section 201, audio processing section 202, audio mixing section 203, and sub-picture processing section 207 in the D/A and data-reproducing section 64 are set. By the above series of procedures, the preparation to acquire the video title set 276 has been completed as shown in step S250.

Now, the operation going on as far as the video manager menu for choosing a video title is displayed will be described by reference to FIG. 81. When the menu search process is started as shown in step S210, the volume manager information management table (VMGI_MAT) 278, the first table in the video manager 271, will be searched. By the searching operation, the start address (VMGM_PGCI_UT_SA) of the VMGM_PGCI unit table (VMGM_PGCI_UT) 280 for the video manager menu (VMGM) is acquired. Then, the VMGM_PGCI unit table 280 is acquired. From the table information (VMGM_PGCI_UTI) in the table (VMGM_PGCI_UT) 280, the number (a) of language units (VMGM_LU_Ns) on the video manager menu is acquired. Then, as shown in step S211, the acquisition of the search pointer (VMGM_LU_SRP) of the first #1 (n=1) VMGM_LU is determined. The search pointer (VMGM_LU_SRP) of the VMGM_LU is acquired as shown in step S212. Then, as shown in step S213, it is determined whether the language code (=b) (VMGM_LCD) written in the search pointer (VMGM_LU_SRP) of VMGM_LU coincides with the language code (=B) specified in the reproducing apparatus, or the default language code. If the language codes do not coincide with each other, the number of the search pointer will be incremented (n=n+1) as shown in step S214 and it will be determined whether the incremented number n has exceeded the number (a) of language units (VMGM_LU_Ns) in the video manager menu. If the number n has been set equal to or larger than the number (a) of language units (VMGM_LU_Ns) in the video manager menu, the searching operation for the video manager menu (VMGM) will be terminated as shown in step S216. If the number n is smaller than the number (a) of language units (VMGM_LU_Ns) in the video manager menu, control will be returned to step S213, where the n-th search pointer (VMGM_LU_SRP) of VMGM_LU will be acquired and step S213 to step S215 will be executed again.

If in step S213, the language code (=b) (VMGM_LCD) written in the search pointer (VMGM_LU_SRP) of VMGM_LU coincides with the language code (=B) specified in the reproducing apparatus, or the default language code, the VMGM language unit (VMGM_LU) 252 corresponding to the language code written in the search pointer (VMGM_LU_SRP) of VMGM_LU will be acquired as shown in step S217. The number (VMGM_PGCI_Ns) of VMGM_PGCI is extracted from the VMGM language unit information (VMGM_LUI). Next, as shown in step S218, the VMGM_PGC category (VMGM_PGC_CAT) is acquired from the VMGM_PGCI search pointer (VMGM_PGCI_SRP) 254. Thus, the VMGM_PGC number corresponding to the menu ID (="0010") as well as to the entry type (=1) is acquired from the VMGM_PGC category (VMGM_PGC_CAT). Here, the menu ID (="0010") corresponds to the VMGM title menu. The start address (VMGM_PGC_SA) of the VMGM_PGC corresponding to the acquired VMGM_PGC number is obtained from the VMGM_PGCI search pointer (VMGM_PGCI_SRP) and as shown in step S219, the relevant PGC is acquired from the VMGM video object set (VMGM_VOBS) 276, thereby reproducing the PGC.

As a result, the VMG menu as shown in FIG. 82 is displayed, for example. In this example, the story of "Mr. X's Life" appears as the first title and the story of "Mrs. Y's Life" appears as the second title under the title of interactive movie series, meaning that either title set can be chosen. When the first title set or the story of "Mr. X's Life" is chosen, the title set corresponding to the first one is acquired as follows.

The start address (VTS_SA) of the video title set 72 is acquired from the title search pointer 293 having the entry number #1 shown in FIG. 30. Then, the video title set information (VTSI) 294 on the title set shown in FIG. 44 is obtained. From the management table (VTSI_MAT) 298 of the video title set information (VTSI) 294, the end address (VTSI_MAT_EA) of the video title set information management table (VTSI_MAT) 298 shown in FIG. 45 is acquired. Furthermore, on the basis of the number of audio streams and the number of sub-picture streams (VTS_AST_Ns, VTS_SPST_Ns) and the attribute information (VTS_V_ATR, VTS_A_ATR, VTS_SPST_ATR) on the audio and video data, each section of the reproducing apparatus of FIG. 1 is set. Specifically, according to the attribute information, the audio processing section 202, audio mixing section 203, and sub-picture reproducing section 207 in the D/A and reproducing section 64 are set.

When the video title set menu (VTSM) is present, the video title set menu will be displayed according to the flow shown in FIG. 83. Specifically, when the menu search process is started as shown in step S220, this enables the start address (VTSM_PGCI_UT_SA) of the VTSM_PGCI unit table (VTS_PGCI_UT) 300 for the video title set menu (VTSM) to be acquired. Then, the VTSM_PGCI unit table 300 is acquired. From the table information (VTSM_PGCI_UTI) in the table (VTSM_PGCI_UT) 300, the number (a) of language units (VTSM_LU_Ns) on the video title menu is acquired. Then, as shown in step S221, the acquisition of the search pointer (VTSM_LU_SRP) of the first #1 (n=1) VTSM_LU is determined. The search pointer (VTSM_LU_SRP) 351 of the VTSM_LU 352 is acquired as shown in step S222. Then, as shown in step S223, it is determined whether the language code (=b) (VTSM_LCD) written in the search pointer (VTSM_LU_SRP) 351 of VTSM_LU coincides with the language code (=B) specified in the reproducing apparatus, or the default language code. If the language codes do not coincide with each other, the number of the search pointer will be incremented (n=n+1) as shown in step S224 and it will be determined whether the incremented number n has exceeded the number (a) of language units (VTSM_LU_Ns) in the video title set menu. If the number n has been set equal to or larger than the number (a) of language units (VTSM_LU_Ns) in the video title set menu, the searching operation for the video title set menu (VTSM) will be terminated as shown in step S226. If the number n is smaller than the number (a) of language units (VTSM_LU_Ns) in the video title set menu, control will be returned to step S222, where the n-th search pointer (VTSM_LU_SRP) 351 of VTSM_LU will be acquired and step S223 to step S225 will be executed again.

If in step S223, the language code (=b) (VTSM_LCD) written in the search pointer (VTSM_LU_SRP) 351 of VTSM_LU coincides with the language code (=B) specified in the reproducing apparatus, or the default language code, the VTSM language unit (VTSM_LU) 352 corresponding to the language code written in the search pointer (VTSM_LU_SRP) 351 of VTSM_LU will be acquired as shown in step S227. The number (VTSM_PGCI_Ns) of VTSM_PGCI is extracted from the VTSM language unit information (VTSM_LUI). Next, as shown in step S228, the VTSM_PGC category (VTSM_PGC_CAT) is acquired from the VTSM_PGCI search pointer (VTSM_PGCI_SRP) 354. Thus, the VTSM_PGC number corresponding to the menu ID (="0011" to "0111") as well as to the entry type (=1) is acquired from the VTSM_PGC category (VTSM_PGC_CAT). Here, the menu ID (="0011" to "0111") corresponds to the VTSM audio menu for selecting an audio language or VTSM program menu for selecting a program or the other menu. The start address (VTSM_PGC_SA) of the VTSM_PGC corresponding to the acquired VTSM_PGC number is obtained from the VTSM_PGCI search pointer (VTSM_PGCI_SRP) and as shown in step S229, the relevant PGC is acquired from the VTSM video object set (VTSM-_VOBS) 295, thereby reproducing the PGC.

Accordingly, the VTS menu as shown in FIG. 84 is displayed, for example. In this example, "Mr. X's Life" appears as a title and "1. Infancy", "2. Youth", "3. Middle Age", and "4. Old Age" appear as parts of the title that can be chosen. Once the user has chosen a part of the title from the menu by pressing the corresponding key on the key/display section 4, for example, the language selection menu, a submenu, appears. Specifically, since 32 sub-picture streams have been prepared as sub-pictures as explained earlier, the movie suppliers can display one of, for example, English, Japanese, German, and French sub-pictures. Furthermore, a menu that allows selection of one from eight audio streams can be prepared as another submenu. This makes it possible to choose any one of audio streams associated with dubbing. Selecting a choice from the menu causes the program chain corresponding to the choice to be reproduced.

When the menu (VTSM) for video title sets (VTS) has a simple structure, the start address (VTSM_VOB_SA) of the video object set (VTSM_VOB) 295 for video title set menus may be acquired from the video title set information management table (VTSI_MAT) 298 of FIG. 34 and the menu for video title sets may be displayed according to the video object set (VTSM_VOB) 295.

Figure 85:
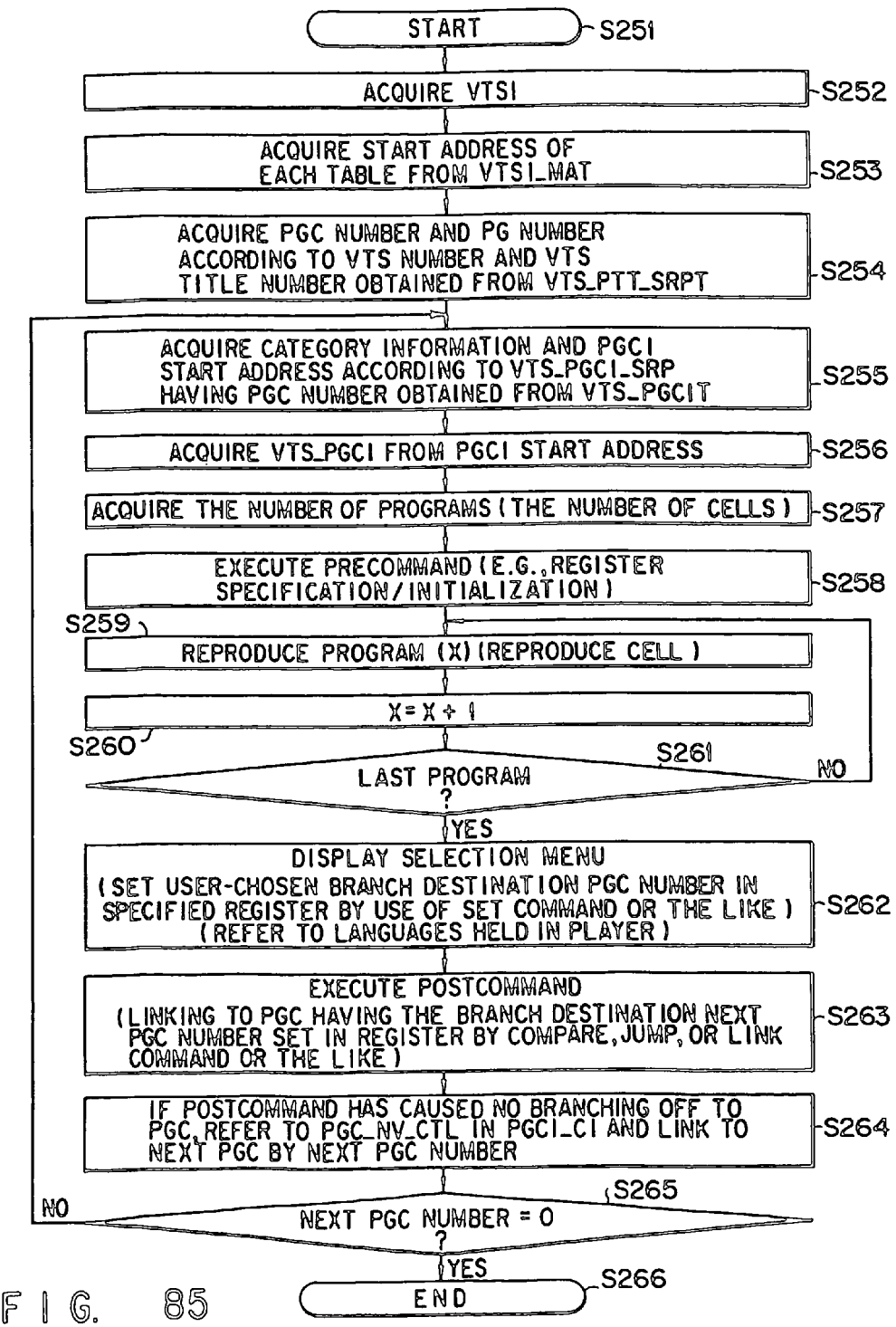
FIG. 85 is flow chart illustrating a procedure for acquiring a video title set and reproducing a PGC.

Now, the operation of retrieving and reproducing a program chain after the title has been chosen will be explained by reference to the flows shown in FIG. 85. Specifically, when the user specifies a program chain (PGC) from the key/display section 4, referring to the menu, the desired program chain will be searched for by the following procedure. This procedure applies to not only the retrieval of a program chain for titles in a video title set, but also the retrieval of a program chain for menus, each of which is a relatively complex menu made up of a program chain. As shown in FIG. 85, after a searching operation has been started as shown in step S251, the system CPU section 50 acquires video title set information 294 as shown in step S252 as explained earlier. Then, as shown in step S253, the start address of each table is obtained from the acquired video title set information 294. The table (VTS_PTT_SRPT) 299 is acquired according to the start address (VTS_PTT_SRPT_SA) of the video title set part-of-title search pointer table (VTS_PTT_SRPT) 299 among these obtained start addresses. Next, as shown in step S254, on the basis of the number (VTSN) of the video title set 296 obtained by reference to the title search pointer (TT_SRP) 279 of the video manager (VMG) 271 and the VTS title number (VTS_TTN), the PGC number corresponding to the part of the title specified by the user and the PG number are acquired.

By referring to the VTS-PGCI table (VTS_PGCIT) 300, the VTS_PGC search pointer #n (VTS_PGCI_SRP #n) 303 corresponding to the acquired PGC number is obtained. On the basis of the pointer #n (VTS_PGCI_SRP #n) 303, the category (VTS_PGC_CAT) of the VTS_PGC and the start address (VTS_PGCI_SA) of the VTS_PGC information (VTS_PGCI #n) 304 pointed out by the pointer are acquired. As shown in step S256, according to the start address (VTS_PGCI_SA) of the VTS_PGC information (VTS_PGCI #n) 304, the VTS_PGC information (VTS_PGCI #n) 304 is acquired. As shown in step S257, on the basis of the PGC general information (PGC_GI) 305 in the acquired VTS_PGC information (VTS_PGCI #n) 304, the contents (PGC_CNT) of the PGC are acquired. Then, from the PGC-_CNT, the number of programs in the PGC and the number of cells are obtained.

Before the playback of the PGC, the system CPU section 50 acquires program chain navigation command table information (PGC_NV_CMDTI) from the program navigation command table (PGC_NV_CMDT) 309, obtains preprocess navigation command #1 (PRE_NV_CMD #1) to preprocess navigation command #i (PRE_NV_CMD #i) one after another by reference to the table (PGC_NV_CMDT) 309 as shown in step S258, and executes those commands. The command, for example, the set command, specifies a specific register (not shown in FIG. 1) for the navigation command and initializes the register.

After all of the pre-navigation commands (PRE_N-V_CMD) have been executed, the PGC program map (PGC-_MAP) 306 and cell playback information (C_PBIT) are acquired and as shown in step S259, the playback of the specified program (x), or the playback of cells, is started. Once the playback of a program has been completed as a result of cell playback, the program number is updated (x=x+1) as shown in step S260, and it is confirmed as shown in step S261 whether any updated program number is present. Namely, it is verified whether the program reproduced before playback is the last program. If there is a program having the updated program number, control will be passed to step S259, where the updated program will be reproduced. If the reproduced program is the last program, the selection menu for choosing a program to be next reproduced will be displayed as shown in step S262. The menu may have the choices appear in a sub-picture with the cell playback kept in a halt, or with moving pictures appearing on the screen by repeating the cell playback.

When the user has chosen a subsequent PGC from the selection menu, the PGC number at the branch destination chosen by the user is set in the register specified by the set command or the like. At this time, the language previously held in the apparatus, or the player, is referred to and an audio stream and a video stream are set.

After the selection has been completed, the system CPU section 50 acquires postprocess navigation command #1 (POST_NV_CMD #1) to postprocess navigation command #j (POST_NV_CMD #j) one after another and executes those commands. Specifically, if a comparison command is executed, the next PGC number will be determined, taking into account the course of the user's past selection, and this PGC number will be set in the register as the updated PGC number. When a comparison command is executed, the PGC number chosen at step S262 is not necessarily selected. Taking account of the course of the user's past selection, a suitable PGC number is set. If a jump command is executed, jumping to the PCG having the set PGC number will be effected. If a "Previous" or "Next" key (not shown in FIG. 1) on the key/display section 4 is depressed by the user, a link command is executed so that linking to the PGC having the set PGC number which is described in PGC_NV_CTL in the PGCI_GI will be effected. When the PGC is not branched by a postprocess navigation command (POST_NV_CMD), a subsequent PGC number will be acquired from the PGC_N-V_CTL shown in FIG. 55 written in PGCI_GI in the PGC general information (PGC_GI) as shown in step S264. Then, linking is done to the PCG specified by the number.

Once the next PGC number has been determined, it is confirmed whether there is any subsequent PGC number as shown in step S265. If a subsequent PGC is present, control will be passed again to step S255. If there is no PGC number, the playback of PGC will be terminated as shown in step S266.

Figures 86, 87A, 87B:
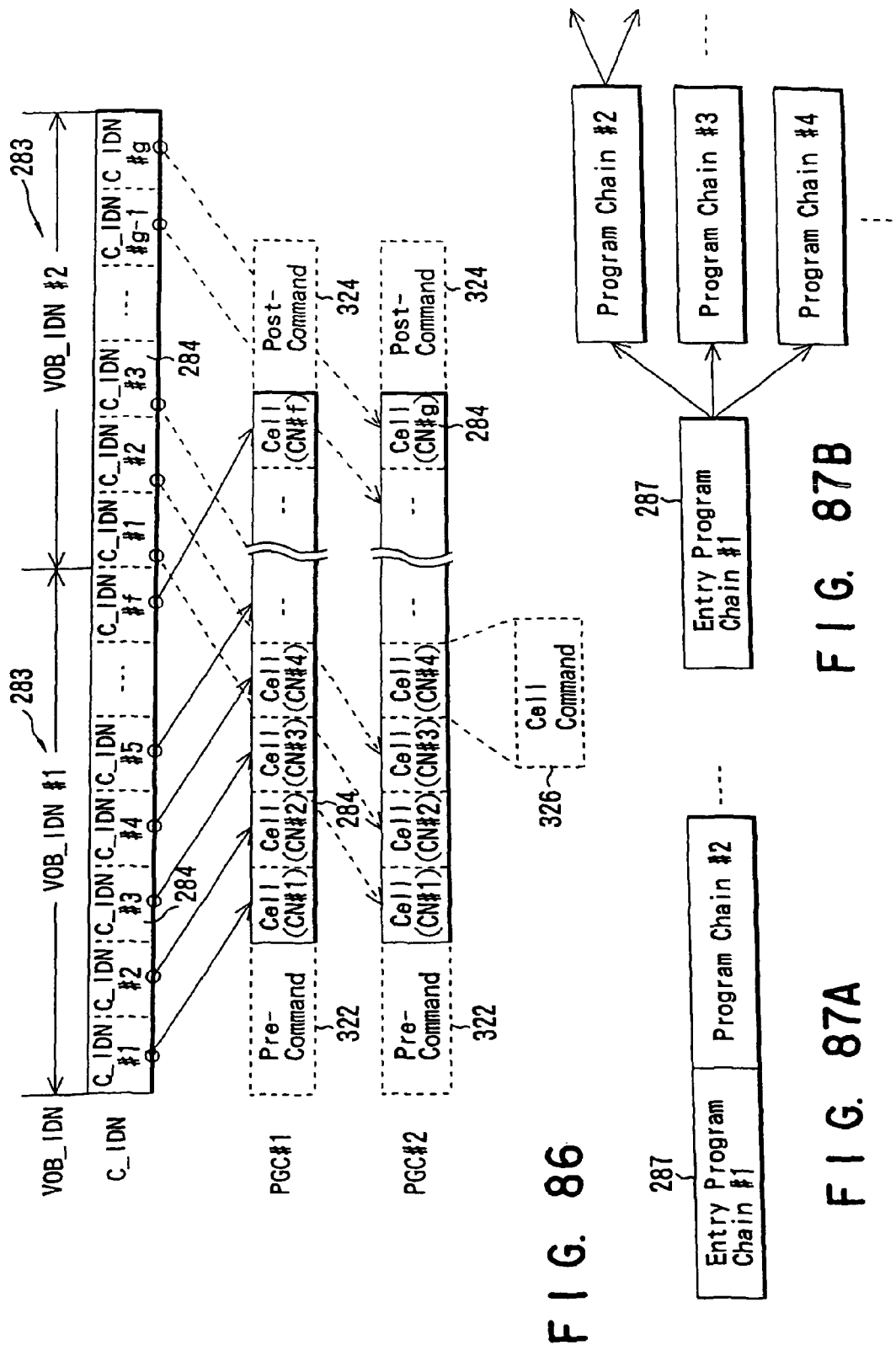
FIG. 86 illustrates the relationship between the video object and PGC and a procedure for reproducing the cell.
FIGS. 87A and 87B show examples of a program chain.

An example of playing back the PGC will be described by reference to FIG. 86. FIG. 86 illustrates how the cells 284 in the video objects 283 with the identification numbers #1 and #2 are reproduced in the order of program chains #1 and #2. To reproduce PGC #1, the pre-navigation command 322 is executed to prepare the playback of cells in the PGC. Thereafter, the cells are reproduced in the order of playback number (CN#k). In this example, although the order of cell playback number (CN#k) is the order of cell identification number (C_IDN#q), the order of cell playback number (CN#k) may differ from the order of cell identification number (C_IDN#q). With PGC#1, when the last cell (CN#f) has been reproduced, the post command 324 is executed and, for example, a link command is executed to perform linking to the next PGC#2. Similarly, with PGC#2, the pre-navigation command 322 is executed and the playback of cells is started. In the PGC#2, a cell (CN#3) containing an inter-cell navigation command (IC_NVCMD) 326 is present. After the cell (CN#3) 284 is playbacked, the inter-cell navigation command (IC_NVCMD) 326 is executed. Specifically, when the cell (CN#3) 284 is reproduced, the system CPU section 50 acquires the inter-cell command number written in the cell category (C_CAT) by reference to C_PBI in the C_PBI table 307, obtains the IC_NV command 326 corresponding to the number, and executes the command. With the last PGC#2, when the cell playback has been completed, the post-navigation command 324 is likewise executed.

When the program suppliers suitably set the above-described pre-navigation command 322, inter-cell navigation command 326, and post-navigation command 324 as well as the contents of PGC_CAT written in the PGC_GI 305, this makes it possible to produce title sets with excellent user interface in an interactive environment. Specifically, it is possible to realize not only a simple serial playback mode in which program chains are reproduced, starting with the entry program chain #1 in ascending order as shown in FIG. 87A, but also a branching playback mode in which a story proceeds with the flow branching from entry program #1 to any one of program chains #2, #3, and #4 as shown in FIG. 87B.

With the formats of the initial version, the method of creating sequences has been described by reference to FIGS. 20 to 25. The same method applies to the formation of program chains. To do so, in the explanations in FIGS. 20 to 25, it is necessary to read the sequences as those for program chains, place cells containing inter-cell commands required to arrange cells, and suitably arrange pre-navigation commands and post-navigation commands, thereby producing program chains. It goes without saying that the formats related to an improved version can be understood by reference to the explanations of FIGS. 20 to 25.

Referring to FIGS. 88 to 93, explained next will be a method of recording data on the optical disk 10 on and from which the video data is recorded and reproduced in the logic formats shown in FIGS. 26 to 79 and a recording system to which the recording method is applied.

FIG. 88 shows an encoder system that creates a video file 88 of a title set 84 whose video data is encoded. In the system of FIG. 88, for example, a videotape recorder (VTR) 201, an audio tape recorder (ATR) 202, and a sub-picture source 203 are used as sources of the main video data, audio data, and sup-picture data. Under the control of a system controller (Sys con) 205, they create the main video data, audio data, and sup-picture data, which are supplied to a video encoder (VENC) 206, an audio encoder (AENC) 207, and a sub-picture encoder (SPENC) 208, respectively. Under the control of the system controller (Sys con) 205, the seen coders 206, 207, and 208 perform A/D conversion of the main video data, audio data, and sup-picture data and encode them by the respective compression schemes. The encoded main video data, audio data, and sub-picture data (Comp Video, Comp Audio, Comp Sub-pict) are stored in memories 210, 211, and 212.

The main video data, audio data, and sub-picture data (Comp Video, Comp Audio, Comp Sub-pict) are outputted to a file formatter (FFMT) 214 under the control of the system controller (Sys con) 205, which converts them so that they may have a file structure of video data for the system as explained earlier. Then, under the control of the system controller (Sys con) 205, the setting conditions for each data item and the management information including attributes are stored in a memory 216 in the form of files.

Explained next will be a standard flow of an encoding process in the system controller (Sys con) 205 that creates a file from video data.

Figure 89:
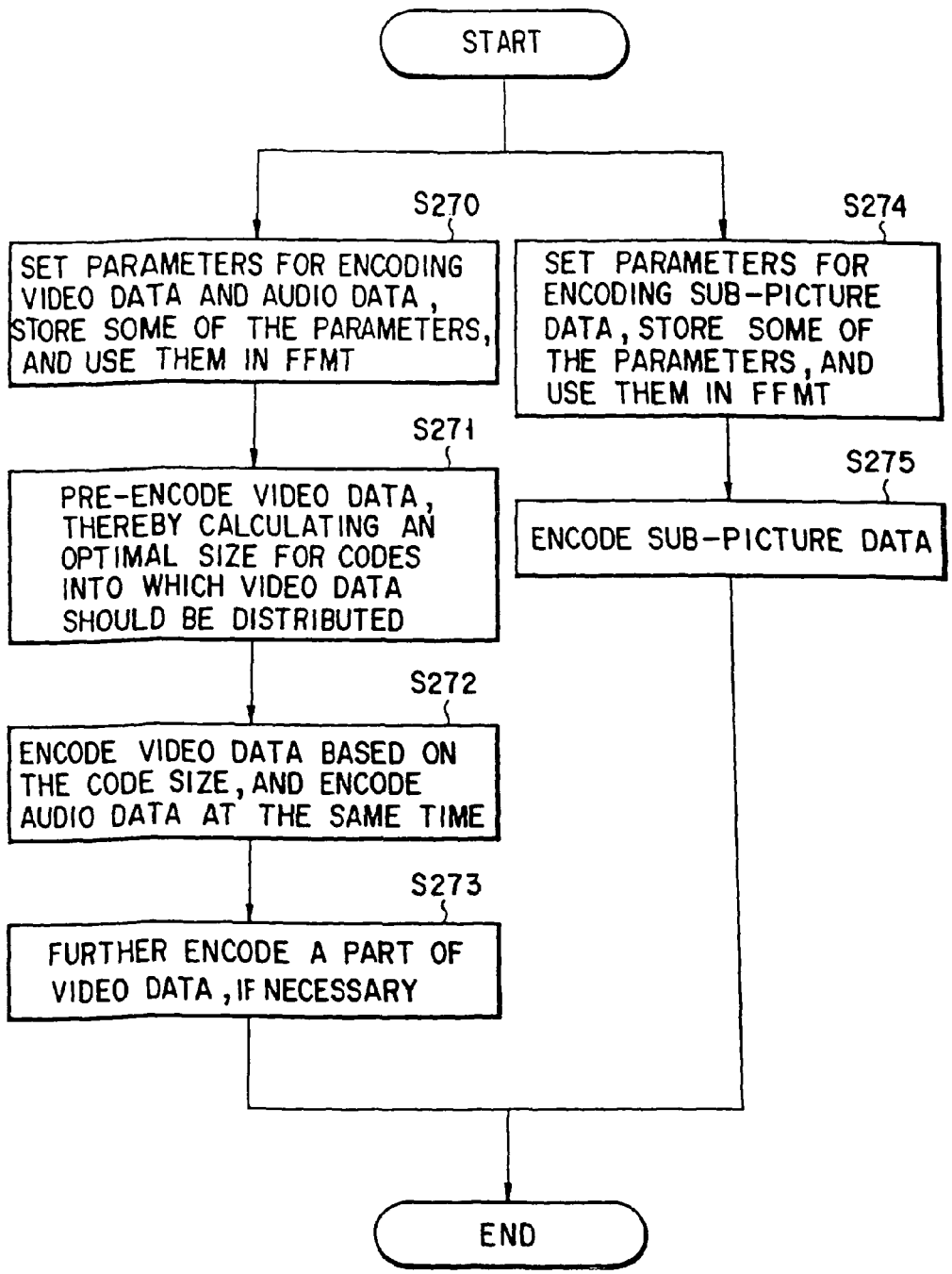
FIG. 89 is a flowchart illustrating an encoding process shown in FIG. 88.

According to the flow of FIG. 89, the main video data and audio data are encoded and the encoded main video data and audio data (Comp Video, Comp Audio) are supplied. Specifically, when the encoding process is started, as shown in step S70 of FIG. 67, the parameters necessary for encoding the main video data and audio data are set. Part of the set parameters are stored in the system controller (Sys con) 205 and at the same time, are used at the file formatter (FFMT) 214. As shown in step S271, the main video data is pre-encoded using the parameters and the optimum distribution of the amount of codes is calculated. Then, on the basis of the code amount distribution obtained in the pre-encoding, the main video data is encoded as shown in step S272. At the same time, the audio data is also encoded at step S272. As shown in step in S273, if necessary, the main video data is partially encoded again and the reencoded portion of the main video data is replaced with the old one. Through the series of steps, the main video data and audio data are encoded. Furthermore, as shown in steps S274 and S275, the sub-picture data is encoded and the encoded sub-picture data (Comp Sub-pict) is supplied. Namely, the parameters necessary for encoding the sub-picture data are set. As shown in step S274, part of the parameters are stored in the system controller (Sys con) 205 and used in the file formatter (FFMT) 214. On the basis of the parameters, the sub-picture data is encoded. By the process, the sub-picture data is encoded.

According to the flow of FIG. 90, the encoded main video data, audio data, and sup-picture data (Com Video, Com Audio, Comp Sub-picture) are combined and converted so as to form a video data title set structure as explained in FIGS. 26 and 79. Specifically, as shown in step S276, a cell is set as the smallest unit of the video data and cell playback information on the cell (C_PBI) is created. Then, as shown in step S277, the structure of the cells constituting a program chain and the main video, sub-picture, and audio attributes (the information obtained in encoding the respective data items is used as part of these attributes) are set. Then, as shown in FIG. 50, a video title set information management table information (VTSI_MAT) 278 including information on program chains and a video title set program chain table (VTS_PGCIT) 300 are created. At this time, as the need arises, a video title set direct access pointer table (VTS_DAPT) is also created. The encoded main video data, audio data, and sup-picture data (Com Video, CompAudio, CompSub-pict) are subdivided into specific packs. An NV pack is placed at the head of each VOBU so that playback can be effected in the order of time code of each data item. With the NV packs arranged this way, each data cell is positioned so that a video object (VOB) may be composed of a plurality of cells as shown in FIG. 28. A set of such video objects is formatted into the title set structure.

In the flow of FIG. 90, the program chain information (PGI) is obtained in the process of step S277 by using the database in the system controller (Sys con) 205 or entering data again as the need arises.

FIG. 91 shows a disk formatter system that records on an optical disk the title set formatted as described above. In the disk formatter system of FIG. 91, the memories 220, 222 in which the created title set is stored supply these file data items to a volume for matter (VFMT) 226. The volume formatter (VFMT) 226 extracts the management information from the title sets 284, 286, produces a video manager 71, and creates the logic data to be recorded on the disk 10 in the arrangement of FIG. 26. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

A standard flow for creating the aforementioned disk will be described with reference to FIGS. 92 and 93. FIG. 92 shows the flow of creating the logic data to be recorded on the disk 10. Specifically, as shown in step S280, parameter data items, including the number of video data files, their arrangement, and the size of each video data file, are set first. Next, as shown in step S281, a video manager 71 is created from the set parameters and the video title set information 281 in each video title set 72. Thereafter, as shown in step S282, the video manager 71 and video title set 72 are arranged in that order according to the corresponding logical block number, thereby creating the logic data to be recorded on the disk 10.

Thereafter, the flow of creating the physical data to be recorded on the disk as shown in FIG. 93 is executed. Specifically, as shown in step S283, the logic data is divided into units of a specific number of bytes, thereby forming error correction data. Next, as shown in step S284, the logic data divided into units of a specific number of bytes are combined with the created error correction data to form physical sectors. Thereafter, as shown in step S285, physical data is created by combining physical sectors. In this way, the modulating process based on certain rules is performed on the physical data created in the flow of FIG. 93, thereby forming the recording data. Thereafter, the recording data is recorded on the disk 10.

Figure 94:
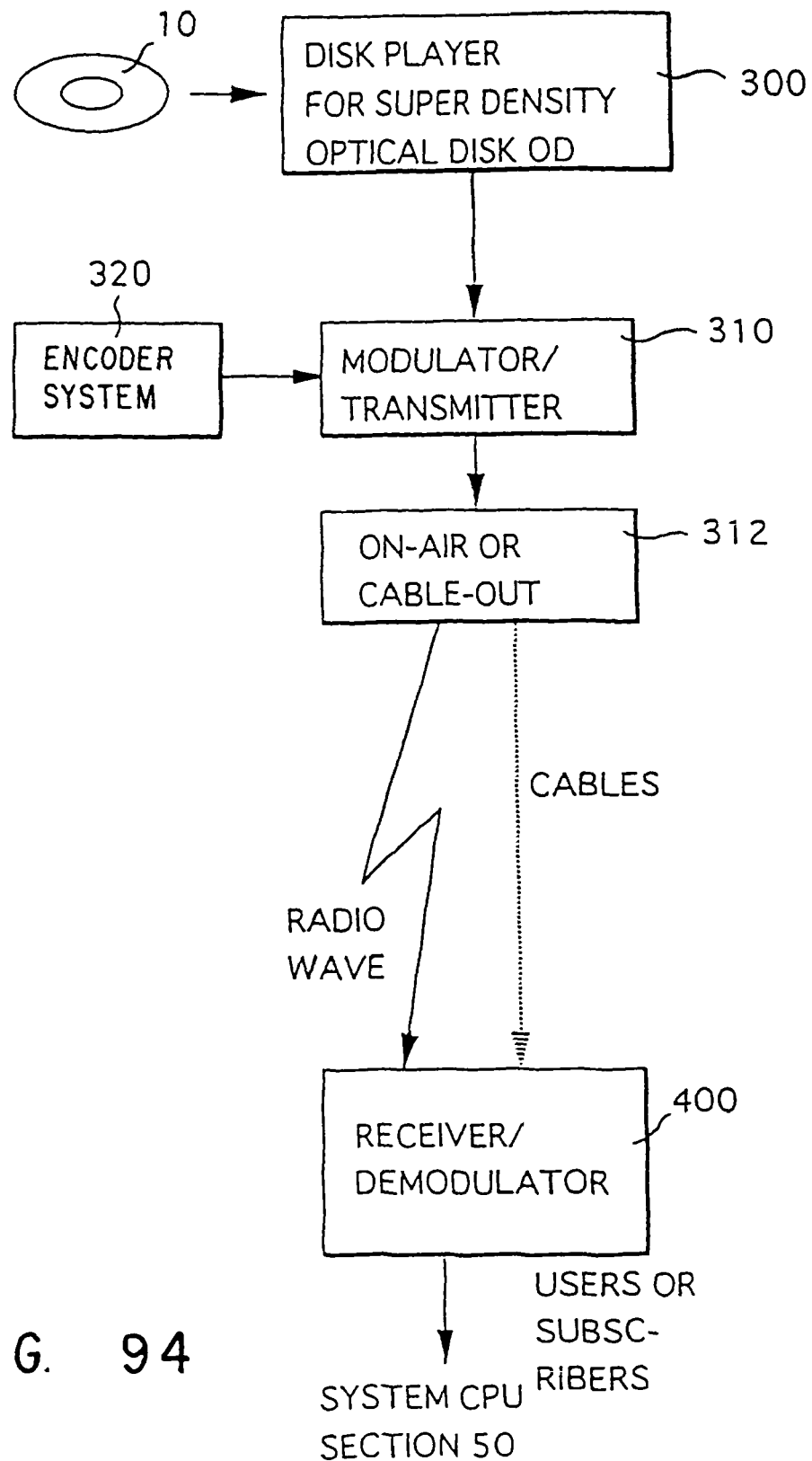
FIG. 94 schematically shows a system for transferring the video title set shown in FIG. 26 through a communication system.

The above-described data structure can be applied not only to a case where the data is recorded on recording mediums, such as optical disks, and then the disks are distributed to the users, who playback them, but also to a communication system as shown in FIG. 94. Specifically, according to the procedures shown in FIGS. 80 to 85B, an optical disk 10 in which a video manager 71 and video title sets 72 as shown in FIG. 26 are stored may be loaded into a reproducing apparatus 300, from whose system CPU section 50 the encoded data is taken out digitally and transmitted by a modulator/transmitter 310 to the users or the cable subscribers by radio or via a cable. Furthermore, the encoding system 320 and format system shown in FIGS. 88 and 91 may encode and format the data, respectively, on the provider side, such as a broadcasting station, and the formatted data may be transmitted by the modulator/transmitter 310 to the users or the cable subscribers by radio or via cables. In such a communication system, the information in the video manager 71 is modulated at the modulator/transmitter 310 and then supplied to or is directly supplied to the users free of charge. When a user is interested in the title, the modulator/transmitter 310 transmits the title set 72 at the user's or subscriber's request by radio or via a cable. Under the control of the video manager 71, the video title set information 94 is first transferred and then the title video object 95 in the video title set reproduced according to the title set information 94 is transferred. At this time, if necessary, the video title set menu video object 95 is also transmitted. The transferred data is received by a receiver/demodulator 400 on the user side and is processed as dencoded data at the system CPU section 50 of the reproducing apparatus on the user or subscriber side of FIG. 1 in the same manner as in the above-described reproducing process, whereby the video data is reproduced.

As shown in FIGS. 85A and 85B, video data is transferred using a PGC as a unit. After a PGC has been transferred, a subsequent PGC to be transferred can be selected arbitrarily on the user side. If it is not selected on the user side, a subsequent PGC to be transferred will be determined automatically. As a result, even with such a communication system, video data can be reproduced in an interactive environment.

In the above embodiments, the optical disk of the high-density recording type has been explained as a recording medium. The present invention, however, may be applied to recording mediums other than optical disks. For instance, the invention may be applied to magnetic disks or other recording mediums that enable data to be recorded physically at a high density.

As described above, with the present invention, because a plurality of movies and programs that can be selected are recorded together with branching information (selection information) on a single optical disk, an interactive environment can be provided for the user without preparing a dedicated application for each disk.

Furthermore, with the invention, recording branching information (selection information) on a disk on a closed-file set basis increases the portability of data and facilitates data handling.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A non-transitory computer readable information storage medium comprising:
   video manager information; and
   video title set information,
   the video title set information comprising video title set menu language unit search pointers and video title set menu language units grouped for each language,
   one of the video title set menu language unit search pointers comprising a video title set menu language code,
   one of the video title set menu language units comprising a video title set menu language unit information,
   the video title set menu language unit information comprising an end address of one of the video title set menu language units,
   the one of the video title set menu language units comprising a video title set menu program chain information search pointer,
   the video title set menu program chain information search pointer comprising a video title set menu program chain category, and the video title set menu program chain category describing information relating to an entry program chain, wherein the one of the video title set menu language units corresponding to the video title set menu language code is acquired when the video title set menu language code equals to a language code of a player, and a video title set menu language unit search pointer which differs from the one of video title set menu language unit search pointers is acquired when the video title set menu language code does not equal to the language code of the player.

2. A method for reproducing information from a non-transitory computer readable information storage medium including video manager information, and video title set information, the video title set information comprising video title set menu language unit search pointers and video title set menu language units grouped for each language, one of the video title set menu language unit search pointers comprising a video title set menu language code, one of the video title set menu language units comprising a video title set menu language unit information, the video title set menu language unit information comprising an end address of one of the video title set menu language units, the one of the video title set menu language units comprising a video title set menu program chain information search pointer, the video title set menu program chain information search pointer comprising a video title set menu program chain category, and the video title set menu program chain category describing information relating to an entry program chain, the method comprising:

acquiring the one of the video title set menu language units corresponding to the video title set menu language code when the video title set menu language code equals to a language code of a player, and acquiring a video title set menu language unit search pointer which differs from the one of video title set menu language unit search pointers when the video title set menu language code does not equal to the language code of the player.

3. An apparatus for reproducing information from a non-transitory computer readable information storage medium including video manager information, and video title set information, the video title set information comprising video title set menu language unit search pointers and video title set menu language units grouped for each language, one of the video title set menu language unit search pointers comprising a video title set menu language code, one of the video title set menu language units comprising a video title set menu language unit information, the video title set menu language unit information comprising an end address of the one of the video title set menu language units, the one of the video title set menu language units comprising a video title set menu program chain information search pointer, the video title set menu program chain information search pointer comprising a video title set menu program chain category, and the video title set menu program chain category describing information relating to an entry program chain, the apparatus comprising:

a processor configured to acquire the one of the video title set menu language units corresponding to the video title set menu language code when the video title set menu language code equals to a language code of a player, and to acquire a video title set menu language unit search pointer which differs from the one of video title set menu language unit search pointers when the video title set menu language code does not equal to the language code of the player.

* * * * *